United States Patent
Date et al.

[11] Patent Number: 5,713,253
[45] Date of Patent: Feb. 3, 1998

[54] ROTATIONAL MACHINING METHOD

[75] Inventors: Takao Date; Masafumi Araki; Katsuji Gakuhari; Makoto Kawano, all of Shizuoka-ken, Japan

[73] Assignee: Toshiba Kikai Kabushiki Kaisha, Tokyo, Japan

[21] Appl. No.: 538,724

[22] Filed: Oct. 3, 1995

[30] Foreign Application Priority Data

| Oct. 7, 1994 | [JP] | Japan | 6-244015 |
| Oct. 20, 1994 | [JP] | Japan | 6-255553 |
| Oct. 20, 1994 | [JP] | Japan | 6-255557 |
| Oct. 24, 1994 | [JP] | Japan | 6-258296 |

[51] Int. Cl.$^6$ .................... B23B 1/00; B23C 3/00
[52] U.S. Cl. .................... 82/1.11; 82/131; 364/474.02; 409/131
[58] Field of Search .................... 29/558; 409/165, 409/132, 166, 131; 82/131, 118, 1.11; 408/13; 364/474.15, 474.17, 474.02, 474.29

[56] References Cited

U.S. PATENT DOCUMENTS

| 4,602,540 | 7/1986 | Murofushi | 82/118 X |
| 4,604,705 | 8/1986 | Imanishi | 364/474.29 |
| 4,692,989 | 9/1987 | Neubauer | 29/558 |
| 4,863,321 | 9/1989 | Lieser | 409/165 |
| 4,883,392 | 11/1989 | Lieser | 409/165 |
| 4,933,868 | 6/1990 | McMurtry | 408/13 X |
| 4,983,899 | 1/1991 | Komatsu et al. | 364/474.15 X |
| 5,159,741 | 11/1992 | Garschagen et al. | 409/166 |
| 5,178,498 | 1/1993 | Bieg | 409/132 |
| 5,298,076 | 3/1994 | Gruener et al. | 364/474.29 |
| 5,309,800 | 5/1994 | Yuhara | 82/118 X |
| 5,348,431 | 9/1994 | Kusunoki et al. | 409/132 |
| 5,361,470 | 11/1994 | Hamada et al. | 409/166 |
| 5,396,821 | 3/1995 | Okumura et al. | 364/474.02 |
| 5,417,130 | 5/1995 | Dorsch | 82/1.11 |
| 5,431,514 | 7/1995 | Saito et al. | 82/131 X |
| 5,506,786 | 4/1996 | Itoh | 364/474.17 |
| 5,529,446 | 6/1996 | Boyer | 409/132 |

FOREIGN PATENT DOCUMENTS

| 3444945 A1 | 6/1986 | Germany. | |
| 63-54485 | 10/1988 | Japan. | |
| 5084602 | 4/1993 | Japan | 82/131 |
| 5146901 | 6/1993 | Japan | 82/131 |
| 1222421 | 4/1986 | U.S.S.R. | 82/131 |

Primary Examiner—William R. Briggs
Attorney, Agent, or Firm—Finnegan, Henderson, Farabow, Garrett & Dunner, L.L.P.

[57] ABSTRACT

A spindle 51 capable of controlling quantitatively the rotational angle around the center axial line itself is mounted with a turning tool 50; the spindle 51 and a workpiece are allowed to be relatively dislocated by an axial control along at least a plane perpendicular to the rotation axial line of the spindle 51 in such a manner that the relative movement locus L of the spindle center Cs to the workpiece conforms to a geometry to be machined and a required front rake angle β is set, thereby allowing a mutual interpolation motion between the spindle and the workpiece to be performed; and the rotational angle of the spindle 51 is synchronously controlled with a required interrelation to the above-mentioned axial control, whereby the direction of the cutting edge of the turning tool 50 to the machined face of the workpiece is kept at a required direction at the full rotational angle position of the spindle 50 with the required front rake angle β, and the direction of the cutting edge of the turning tool 50 to the machined face of the workpiece W is kept at a required direction, and then the workpiece W is machined into a geometry determined by the interpolation locus L due to the above-mentioned mutual interpolation motion.

15 Claims, 30 Drawing Sheets

ROTATIONAL MACHINING METHOD

BACKGROUND OF THE INVENTION

1. Technical Field

The present invention relates to a machining method by turning tools, and particularly to a spindle rotational angle control machining method by turning tools used for the machining by NC machining tools having a simultaneous multi axes control function. Also, the present invention relates to a rotational machining method by turning tools, and particularly to a rotational machining method by turning tools used for the machining in NC machining tools having a simultaneous multi axes control function.

2. Description of the Related Art

Heretofore, the machining by a turning tool such as a boring tool is performed in such a manner that the turning tool is mounted on a spindle, and the spindle is allowed to move in the axial direction, that is, in the Z-axis direction while controlling the revolution speed of the spindle, thereby making a bore of tool radius in a workpiece on a work table.

The machining is called boring, in which the workpiece on the work table is relatively displaced along a plane perpendicular to the rotating axial line of a spindle, that is, with respect to the spindle in both the Y-axis and Y-axis directions so as to be positioned for boring, and when the workpiece is bored by a turning tool, the workpiece remains stationary at a positioned position. Accordingly, the boring is limited to the machining of a straight bore having an inside diameter determined by the tool radius of the turning tool.

As a machining method belonging to the spring machining, the official gazette of Japanese Laid-Open Patent No. SHO 68-54485 discloses a machining method in which using a forming spring turning tool having the same cross-sectional geometry as that of a workpiece to be machined, a feed control is performed in the three-dimensional directions of X-axis, Y-axis and Z-axis, and the rotational angle around the Z-axis of the forming spring turning tool, that is, the rotational angle of C axis is controlled in such a manner that the forming spring turning tool faces always the front with respect to the forward direction in tool moving locus.

The conventional machining by a turning tool is a simple spindle rotational machining performed by simply rotating the turning tool, and the machining is limited to the machining of a straight bore and in addition, the machined bore diameter is unconditionally determined by the tool radius of the turning tool, so that it is necessary to prepare a turning tool having a required tool radius for each machined bore diameter and to exchange a turning tool mounted on the spindle with another turning tool suitable for the machined bore diameter each time the machined bore diameter is changed. In this case, the dimensional accuracy of the tool radius of a turning tool affects directly the machining accuracy, so that in order to obtain a required machining accuracy, it is necessary to perform precisely the tool presetting such that the cutting edge position of a turning tool is set at a high accuracy.

In a simple spindle rotational machining performed by simply rotating a turning tool, the machining direction is only the direction coincident with the axial direction of a spindle, and boring and the like inclined with respect to the center axial line of the spindle cannot be performed, whereby it is necessary to accurately perform the positioning of a workpiece with respect to the center axial line of the spindle on a work table.

Even where the machined part geometry of a workpiece before being machined or when being machined, for example, the bore diameter thereof is automatically measured to set the depth of cut, the machined bore diameter is determined mechanically by the tool radius of a turning tool, so that it is necessary to perform tool exchange or to change manually the protrusion of the cutting edge of a turning tool each time the machined bore diameter is changed, according to the depth of cut.

The machining method disclosed in the official gazette of Japanese Laid-Open Patent No. SHO 63-54485 is a modification to planer machining, in which the machining motion is developed by the movement of three axes of X-axis, Y-axis and Z-axis; C axis only follows the movement to change the phase thereof; the cutting speed is determined by the feed speed of three axes of X-axis, Y-axis and Z-axis and is about 5 through 40 m/min which does not reach the cutting speed in the rotational machining using a turning tool, and which is that in the planer machining at the maximum; and the machining to be performed is limited to a forming spring turning tool machining such as the grooving of a geometry changing arbitrarily in the three dimensional direction of X-axis, Y-axis and Z-axis.

Also, the front rake angle of a turning tool is determined mechanically by the tip geometry and the mounting angle of the turning tool to a spindle, so that even if the machined bore diameter is the same, when the front rake angle is allowed to change according to the kind of material to be machined and the like, it is necessary to perform tool exchange, the change in tool mounting angle and the like.

Also, in the machining by a conventional turning tool, where roughing, intermediate finishing and finishing are performed, the turning tool for roughing, that for intermediate finishing and that for finishing are required, respectively, and thus tool exchange must be performed even for one boring.

Further, where there is chamfering, the turning tool for chamfering is additionally required, and it is also necessary to perform tool exchange when performing chamfering.

Tool exchange causes the operation rate of a machining tool such as a machining center to be reduced.

Heretofore, the rotational machining by a turning tool such as a boring tool is performed in such a manner that the turning tool is mounted on a spindle, and the spindle is allowed to move in the axial direction while controlling the revolution speed of the spindle, thereby making a bore of tool radius in a workpiece on a work table, that is, performing boring.

In the boring, a continuous machining, particularly the machining of a machined material having a large malleability such as soft steel and aluminum causes a chip in a continuous form to be developed, and the chip may twine around the boring bar of a boring tool. The chip twining interferes with switch continuous boring.

Also, the chip twined around the boring bar reaches the automatic tool exchanging V groove of a tool holder to cause the automatic tool exchanging not to be performed or a tool to be accidentally dropped.

For this reason, heretofore, where a machined material having a large malleability is machined, there have been taken measures such that the cutting edge is provided with a chip breaker to break the chip into short pieces, or that a machined material has been previously machined on the machined face to form a key groove-shaped separating groove having a depth according to a machining allowance in boring, and with the separating groove, a noncontinuous machining is performed to make the chip noncontinuous.

The breaking of chip by the chip breaker and the like depends on the machining conditions and cannot guarantee a complete noncontinuous chip, and thus cannot solve such problems.

Although with the separating groove, chip can be positively made noncontinuous, the machining of the separating groove is required and thus manhours are increased.

SUMMARY OF THE INVENTION

The present invention is made in view of the problems as described above, and it is an object of the invention to provide a novel machining method by which there can be performed efficiently boring of arbitrary inside diameter and machining of the outer periphery of arbitrary outside diameter, as well as, taper machining, spherical surface machining, polygon machining, thread cutting, flange face machining and arbitrary geometry machining by a single turning tool regardless of tool radius, and in addition, by which there can be performed a highly accurate machining regardless of tool radius.

Further, another object of the present invention is to provide a machining method by which there can be performed the machining of a bore or a flange inclined to the center axial line of a spindle, and as an application of the inclined machining, the positioning error of a workpiece with respect to the spindle center axial line can be compensated, and by which there can be performed a series of machining with a required depth of cut on the basis of the automatic measurement of a machined part geometry without requiring tool exchange.

In order to achieve the objects as described above, the spindle rotational angle control machining method of the present invention is characterized in that a spindle capable of controlling quantitatively the rotational angle around the center axial line itself is mounted with a turning tool; the spindle and a workpiece are allowed to be relatively dislocated by an axial control along at least a plane perpendicular to the rotation axial line of the above-mentioned spindle in such a manner that the relative movement locus of the spindle center to the workpiece conforms to a geometry to be machined, thereby allowing a mutual interpolation motion between the spindle and the workpiece to be performed; and the rotational angle of the above-mentioned spindle is synchronously controlled with a required interrelation to the above-mentioned axial control, whereby the direction of the cutting edge of the turning tool to the machined face of the workpiece is kept at a required direction at the full rotational angle position of the spindle, and then the workpiece is machined into a geometry determined by the interpolation locus due to the above-mentioned mutual interpolation motion.

Also, the spindle rotational angle control machining method of the present invention is characterized in detail in that in the spindle rotational angle control machining method as set forth in claim 1, according to the degree of inclination of the machining axial line or machining face of a workpiece to the center axial line of the above-mentioned spindle, the axial control level of the relative displacement of the above-mentioned spindle to the above-mentioned workpiece is corrected, whereby the inclination component of the machining axial line or machining face of the workpiece to the center axial line of the above-mentioned spindle is given to the above-mentioned mutual interpolation motion between the above-mentioned spindle and the above-mentioned workpiece, and then an inner/outer peripheral face or an inclined flange face whose machining axial line is inclined to the spindle center axial line is machined.

Further, the spindle rotational angle control machining method of the present invention is characterized in detail in that in the spindle rotational angle control machining method as set forth in claim 1, the degree of inclination of the machining axial line or machining face of a workpiece to the normal state thereof due to the positioning error of the workpiece is automatically measured, and according to the degree of inclination, the axial control level of the relative displacement of the above-mentioned spindle to the above-mentioned workpiece is corrected, whereby the inclination compensating component of the machining axial line or machining face of the workpiece to the center axial line of the above-mentioned spindle is given to the above-mentioned mutual interpolation motion between the above-mentioned spindle and the above-mentioned workpiece, and then an inner/outer peripheral face or an inclined flange face on the basis of the machining axial line in the normal state is machined.

Also, the spindle rotational angle control machining method of the present invention is characterized in detail in that in the spindle rotational angle control machining method as set forth in any of claims 1 through 3, machining start dimensions are determined by automatically measuring the machining part geometry of a workpiece, and with the machining start dimensions, the machining level by the above-mentioned turning tool is determined according to the relative displacement of the above-mentioned spindle to the above-mentioned workpiece.

Also, the spindle rotational angle control machining method according to the present invention is characterized in detail in that in the spindle rotational angle control machining method as set forth in any of claims 1 through 4, the machining part geometry of a workpiece is automatically measured midway through machining and machining dimensions required for finishing are automatically determined, and then with the machining dimensions, the machining level by the above-mentioned turning tool is determined according to the relative displacement of the above-mentioned spindle to the above-mentioned workpiece.

Also, the spindle rotational angle control machining method according to the present invention is characterized in detail in that as the above-mentioned turning tool, a single point turning tool contacting substantially through a point a workpiece is used.

Also, the spindle rotational angle control machining method of the present invention is characterized in detail in that the above-mentioned axial control is performed by simultaneously controlling two axes crossing mutually on at least the same plane, and the respective axial control of the two axes is performed in a manner to draw a locus defined by a functional equation including trigonometric functions having a 90° phase difference mutually.

In a spindle rotational angle control machining method of the present invention, while a mutual interpolation motion between a spindle and a workpiece is being performed by a relative axial control of the spindle to the workpiece, the direction of the cutting edge of a turning tool to the machined face of the workpiece is kept at a required direction at the full rotational angle position of the spindle by synchronously controlling the rotational angle of the spindle for the axial control, and thus the workpiece is machined into a geometry determined by the interpolation locus due to the mutual interpolation motion.

Also, in another spindle rotational angle control machining method of the present invention, according to the degree of inclination of the machining axial line or machining face of a workpiece to the center axial line of a spindle, the axial control level of the relative displacement of the above-mentioned spindle to the above-mentioned workpiece is corrected, and the inclination component of the machining axial line or machining face of the workpiece to the center axial line of the above-mentioned spindle is given to the above-mentioned mutual interpolation motion between the above-mentioned spindle and the above-mentioned workpiece, whereby an inner/outer peripheral face or an inclined flange face whose machining axial line is inclined to the spindle center axial line is machined.

Also, in another spindle rotational angle control machining method, the degree of inclination of the machining axial line or machining face of a workpiece to the normal state thereof due to the positioning error of the workpiece is automatically measured, and according to the degree of inclination, the axial control level of the relative displacement of the above-mentioned spindle to the above-mentioned workpiece is corrected, and the inclination compensating component of the machining axial line or machining face of the workpiece to the center axial line of the above-mentioned spindle is given to the above-mentioned mutual interpolation motion between the above-mentioned spindle and the above-mentioned workpiece, whereby an inner/outer peripheral face or an inclined flange face on the basis of the machining axial line in the normal state is machined.

Further, in another spindle rotational angle control machining method, machining start dimensions are determined by automatically measuring the machining part geometry of a workpiece, and with the machining start dimensions, the machining level by the above-mentioned turning tool is determined according to the relative displacement of the above-mentioned spindle to the above-mentioned workpiece.

Also, in another spindle rotational angle control machining method, the machining part geometry of a workpiece is automatically measured midway through machining and machining dimensions required for finishing are automatically determined, and then with the machining dimensions, the machining level by the above-mentioned turning tool is determined according to the relative displacement of the above-mentioned spindle to the above-mentioned workpiece.

As a turning tool, a single point turning tool contacting substantially through a point a workpiece is used, whereby the cutting resistance becomes smaller than with a forming spring turning tool, which allows the speed of the mutual interpolation motion by axial control, that is, the cutting speed to be made fast.

The present invention is made in view of the problems as described above, and it is an object of the invention to provide a novel machining method using a turning tool by which there can be performed efficiently boring of arbitrary inside diameter and machining of the outer periphery of arbitrary outside diameter, as well as, taper machining, spherical surface machining, polygon machining, thread cutting and the like by a single turning tool regardless of tool radius, and in addition, by which a front rake angle can be arbitrarily changed without requiring tool exchange or tool mounting angle change.

According to the present invention, the object as described above is achieved by a spindle rotational angle control machining method by turning tools, which is characterized in that a spindle capable of controlling quantitatively the rotational angle around the center axial line itself is mounted with a turning tool; the spindle and a workpiece are allowed to be relatively dislocated by an axial control along at least a plane perpendicular to the rotation axial line of the above-mentioned spindle in such a manner that the relative movement locus of the spindle center to the workpiece conforms to a geometry to be machined and a required front rake angle is set, thereby allowing a mutual interpolation motion between the spindle and the workpiece to be performed; and the rotational angle of the above-mentioned spindle is synchronously controlled with a required interrelation to the above-mentioned axial control, whereby the direction of the cutting edge of the turning tool to the machined face of the workpiece is kept at a required direction at the full rotational angle position of the spindle with the required front rake angle, and then the workpiece is machined into a geometry determined by the interpolation locus due to the above-mentioned mutual interpolation motion.

The spindle rotational angle control machining method of the present invention is characterized in detail in that as the above-mentioned turning tool, a single point turning tool contacting substantially through a point a workpiece is used.

According to the configuration as described above, while a mutual interpolation motion between a spindle and a workpiece is being performed by a relative axial control of the spindle to the workpiece, the direction of the cutting edge of a turning tool to the machined face of the workpiece is kept at a required direction at the full rotational angle position of the spindle with a required front rake angle by synchronously controlling the rotational angle of the spindle for the axial control, and thus the workpiece is machined with the required front rake angle into a geometry determined by the interpolation locus due to the mutual interpolation motion.

As a turning tool, a single point turning tool contacting substantially through a point a workpiece is used, whereby the cutting resistance becomes smaller than with a forming turning tool, which allows the speed of the mutual interpolation motion by axial control, that is, the cutting speed to be made fast.

The present invention is made in view of the problems as described above, and it is an object of the invention to provide a novel spindle rotational angle control machining method by which there can be performed efficiently boring of arbitrary inside diameter and machining of the outer periphery of arbitrary outside diameter, as well as, taper machining, spherical face machining, polygon machining, thread cutting, flange face machining and arbitrary geometry machining by the turning machining system using a single turning tool regardless of tool radius, and in addition, which requires no tool exchange when performing roughing, intermediate finishing, finishing and chamfering.

In order to achieve the above-mentioned object, the spindle rotational angle control machining method according to the present invention is characterized in that a spindle capable of controlling quantitatively the rotational angle around the center axial line itself is mounted with a turning tool having radially a plurality of cutting edges with the center axial line thereof as a center; the spindle and a workpiece are allowed to be relatively dislocated by an axial control along at least a plane perpendicular to the rotation axial line of the above-mentioned spindle in such a manner that the relative movement locus of the spindle center to the work piece conforms to a geometry to be machined, thereby allowing a mutual interpolation motion between the spindle and the workpiece to be performed; and the rotational angle of the above-mentioned spindle is synchronously controlled with a required interrelation to the above-mentioned axial control, whereby the direction of the cutting edge of the turning tool to the machined face of the workpiece is kept at a required direction at the full rotational angle position of the spindle, and then the workpiece is machined by one cutting edge selected from the above-mentioned plurality of cutting edges into a geometry determined by the interpolation locus due to the above-mentioned mutual interpolation motion.

The spindle rotational angle control machining method according to the present invention is characterized in detail in that the above-mentioned plurality of cutting edges are single point turning tools each contacting substantially through a point a workpiece.

Also, the spindle rotational angle control machining method according to the present invention is additionally characterized in detail in that the above-mentioned plurality of cutting edges include at least two cutting edges of the cutting edge for roughing, that for intermediate finishing, that for finishing and that for chamfering.

According to the configuration as described above, while a mutual interpolation motion between a spindle and a workpiece is being performed by a relative axial control of the spindle to the workpiece, the direction of the cutting edge of a turning tool to the machined face of the workpiece is kept at a required direction at the full rotational angle position of the spindle by synchronously controlling the rotational angle of the spindle for the axial control, and thus the workpiece is machined by one cutting edge selected from the above-mentioned plurality of cutting edges into a geometry determined by the interpolation locus due to the mutual interpolation motion.

Each cutting edge is a single point turning tool, whereby the cutting resistance becomes smaller than with a forming turning tool for spring machining, which allows the speed of the mutual interpolation motion by axial control, that is, the cutting speed to be made fast.

The plurality of cutting edges include at least two cutting edges of the cutting edge for roughing, that for intermediate finishing, that for finishing and that for chamfering, whereby with one turning tool selected from these cutting edges, a plurality of machining are performed such as roughing, intermediate finishing, finishing and chamfering.

The present invention is made in view of the problems as described above, and it is an object of the invention to provide a rotational machining method using a turning tool by which chip is made positively noncontinuous without requiring chip breaker mounting and separating groove machining; chip is prevented from twining around the boring bar of a boring tool; and even the machining of a machined material having a large malleability can be performed continuously without being given a hindrance due to chip.

In order to achieve the object as described above, the rotational machining method using a turning tool according to the present invention is characterized in that in the rotational machining method of machining a workpiece by rotating the turning tool mounted on a spindle around the rotation axial line of the spindle, the turning tool is rotationally driven at a spindle revolution speed with the spindle center as a rotational center; the turning tool and the workpiece are allowed to be relatively dislocated by an axial control along at least a plane perpendicular to the rotation axial line of the spindle in such a manner that the relative movement locus of the spindle center to the workpiece conforms to a geometry to be machined, thereby allowing a mutual interpolation motion between the turning tool and the workpiece to be performed; and the workpiece is intermittently machined for each rotation of the above-mentioned turning tool by the above-mentioned turning tool into a geometry determined by the interpolation locus due to the above-mentioned mutual interpolation motion.

The rotational machining method using a turning tool according to the present invention is characterized in detailing that as the above-mentioned turning tool, a single point turning tool contacting substantially through a point a workpiece is used.

According to the configuration as described above, in a state in which a turning tool is rotated (about its axis) at a spindle revolution speed, a mutual interpolation motion between the turning tool and a workpiece is performed by a relative axial control of the turning tool to the workpiece, and the workpiece is rotationally machined by the turning tool into an arbitrary geometry determined by the interpolation locus due to the mutual interpolation motion. In this case, the rotational radius (tool radius) of the turning tool becomes different from the turning radius of the workpiece, so that the turning tool machines intermittently the workpiece for each rotation by the rotation about its axis, and thus the intermittent machining causes chip to be made noncontinuous.

As a turning tool, a single point turning tool contacting substantially through a point a workpiece is used, whereby the cutting resistance becomes smaller than with an end mill and the like, which allows the speed of the mutual interpolation motion by axial control, that is, the cutting speed to be made fast, or whereby a workpiece having a long axial length such as a deep bore can be machined highly accurately by the use of a turning tool having a long stem part (boring bar).

DESCRIPTION OF THE PREFERRED EMBODIMENTS

With reference to the drawings, embodiments of the present invention will be explained in detail hereinafter. First, with reference to FIGS. 1 though 28, the first embodiment will be explained.

Figure 1A:
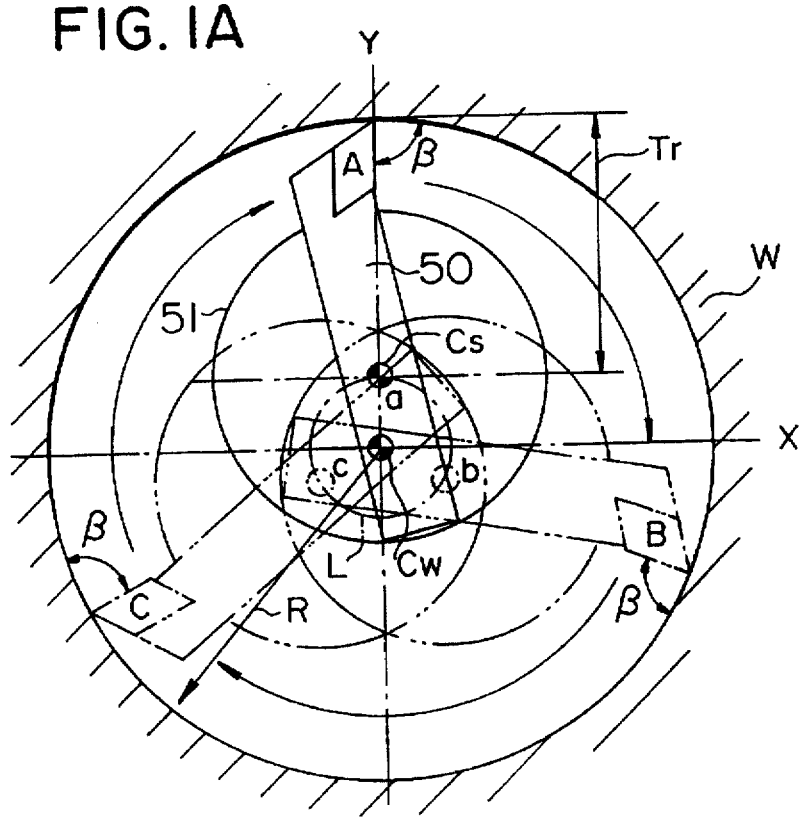
FIGS. 1A and 1B are illustrative views showing a principle of machining by the spindle rotational angle control machining method of a first embodiment in connection with the present invention.
Figure 1B:
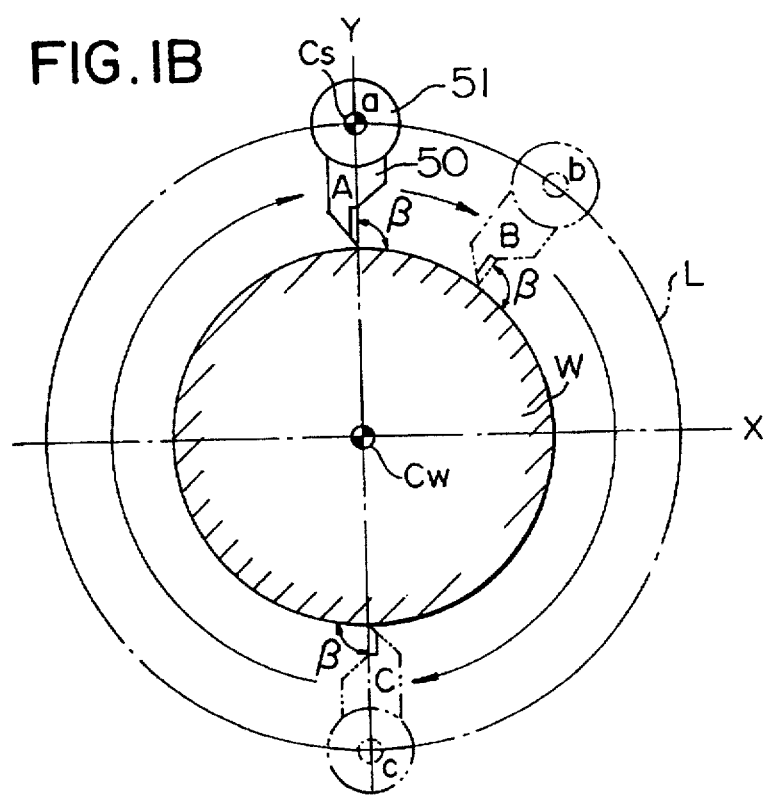

FIGS. 1A and 1B show a principle of the machining by the spindle rotational angle control machining method according to the present invention. FIG. 1A shows an example of inner peripheral face machining in which a turning tool 50 is mounted to a spindle 51 capable of controlling quantitatively the rotational angle around the center axial line itself; the spindle 51 and a workpiece W are relatively dislocated by an axial control, in this case, by X-axis control and Y-axis control along a plane perpendicular to the rotation axial line of the spindle 51 in such a manner that the relative movement locus of the spindle center Cs to the workpiece W conforms to a geometry to be machined, thereby allowing a mutual interpolation motion of true circle between the spindle 51 and the workpiece W to be performed; and the rotational angle of the spindle 51 is synchronously controlled with a required interrelation to X-axis control and Y-axis control, whereby the direction of the cutting edge of the turning tool 150 to the inner peripheral face of the workpiece W is kept at a required direction at the full rotational angle position of the spindle 51, that is, an angle β between the cutting edge and the inner peripheral face is kept at a certain value, and then the workpiece W is machined into a geometry determined by an interpolation locus (spindle center locus) L due to the above-mentioned mutual interpolation motion, that is, into the cross sectional geometry of true circle.

In FIG. 1A, reference codes a, b and c designate positions of the spindle center Cs when the spindle 51 is positioned at respective rotational angle positions designated by reference codes A, B and C, respectively, which are located on the interpolation locus L.

When a tool radius of the turning tool 50 is designated by Tr, and a machining radius of the workpiece W by R, under a precondition of R>Tr, the spindle center Cs is decentralized by R−Tr from a center Cw of the workpiece W, so that the interpolation locus L becomes true circle having a radius of R−Tr and the same center as the center Cw of the workpiece W.

In this case, the coordinate values of X-axis control and Y-axis control are given by trigonometric functional equations having a 90° phase difference mutually with the angle around the workpiece center Cw taken as a medium variable so that the interpolation locus L draws true circle.

The turning tool 50 used here may be a single point turning tool. The single point turning tool referred to here is a turning tool of a type of contacting substantially through a point a workpiece, that is, a general term of nonforming turning tools, which includes boring tools, boring bar tools, parting tools, threading tools, button tools and turning tools.

As one example, where the inside diameter machining of the machining radius 60 mm is performed using a common boring bar tool of the tool radius Tr 50 mm, the revolution speed of the spindle 51 can be made 292 RPM, the cutting speed made 110 m/min, and the center moving speed of the spindle 51 drawing the interpolation locus L made 18 m/min.

FIG. 1B shows an example of outer peripheral face machining. In FIG. 1B, the parts corresponding to FIG. 1A are designated by the same reference codes as those designated to FIG. 1A, and the explanation of the parts will be omitted.

Also, in this case, the spindle 51 and a workpiece W are relatively dislocated by X-axis control and Y-axis control along a plane perpendicular to the rotation axial line of the spindle 51, thereby allowing a mutual interpolation motion of true circle between the spindle 51 and the workpiece W to be performed; and the rotational angle of the spindle 51 is synchronously controlled with a required interrelation to X-axis control and Y-axis control, whereby the direction of the cutting edge of the turning tool 50 to the outer peripheral face of the workpiece W is kept at a required direction at the full rotational angle position of the spindle 51, that is, an angle β between the cutting edge and the outer peripheral face is kept at a certain value, and then the workpiece is machined into a geometry determined by the interpolation locus L due to the above-mentioned mutual interpolation motion, that is, into the cross sectional geometry of true circle.

For outer peripheral face interpolat the radius of the interpolation locus L may be either larger or smaller than that of the workpiece W, and thus there is no restraint relationship between both.

Figure 2:
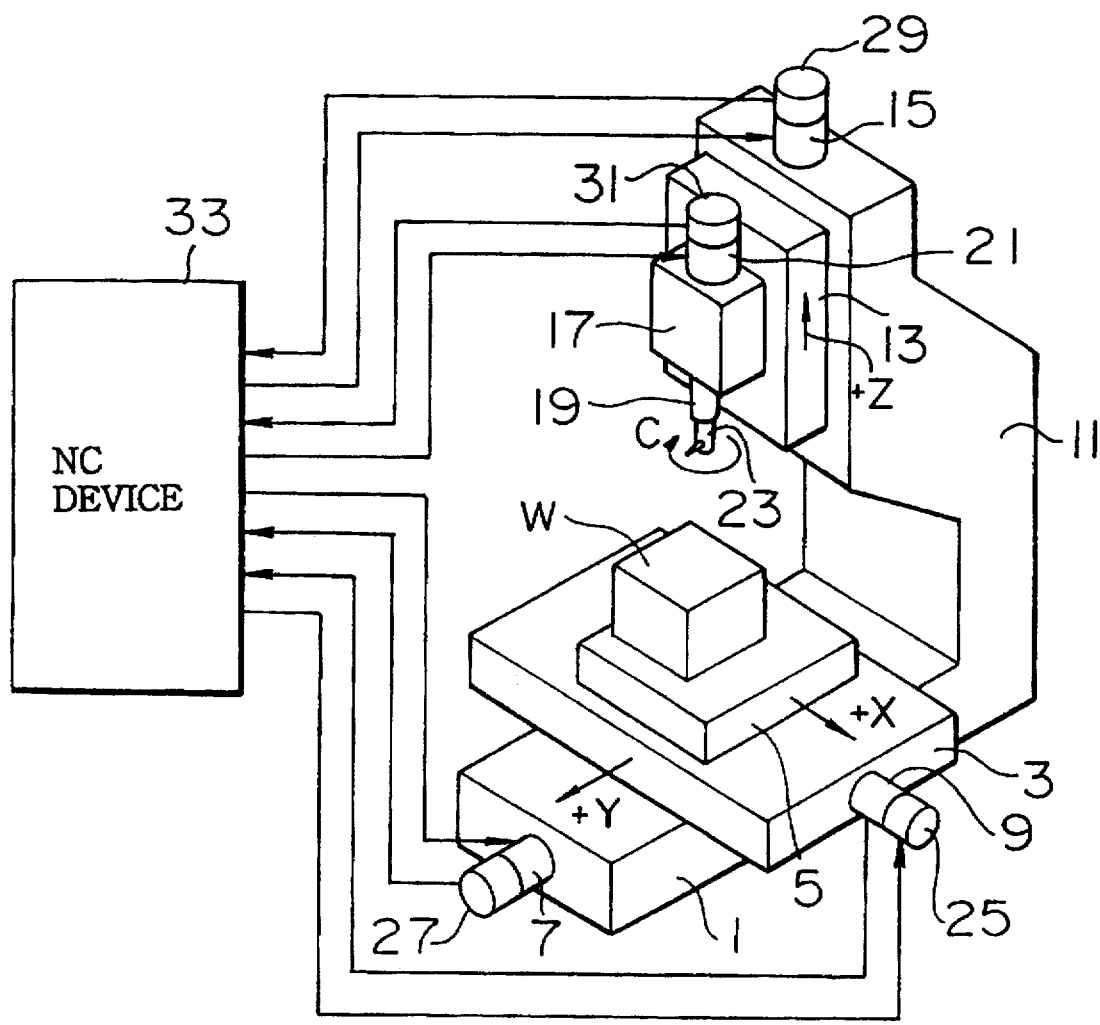
FIG. 2 is a schematic perspective view showing one example of an NC machining tool used for the spindle rotational angle control machining method of the first embodiment.

FIG. 2 shows one example of an NC machining tool used to embody the spindle rotational angle control machining method according to the present invention. The NC machining tool has a bed 1, a Y-axis table 3, and an X-axis table 5 provided movably in the X-axis direction on the Y-axis table 3, the workpiece W being fixedly placed on the X-axis table 5. The Y-axis table 3 is driven in the Y-axis direction by a Y-axis servomotor 7, and the workpiece W on the X-axis table 5 is axially controlled along a horizontal plane consisting of X-axis and Y-axis at an arbitrary coordinate position by X-coordinate and Y-coordinate according to both the Y-axis direction movement of the Y-axis table 3 by the Y-axis servomotor 7 and the X-axis direction movement of the X-axis table 5 by the X-axis servomotor 9.

A Z-axis slider 13 is mounted movably in the vertical direction, that is, in the Z-axis direction on a column 11 of the NC machining tool, the Z-axis slider 13 being driven in the Z-axis direction by a Z-axis servomotor 15.

The Z-axis slider 13 is mounted with a spindle head 17 to which a spindle 19 is mounted rotatably around the axial line in the same direction as Z-axis, that is, around C-axis.

The spindle 19 is rotationally driven by a C-axis servomotor 21 and controlled quantitatively for C-axis rotational angle, and in addition, the spindle 19 is mounted with a turning tool 23.

Here, the movement plane of the workpiece W by X-axis and Y-axis is a plane perpendicular to the rotating axial line of the spindle 19, that is, C-axis (Z-axis).

The X-axis servomotor 9, the Y-axis servomotor 7, the Z-axis servomotor 15 and the C-axis servomotor 21 are mounted with rotary encoders 25, 27, 29 and 31, respectively, and the rotary encoders 25, 27, 29 and 31 detect the rotational angle of respective servomotors 9, 7, 15 and 21 to output rotational angle information to an NC device 33. Of them, the rotary encoder 31 of the C-axis servomotor 21 is configured by an absolute type rotary encoder, and measures the rotational angle of the spindle 19 in the X-axis direction or Y-axis direction as an absolute datum position.

Figure 3:
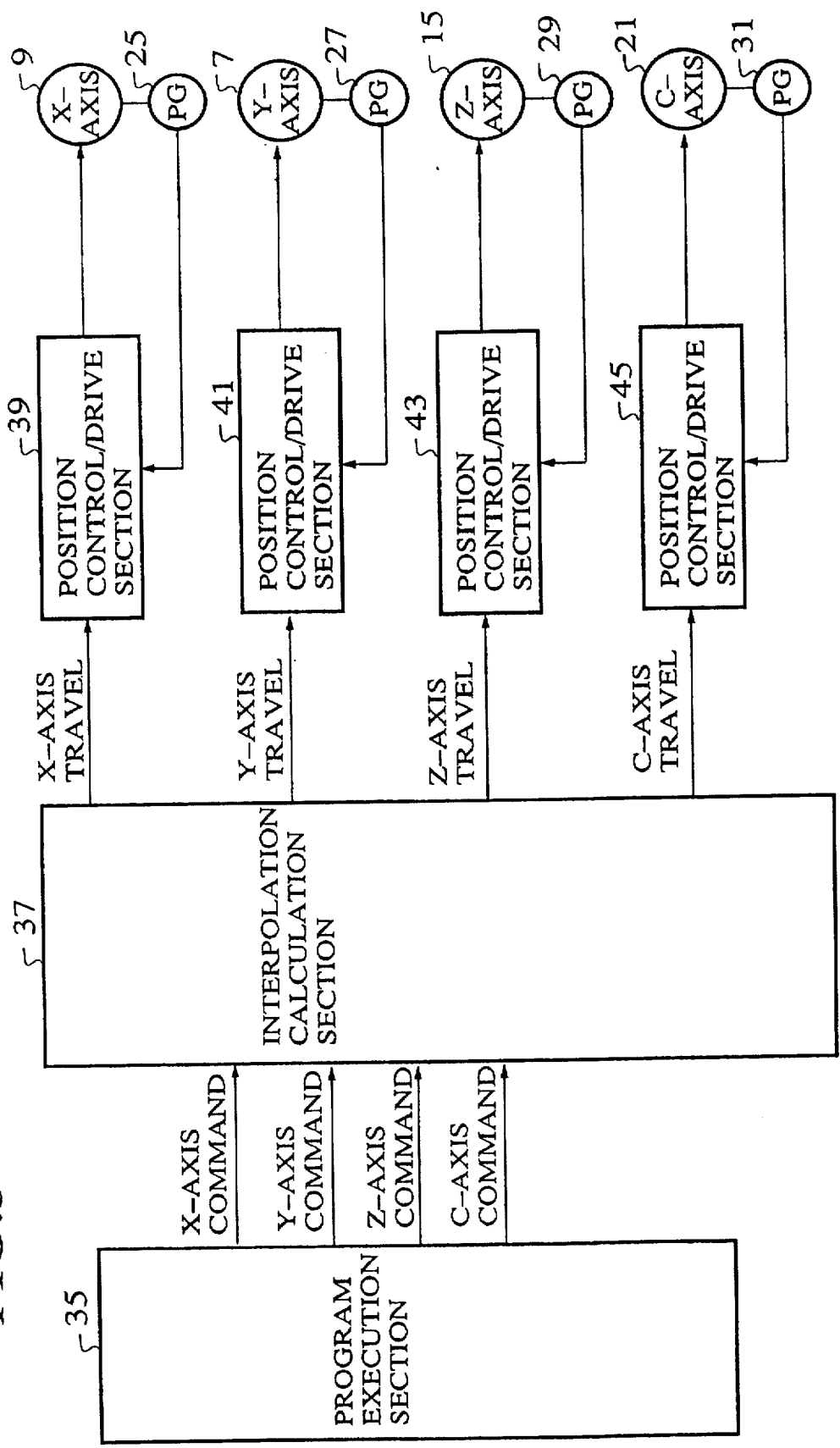
FIG. 3 is a block diagram showing a control system of an NC machining tool used for the spindle rotational angle control machining method of the first, a second and a third embodiments.

The NC device 33, as shown in FIG. 3, has a program execution section 35 for executing an NC machining program to output respective axes commands, and an interpolation calculation section 37 for receiving axes commands from the program execution section 35 to perform an interpolation calculation, and the interpolation calculation section 37 outputs a travel of respective axes X, Y, Z and C as a command value to position control/drive sections 39, 41, 43 and 45 of the respective axes.

The position control/drive sections 39, 41, 43 and 45 receive the rotational angle information from the respective rotary encoders 25, 27, 29 and 31 of the same axes and control the drive of the servomotors 9, 7, 15 and 21 of the same axes on the basis of the operation level of respective axes calculated by a position feedback compensating control.

In the spindle rotational angle control machining method according to the present invention, the command values of respective axes X, Y and Z have been set by an NC machining program in such a manner that the relative movement locus of the spindle center to the workpiece W conforms to a geometry to be machined; with the execution of the program, the turning tool 23 and the workpiece W are relatively dislocated by the control of axes X, Y and Z, at least axes X and Y along a plane perpendicular to the rotation axial line of the spindle 19, thereby allowing a mutual interpolation motion between the turning tool 23 and the workpiece W to be performed; and the rotational angle of the spindle 19 is synchronously controlled with a required interrelation to the control of axes X, Y and Z, whereby the direction of the cutting edge of the turning tool 23 to the machined face of the workpiece W is kept at a required direction, for example, a normal direction at the full rotational angle position of the spindle 19, and then the workpiece W is machined into a geometry determined by an interpolation locus due to the mutual interpolation motion.

In this case, the control of two axes X and Y is performed in a manner to draw a locus defined by an equation including trigonometric functions having a 90° phase difference mutually.

In the spindle rotational angle control machining method, by combining the control of the rotational angle of the spindle 19 with the simultaneous control of either two axes X and Y, or three axes X, Y and Z, there can be performed boring of arbitrary inside diameter and machining of the outer periphery of arbitrary outside diameter, as well as, taper machining, spherical face machining, polygon machining, thread cutting, flange face machining and arbitrary geometry machining using a single turning tool regardless of the tool radius of the turning tool 23; and by the use of a single point turning tool, the machining speed is improved three through twenty times faster than with the machining belonging to the spring machining using a forming turning tool.

Figure 4:
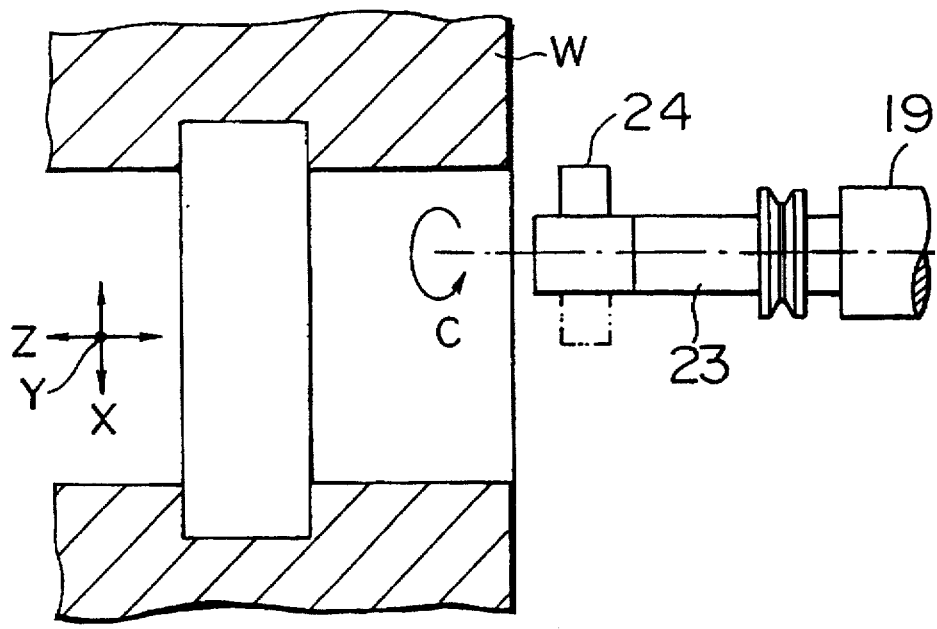
FIG. 4 is an illustrative view showing a cylindrical inner face machining example in the first embodiment.
Figure 5:
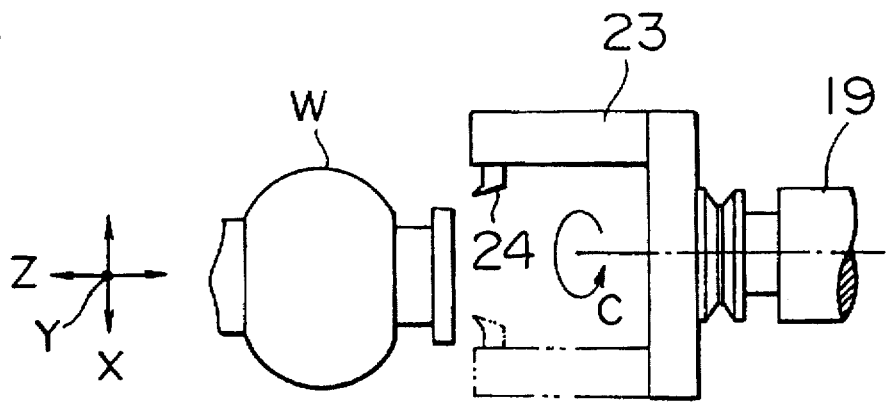
FIG. 5 is an illustrative view showing a cylindrical outer face machining in the first embodiment.
Figure 6:
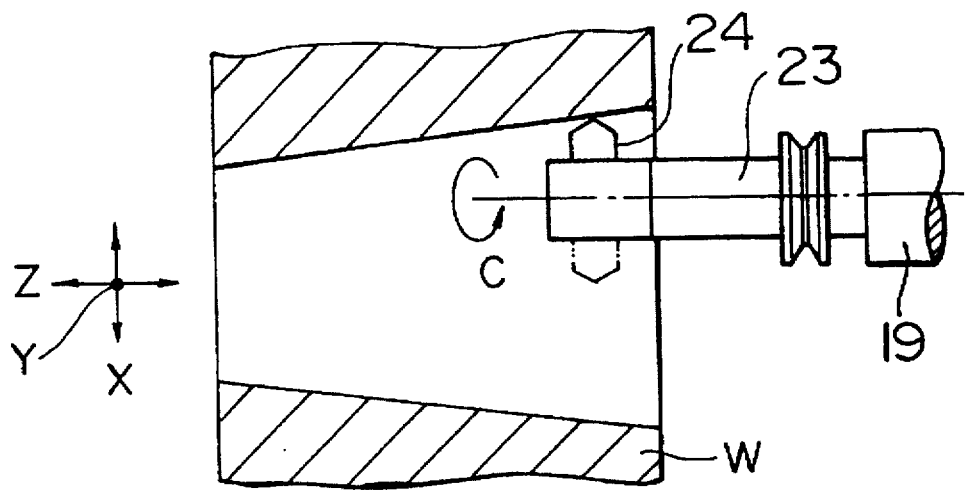
FIG. 6 is an illustrative view showing a conical inner face machining in the first embodiment.
Figure 7:
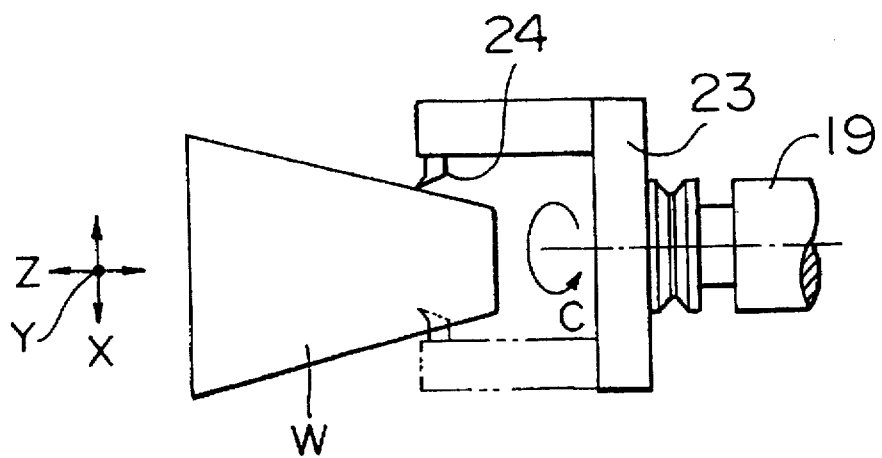
FIG. 7 is an illustrative view showing a conical outer face machining in the first embodiment.
Figure 8:
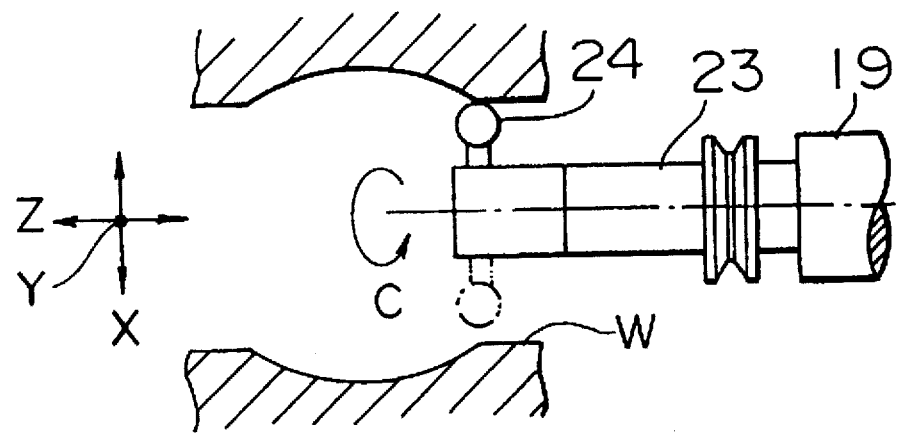
FIG. 8 is an illustrative view showing a spherical inner face machining in the first embodiment.
Figure 9:
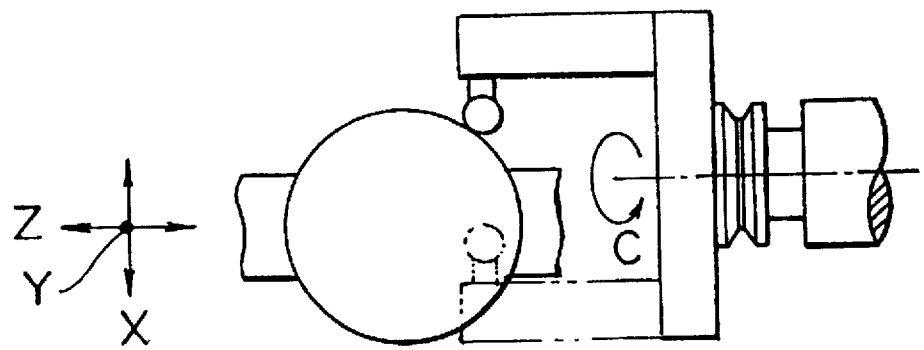
FIG. 9 is an illustrative view showing a spherical outer face machining in the first embodiment.
Figure 10:
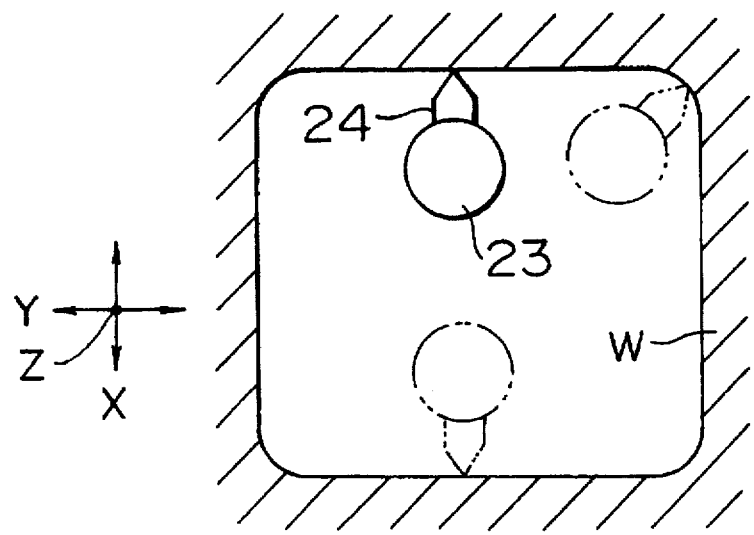
FIG. 10 is an illustrative view showing a polygonal inner face machining in the first embodiment.
Figure 11:
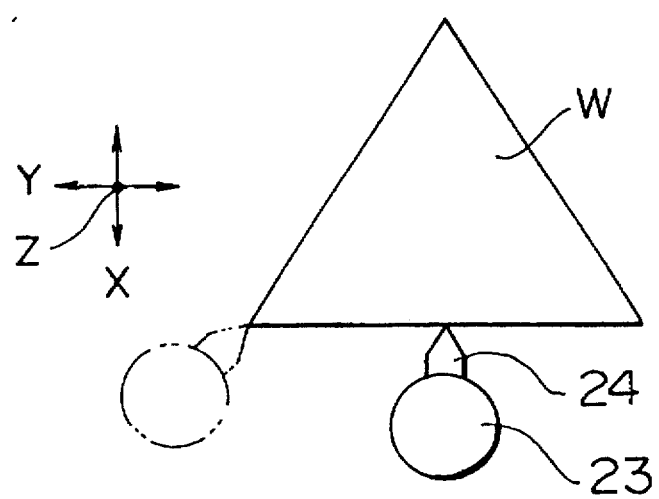
FIG. 11 is an illustrative view showing a polygonal outer face machining in the first embodiment.
Figure 12:
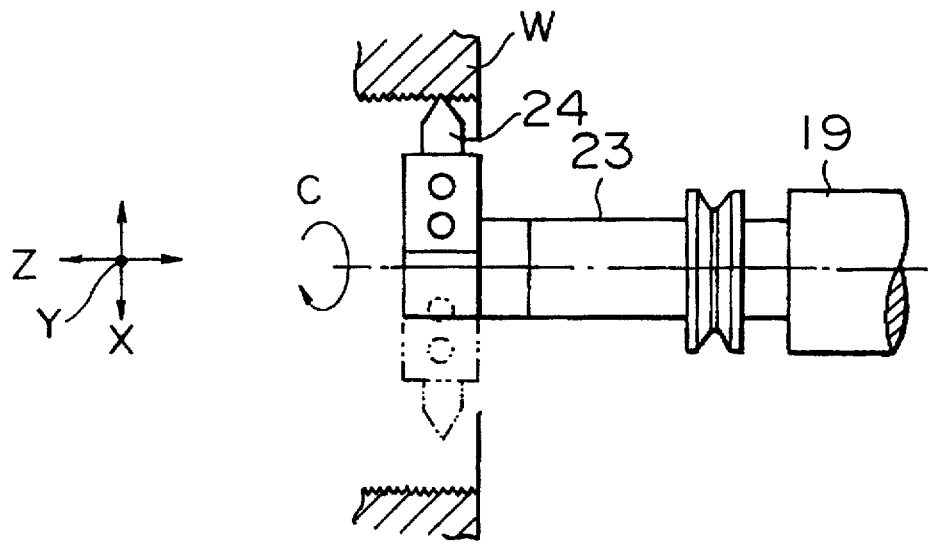
FIG. 12 is an illustrative view showing an internal thread cutting in the first embodiment.
Figure 13:
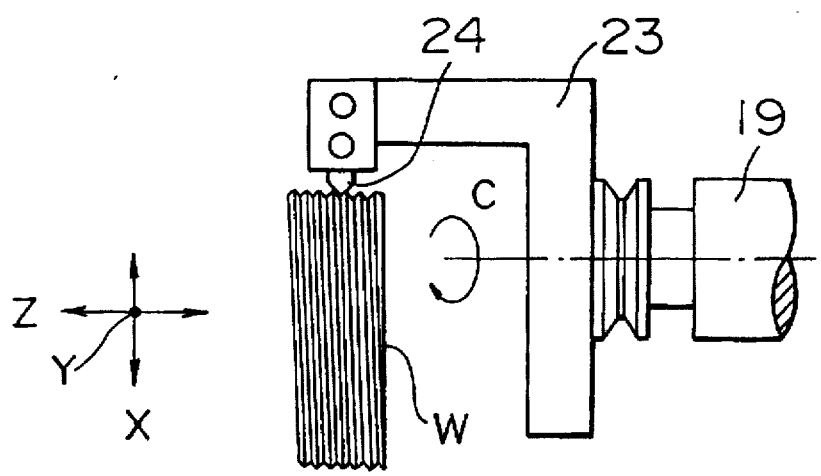
FIG. 13 is an illustrative view showing an external thread cutting in the first embodiment.
Figure 14A:
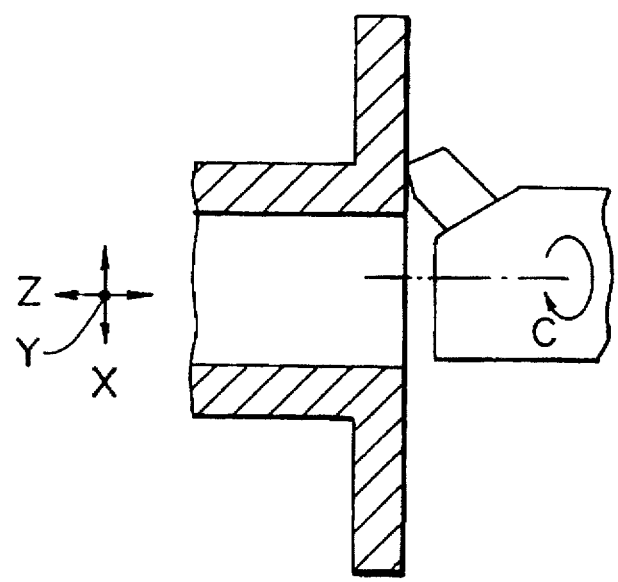
FIGS. 14A and 14B are illustrative views showing in detail a flange face machining in the first embodiment.
Figure 14B:
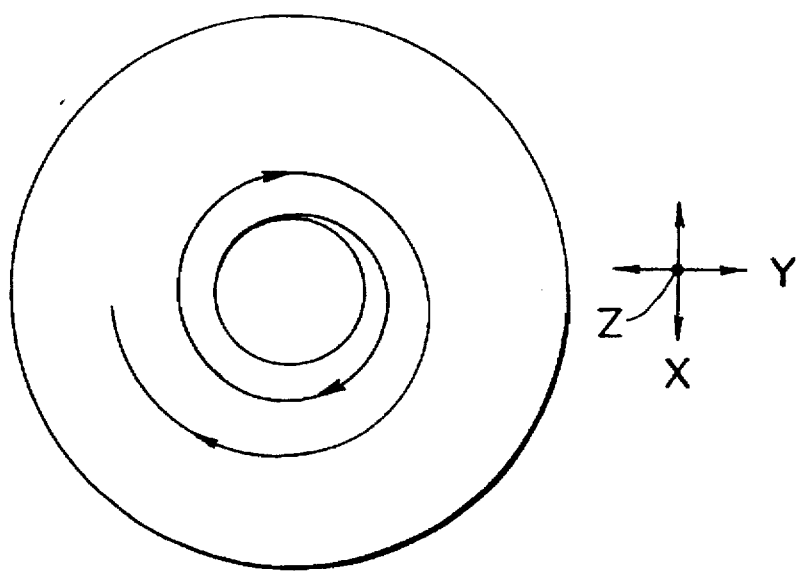

FIG. 4 shows a machining example of cylindrical inner face machining (boring); FIG. 5, that of cylindrical outer peripheral face machining; FIG. 6, that of taper boring (conical inner face machining); FIG. 7, that of taper axis machining (conical outer face machining); FIG. 8, that of spherical inner face machining; FIG. 9, that of spherical outer face machining; FIG. 10, that of polygonal inner face machining; FIG. 11, that of polygonal outer face machining; FIG. 12, that of internal thread cutting; FIG. 13, that of external thread cutting; and FIG. 14, that of flange face machining.

In these figures, reference code 24 designates a tool part of the turning tool 23, and the turning tool radius (radius from the spindle center to the cutting edge of the tool part 24) of the respective turning tool 23 is designated by reference code Tr.

Then, the movement control and synchronous control in the spindle rotational angle control machining method according to the present invention will be explained in detail individually for each machining.

[1] Cylindrical inner/outer face machining

Figure 15:
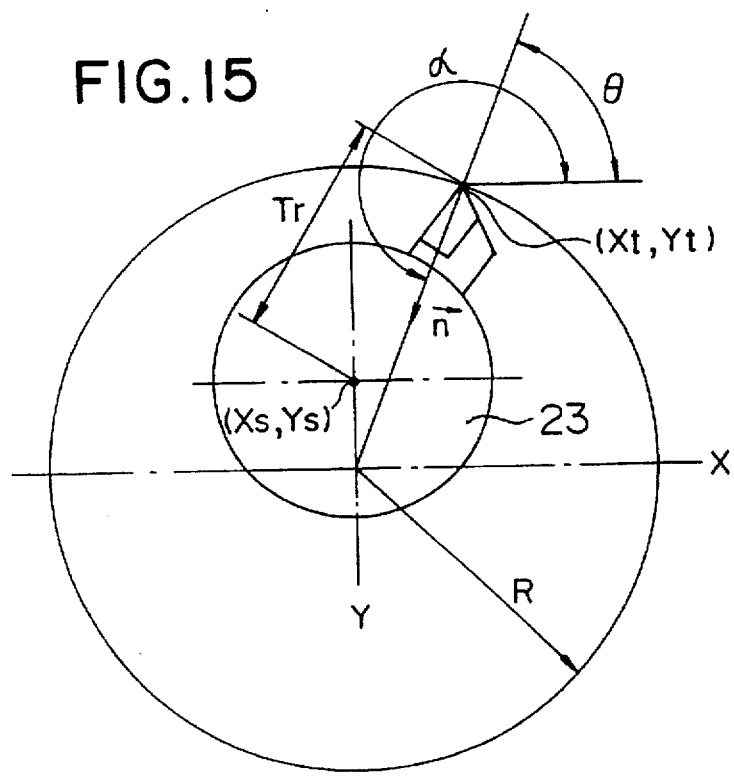
FIG. 15 is an illustrative view showing in detail a cylindrical inner face machining example in the first embodiment.

As shown in FIG. 15, when the radius of the cylindrical face is taken as R; the feed rate in Z-axis direction per revolution, p; and the Z-axis coordinate at Z-axis direction feed start position, $Z_0$; the coordinate positions (Xt, Yt and Zt) of the cutting edge at respective rotational angle positions are given by the following functional equation:

$Xt=R \cos \theta$ $Yt=R \sin \theta$ $Zt=Z_0-(p/2\pi)\theta$

In the cylindrical inner face machining, the normal vector facing outward from machined face n=(nx, ny) in the X-Y plane of the cutting edge locus is expressed by the following equations:

$nx=-\cos \theta$ $ny=-\sin \theta$

Accordingly, the spindle center locus, that is, the spindle center coordinate positions (Xs, Ys, Zs) are expressed by the following equations:

$Xs=Xt+nx \cdot Tr=R \cos \theta-Tr \cos \theta=(R-Tr) \cos \theta$ $Ys=Yt+ny \cdot Tr=R \sin \theta-Tr \sin \theta=(R-Tr) \sin \theta$ $Zs=Zt-Tz$ In this case, by the simultaneous control of two axes X-axis and Y-axis on the basis of the spindle center coordinate positions (Xs, Ys), a mutual circular interpolation motion is performed between the turning tool 23 and the workpiece W, and as the circular interpolation locus, the spindle center locus becomes a true circle.

In the above equations, Tr is a tool radius of the turning tool 23; and Tz is a tool length (an axial length in Z-axis direction from a Z-axis zero point of the spindle 19 to the cutting edge of the tool part 24).

In the cylindrical inner face machining, a spindle rotational angle a taking the X-axis direction as an original line is expressed by the following equation:

$\alpha=\tan^{-1}(ny/nx)=\tan^{-1}(-\sin \theta/-\cos \theta)=\theta+\pi$

With the above-mentioned condition satisfied, the axial control of respective axes of X, Y and Z is performed, and the spindle rotational angle a is synchronously controlled with the axial control, whereby the turning tool 23 faces always the normal with respect to a machined face at the full rotational angle position of the spindle 19, and thus the cylindrical inner face machining of an arbitrary radius R is performed with the tool radius Tr as a minimum radius.

In the cylindrical outer face machining, the normal vector facing outward from machined face n=(nx, ny) in the X-Y plane of the cutting edge locus becomes reverse in direction to the cylindrical inner face machining, and is expressed by the following equations:

$nx=\cos \theta$ $ny=\sin \theta$

Accordingly, the spindle center locus, that is, the spindle center coordinate positions (Xs, Ys, Zs) are expressed by the following equations:

$Xs=Xt+nx \cdot Tr=R \cos \theta+Tr \cos \theta=(R+Tr) \cos \theta$ $Ys=Yt+ny \cdot Tr=R \sin \theta+Tr \sin \theta=(R+Tr) \sin \theta$ $Zs=Zt-Tz$ In the cylindrical outer face machining, a spindle rotational angle α taking the X-axis direction as an original line is expressed by the following equation:

$\alpha=\tan^{-1}(ny/nx)=\tan^{-1}(\sin \theta/\cos \theta)=\theta$

Accordingly, as with the cylindrical inner face machining, the axial control of respective axes X, Y and Z is performed, and the spindle rotational angle α is synchronously controlled with the axial control, whereby in this case, also the turning tool 23 faces always the normal with respect to a machined face at the full rotational angle position of the spindle 19, and thus the cylindrical outer face machining of an arbitrary radius R is performed.

The equations $Xs=(R+Tr) \cos \theta$ and $Ys=(R+Tr) \sin \theta$ become valid in a case where the spindle center Cs is outside the workpiece W as viewed in the Z-axis direction as shown in FIG. 4, while in a case where the spindle center Cs is inside the workpiece W as viewed in the Z-axis direction, the following equations become valid:

$$Xs=(R-Tr)\cos\theta, \quad Ys=(R-Tr)\sin\theta$$

It is sufficient for the internal thread cutting that the synchronous control similar to the cylindrical inner face machining is performed and that the value of Zs=Zt–Tz is set at a proper value according to thread pitch; it is sufficient for the external thread cutting that the synchronous control similar to the cylindrical outer face machining is performed and that the value of Zs=Zt–Tz is set at a proper value according to thread pitch; and in either case, the internal thread or external thread cutting having an arbitrary thread diameter is performed by setting of the R value.

Figure 16:
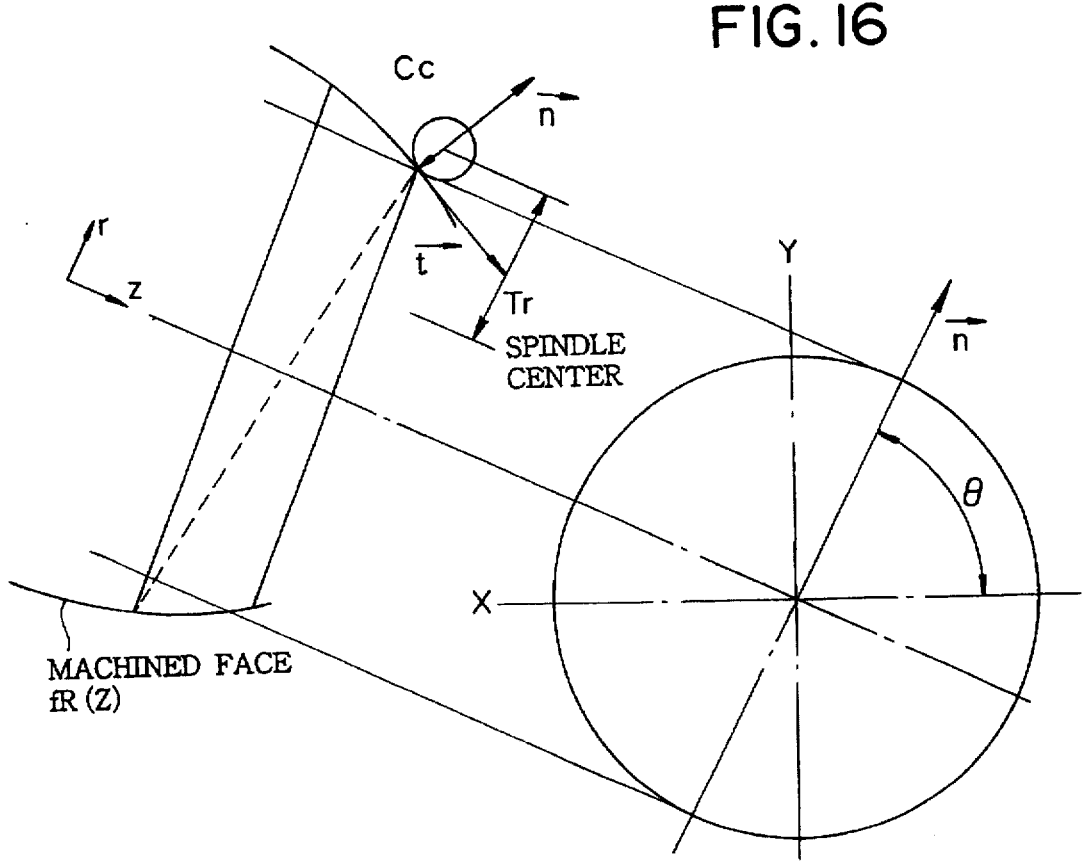
FIG. 16 is an illustrative view showing in detail a conical inner face machining example in the first embodiment.

[2] Machining of Z-axis rotating material having a diameter change in the Z-axis direction, such as taper machining As shown in FIG. 16, assuming that in the machining, the turning tool 23 having an R-shaped cutting edge is used, the cutting edge R radius is taken as Cr; the distance from the cutting edge R center to the spindle center, Tr; the axial length in the Z-axis direction from the Z-axis zero point of the spindle 19 to the cutting edge of the tool part 24, Tz; the machining radius of the machined face, a function fr (z) with respect to Z; the feed rate in the Z-axis direction per revolution, p; and the Z-axis coordinate of the feed start position in the Z-axis direction, $Z_0$.

The locus of the cutting edge, that is, the coordinate positions (Xt, Yt, Zt) of the cutting edge in respective rotational angle positions are given by the following functional equations with an angle θ taking the X-axis direction as an original line as a medium variable:

$$Xt=fr(z)\cos\theta$$

$$Yt=fr(z)\sin\theta$$

$$Zt=Z_0-(p/2\pi)\theta$$

Now, replacing fr (z) with fr (Zt), the following equations are obtained:

$$Xt=fr(Zt)\cos\theta=fr\{Z_0-(p/2\pi)\theta\}\cos\theta$$

$$Yt=fr(Zt)\sin\theta=fr\{Z_0-(p/2\pi)\theta\}\sin\theta$$

When a virtual plane including machining points and Z-axis is taken as a Z-r plane, and an r-axis crossing with Z-axis in the Z-r plane is taken, a tangent line vector t=(tr, tz) of fr (z) in the machining points is expressed by the following equations:

$$tr=dfr(z)/dZ$$

$$tz=1$$

When the above equations are normalized so that the magnitude of the tangent line vector t becomes 1, the equations become as follows:

$$tr=\{dfr(z)/dZ\}/\{\{dfr(z)/dZ\}^2+1\}^{1/2}$$

$$tz=1/\{\{dfr(z)/dZ\}^2+1\}^{1/2}$$

Accordingly, for the outer peripheral face machining, the normal vector facing outward from machined face n=(nr, nz) is expressed by the following equations:

$$nr = tz = 1/\{\{dfr(z)/dZ\}^2+1\}^{1/2}$$

$$nz = -tr$$

$$= -\{dfr(z)/dZ\}/\{\{dfr(z)/dZ\}^2+1\}^{1/2}$$

When these are expressed by the coordinate axes X, Y and Z, the above equations become as follows:

$$nx=nr\cos\theta=1/\{\{dfr(z)/dZ\}^2+1\}^{1/2}\cdot\cos\theta$$

$$ny=nr\sin\theta=1/\{\{dfr(z)/dZ\}^2+1\}^{1/2}\cdot\sin\theta$$

$$nz=-\{dfr(z)/dZ\}/\{\{dfr(z)/dZ\}^2+1\}^{1/2}$$

The locus (Xr, Yr, Zr) of the cutting edge R center is given by the following equations:

$$Xr=Xt+nx\cdot Cc$$

$$Yr=Yt+ny\cdot Cc$$

$$Zr=Zt+nz\cdot Cc$$

Accordingly, the spindle center locus (Xs, Ys, Zs) is expressed by the following equations:

$$\begin{aligned}Xs &= Xr - Tr\cos\theta \\ &= fr\{Z_0-(p/2\pi)\theta\}\cos\theta + \{1/\{\{dfr(z)/dZ\}^2+1\}^{1/2}\cdot\\ &\quad \cos\theta - Tr\cos\theta\end{aligned}$$

$$\begin{aligned}Ys &= Yr - Tr\sin\theta \\ &= fr\{Z_0-(p/2\pi)\theta\}\sin\theta + \{1/\{\{dfr(z)/dZ\}^2+1\}^{1/2}\cdot\\ &\quad \sin\theta - Tr\sin\theta\end{aligned}$$

$$\begin{aligned}Zs &= Zr - Tz \\ &= Z_0-(p/2\pi)\theta - \{dfr(z)/dZ\}/\{\{dfr(z)/dZ\}^2+1\}^{1/2}\cdot\\ &\quad Cc - Tz\end{aligned}$$

In this case, also, where the spindle center Cs is inside the workpiece W as viewed in the Z-axis direction, the equations Xs=Xr–Tr cosθ and Ys=Yr–Tr sin θ are valid, while where the spindle center Cs is outside the workpiece W as viewed in the Z-axis direction, the equations Xs=Xr+Tr cosθ and Ys=Yr+Tr sinθ are valid.

The spindle rotational angle a is expressed by the following equation:

$$\begin{aligned}\alpha &= \tan^{-1}(ny/nx) \\ &= \tan^{-1}[\{1/\{\{dfr(z)/dZ\}^2+1\}^{1/2}\cdot\sin\theta/\\ &\quad \{1/\{\{dfr(z)/dZ\}^2+1\}^{1/2}\cdot\cos\theta\}]=\theta\end{aligned}$$

By the control of the spindle rotational angle α, the turning tool 23 becomes faced to the normal with respect to the machined face, and the cutting edge angle of the turning tool 23 to the workpiece W is kept at a required value at the full rotational angle position of the spindle 19.

For the inner peripheral face machining, the direction of the normal vector facing outward n in the above-mentioned outer peripheral face machining becomes reverse, and thus the spindle rotational angle α is made α=θ+π, whereby the turning tool 23 becomes faced to the normal with respect to the machined face.

It is sufficient that the inner and outer peripheral face machining other than above is performed in a similar procedure.

Where the above-mentioned machining is for a conical face, fr(z) is defined by the following equation:

$fr(z)=R_0+a \cdot Z$ where $R_0$ is a radius at the machining start position, and a is a radius increasing rate in the Z-axis direction.

Where the above-mentioned machining is for a spherical face, fr(z) is defined by the following equation:

$fr(z)=(R^2+Z^2)^{1/2}$

From the above-mentioned explanation, the requirement in all machining including the machining of an arbitrary geometry by using the turning tool 23 having an R-shaped cutting edge can be summarized as follows:

That is, when θ is taken as an parameter, the machining point locus (Xt, Yt, Zt) and the machined face outward normal locus (nx, ny, nz) are expressed as a function of θ.

(a) Locus of cutting edge R center (Xr, Yr, Zr)

$Xr=Xt+nx \cdot Cc$ $Yr=Yt+ny \cdot Cc$ $Zr=Zt+nz \cdot Cc$ (b) Spindle rotational angle a to make the turning tool 23 faced to normal with respect to machined face $\alpha=\tan^{-1}(ny/nx)$ (c) Locus of spindle center (Xs, Ys, Zs)

$Xs=Xr-Tr \cos \theta$ $Ys=Yr-Tr \sin \theta$ $Zs=Zr-Tz$

In this case, also, where the spindle center Cs is inside the workpiece W as viewed in the Z-axis direction, the equations $Xs=Xr-Tr \cos\theta$ and $Ys=Yr-Tr \sin\theta$ are valid, while where the spindle center Cs is outside the workpiece W as viewed in the Z-axis direction, the equations $Xs=Xr+Tr \cos\theta$ and $Ys=Yr+Tr \sin\theta$ are valid.

[3] Flange face machining

Figure 17:
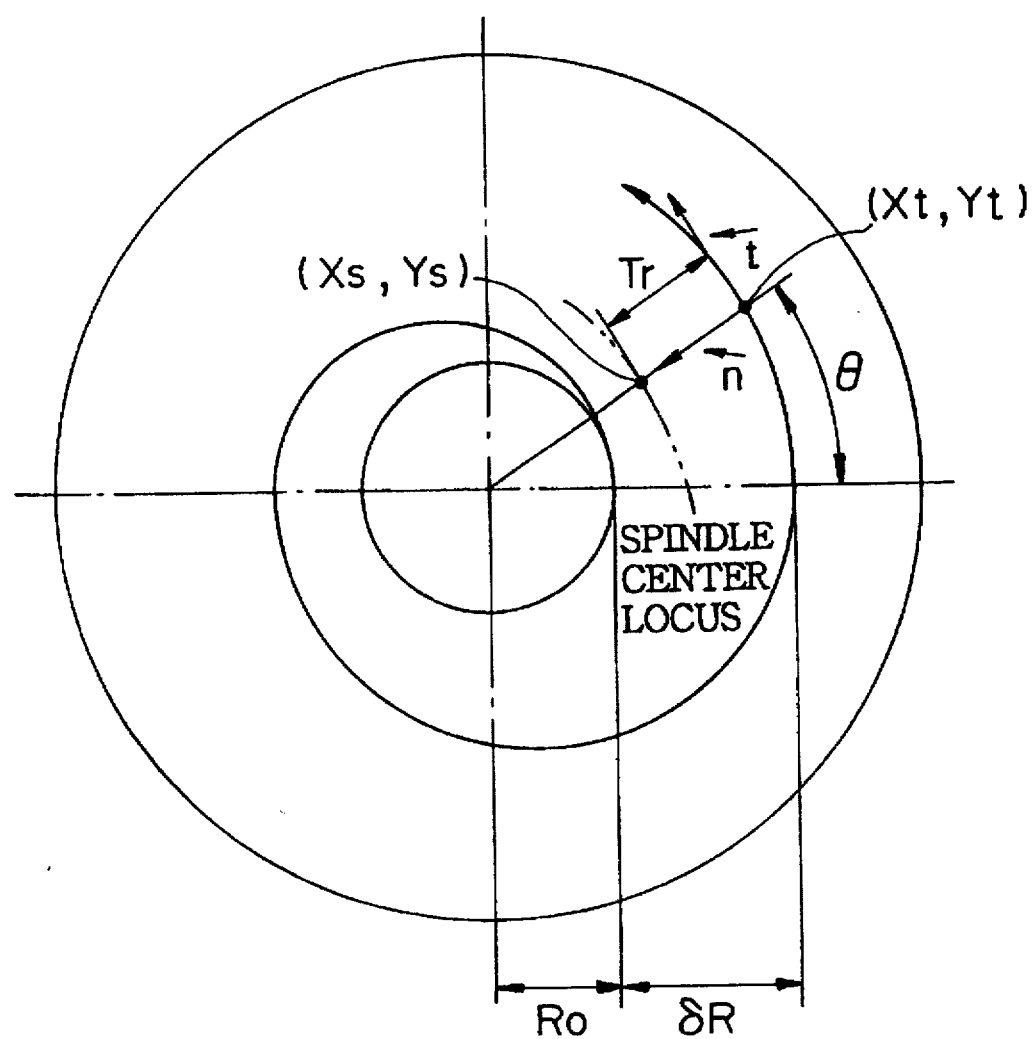
FIG. 17 is an illustrative view showing in detail a flange face machining in the first embodiment.

As shown in FIG. 17, when the machining radius at machining start is taken as $R_0$, and the radius increasing rate per revolution of tool is taken as δr, the coordinate positions (Xt, Yt, Zt) of the cutting edge of respective rotational angle positions of the cutting edge, that is, the locus is given, with the rotational angle θ as a function, by the following equations:

$Xt=\{R_0+(\delta r/2 \pi)\} \cos \theta$ $Yt=\{R_0+(\delta r/2 \pi)\} \sin \theta$ Now, δr/2 π is expressed in dR hereinafter.

The tangent line vector t=(tx, ty) of the cutting edge locus is expressed by the following equations:

$tx=\delta Xt/\delta\theta=dR \cos \theta-(R_0+dR\theta) \sin \theta$ $ty=\delta Yt/\delta\theta=dR \sin \theta-(R_0+dR\theta) \cos \theta$ Since the normal vector facing center n=(nx, ny) is obtained by turning the tangent line vector t by 90°, the normal vector facing center is expressed by the following equations:

$nx=-ty=-\{dR \sin \theta-(R_0+dR\theta) \cos \theta\}$ $ny=tx=dR \cos \theta-(R_0+dR\theta) \sin \theta$ When the above equations are normalized so that the magnitude of the tangent line vector t becomes 1, the equations become as follows:

$$nx' = nx/(nx^2+ny^2)^{1/2}$$
$$= -\{dR \sin\theta - (R_0+dR\theta)\cos\theta\}/(dR^2+R_0^2+2dR \cdot R_0 \cdot \theta + dR^2 \cdot \theta^2)^{1/2}$$

$$ny' = ny/(nx^2+ny^2)^{1/2}$$
$$= \{dR \cos\theta - (R_0+dR\theta)\sin\theta\}/(dR^2+R_0^2+2dR \cdot R_0 \cdot \theta + dR^2 \cdot \theta^2)^{1/2}$$

When the distance from the spindle center to the cutting edge is taken as Tr, the locus (Xs, Ys) of the spindle center is expressed by the following equations:

$$Xs = Xt+nx' \cdot Tr$$
$$= (R_0+dR\theta)\cos\theta +$$
$$[-\{dR \sin\theta - (R_0+dR\theta)\cos\theta\}/$$
$$(dR^2+R_0^2+2dR \cdot R_0 \cdot \theta + dR^2 \cdot \theta^2)^{1/2}]Tr$$

$$Ys = Yt+ny' \cdot Tr$$
$$= (R_0+dR\theta)\sin\theta +$$
$$[\{dR \cos\theta - (R_0+dR\theta)\sin\theta\}/$$
$$(dR^2+R_0^2+2dR \cdot R_0 \cdot \theta + dR^2 \cdot \theta^2)^{1/2}]Tr$$

The spindle rotational angle a is expressed by the following equation $\alpha=\tan^{-1}(-ny/-nx)$ This causes the turning tool 23 to face the normal of the cutting edge locus at the full rotational angle position, whereby the flange (record trace) machining by a tool trace is performed.

In the above-mentioned machining, a series of machining pass data determined by the spindle center coordinate positions (Xs, Ys, Zs), that is, the command data of respective axes X, Y and Z can be automatically produced through an NC program automatic producer, by giving data of raw material bore size, finishing diameter dimension, machining pitch, bore depth and maximum machining allowance as parameters to the NC program automatic producer.

In this case, it is sufficient that the NC program automatic producer calculates the spindle center coordinate positions (Xs, Ys, Zs) according to the above-mentioned calculating equations previously defined depending on the kinds of machining, and with the calculated positions, produces a series of machining pass data, that is, the command data of respective axes X, Y and Z.

Figure 18:
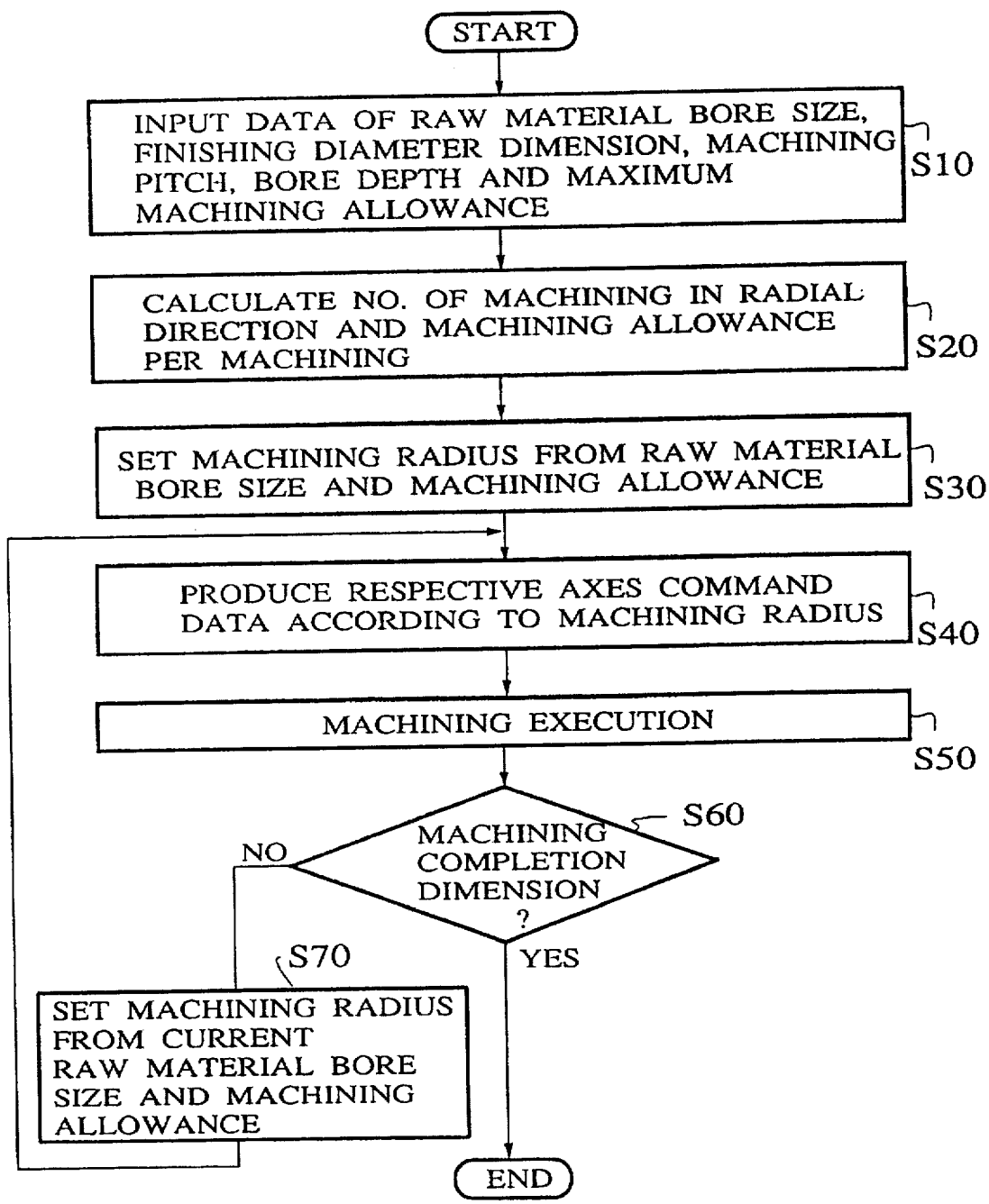
FIG. 18 is a flow chart showing a series of procedures in a case where boring and thread boring are performed by the spindle rotational angle control machining method of the first embodiment.

Then, with reference to FIG. 18, there will be explained a series of procedures in a case where boring and tapped hole machining are performed by the spindle rotational angle control machining method according to the present invention.

First, the data of raw material bore size, finishing diameter dimension, machining pitch, bore depth and maximum machining allowance are inputted into the NC program automatic producer (step 10).

With the data input, the NC program automatic producer calculates both the number of machining in the radius direction and the machining allowance per machining (step 20).

Then, the machining radius R is determined by the raw material bore size and the machining allowance (step 30);

and on the basis of the machining radius R, the spindle center coordinate positions (Xs, Ys, Zs) are calculated by the calculating equations $Xs=(R-Tr)\cos\theta$, $Ys=(R-Tr)\sin\theta$ and $Zs=Zt-Tz$, respectively, to automatically produce a series of machining pass data, that is, the command data of respective axes X, Y and Z (step 40).

When the command data of respective axes X, Y and Z have been produced, an NC machining tool is operated according to the respective axes command data machining pass data; the turning tool 23 and the workpiece W are relatively dislocated by the control of axes X, Y and Z along a plane perpendicular to the rotation axial line of the spindle 19, thereby allowing a mutual circular interpolation motion between the turning tool 23 and the workpiece W to be performed; and the rotational angle of the spindle 19 is synchronously controlled with a required interrelation to the axial control, whereby the direction of the cutting edge of the turning tool 23 to the machined face of the workpiece W is kept at a required direction, and then boring with a specified depth, and tapping hole machining are performed (step 50).

Where the one machining of boring and tapping hole machining causes the dimension to reach a machining completion dimension, the machining is completed (step 60, YES), while where the one machining of boring and tapping hole machining causes the dimension not to reach a machining completion dimension (step 60, NO), the machining radius R is again determined by the current machining diameter and the machining allowance (step 70), and the procedure returns to step 40, at which on the basis of the machining radius R, again the spindle center coordinate positions (Xs, Ys, Zs) are calculated by the calculating equations $Xs=(R-Tr)\cos\theta$, $Ys=(R-Tr)\sin\theta$ and $Zs=Zt-Tz$, respectively, to automatically produce a series of machining pass data, that is, the command data of respective axes X, Y and Z, and then the boring and tapped hole machining at step 50 are again performed.

Figure 19:
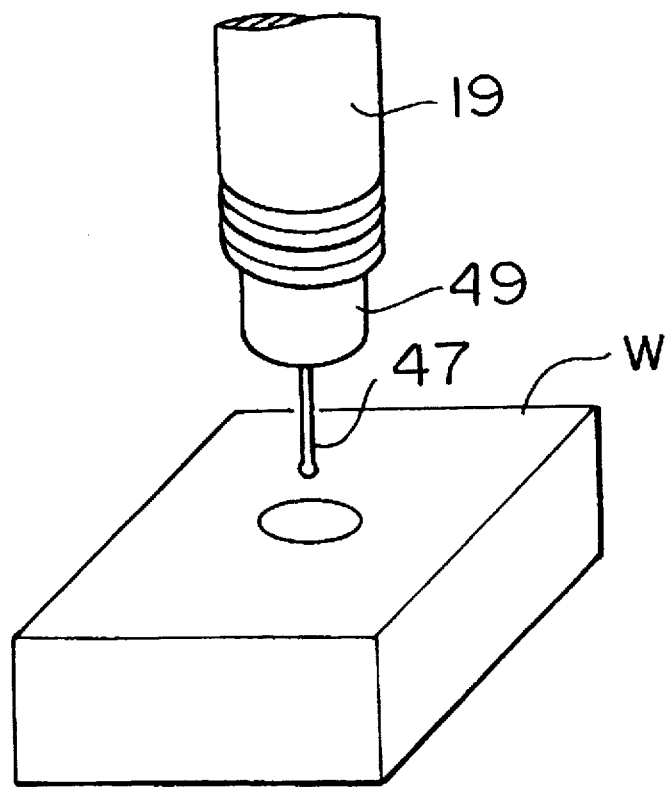
FIG. 19 is a perspective view showing an automatic measurement of a workpiece in the first embodiment.

Also, in the spindle rotational angle control machining method according to the present invention, as shown in FIG. 19, the spindle 19 is mounted with an automatic measuring instrument 49 using a touch probe 47 instead of the turning-tool 23; with the automatic measuring instrument 49, the machined part geometry of the workpiece W, for example, the bore size is automatically measured; with the measured value (raw material dimension), a machining start dimension is determined; according to the machining start dimension, a relative displacement of the spindle 19 to the workpiece W, in this case, the radius of the above-mentioned interpolation locus L is determined, thereby allowing the machining level by the turning tool 23 to be variably set.

Further, midway through machining, for example, at roughing completion, the bore size of the workpiece W is automatically measured by the automatic measuring instrument 49; with the measured value, the machining dimension required for finishing is automatically determined; according to the machining dimension, a relative displacement of the spindle 19 to the workpiece W, that is, the radius of the above-mentioned interpolation locus L is determined, thereby allowing the finishing level by the turning tool 23 to be variably set.

Figure 20:
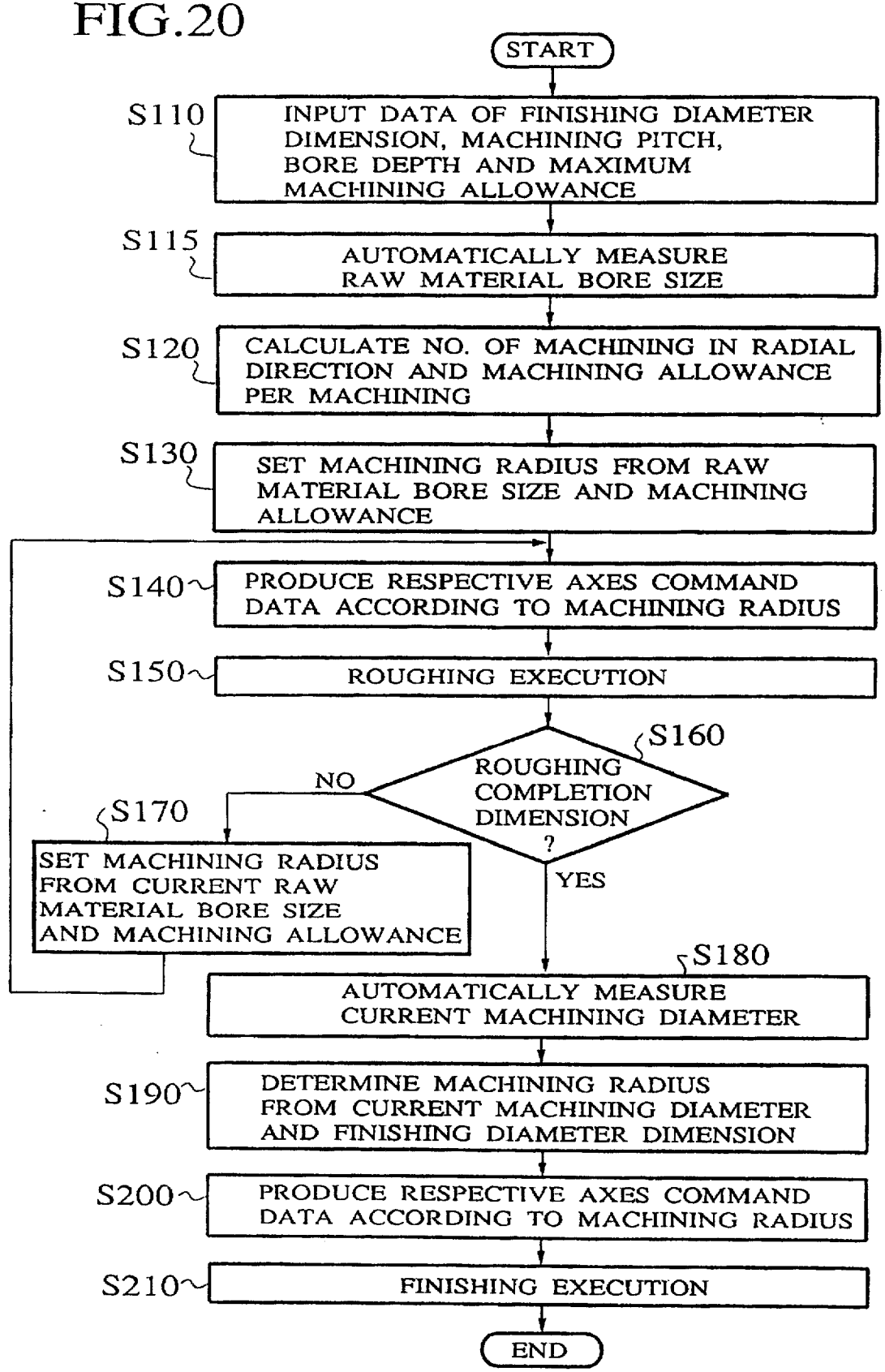
FIG. 20 is a flow chart showing a series of procedures in a case where boring and thread boring are performed by the automatic measurement in the first embodiment.

Then, with reference to FIG. 20, there will be explained a series of procedures in a case where boring and tapped hole machining are performed by automatic measurement.

In this case, the data of finishing diameter dimension, machining pitch, bore depth and maximum machining allowance are inputted into the NC program automatic producer (step 110).

Then, raw material bore size is automatically measured and the measured value is inputted into the NC program automatic producer (step 115).

With these data input, the NC program automatic producer calculates both the number of machining in the radius direction and the machining allowance per machining (step 120).

Then, the machining radius R is determined by the raw material bore size and the machining allowance (step 130); and on the basis of the machining radius R, the spindle center coordinate positions (Xs, Ys, Zs) are calculated by the calculating equations $Xs=(R-Tr)\cos\theta$, $Ys=(R-Tr)\sin\theta$ and $Zs=Zt-Tz$, respectively, to automatically produce a series of machining pass data, that is, the command data of respective axes X, Y and Z (step 140).

When the command data of respective axes X, Y and Z have been produced, an NC machining tool is operated according to the respective axes command data machining pass data; the turning tool 23 and the workpiece W are relatively dislocated by the control of axes X, Y and Z along a plane perpendicular to the rotation axial line of the spindle 19, thereby allowing a mutual circular interpolation motion between the turning tool 23 and the workpiece W to be performed; and the rotational angle of the spindle 19 is synchronously controlled with a required interrelation to the axial control, whereby the direction of the cutting edge of the turning tool 23 to the machined face of the workpiece W is kept at a required direction, and then the roughing of a bore with a specified depth, and a tapping hole is performed (step 150).

Where the one machining of boring and tapping hole machining causes the dimension not to reach a roughing completion dimension (step 160, NO), with the current machined diameter and machining allowance, the machining radius R is determined (step 170); and on the basis of the machining radius R, again the spindle center coordinate positions (Xs, Ys, Zs) are calculated by the calculating equations $Xs=(R-Tr)\cos\theta$, $Ys=(R-Tr)\sin\theta$ and $Zs=Zt-Tz$, respectively, to automatically produce a series of machining pass data, that is, the command data of respective axes X, Y and Z, and then the roughing of a bore with a specified depth, and a tapping hole at step 50 is again performed.

Where the machined diameter reaches a roughing completion dimension (step 160, YES), then the current machined diameter is automatically measured (step 180); with the measured value, an error of the tool diameter of the turning tool 23 is detected, and the machining radius R including a correction value for compensating the tool diameter error is determined so that the finished diameter dimension can be obtained despite of the tool diameter error (step 190); and on the basis of the machining radius R, again the spindle center coordinate positions (Xs, Ys, Zs) are calculated by the calculating equations $Xs=(R-Tr)\cos\theta$, $Ys=(R-Tr)\sin\theta$ and $Zs=Zt-Tz$, respectively, to automatically produce a series of machining pass data, that is, the command data of respective axes X, Y and Z (step 200).

When the command data of respective axes X, Y and Z have been produced, an NC machining tool is operated according to the respective axes command data machining pass data; the turning tool 23 and the workpiece W are relatively dislocated by the control of axes X, Y and Z along a plane perpendicular to the rotation axial line of the spindle 19, thereby allowing a mutual circular interpolation motion between the turning tool 23 and the workpiece W to be performed; and the rotational angle of the spindle 19 is synchronously controlled with a required interrelation to the axial control, whereby the direction of the cutting edge of the turning tool 23 to the machined face of the workpiece W is kept at a required direction, and then the finishing of a bore with a specified depth, and a tapping hole is performed (step 210).

Figure 21:
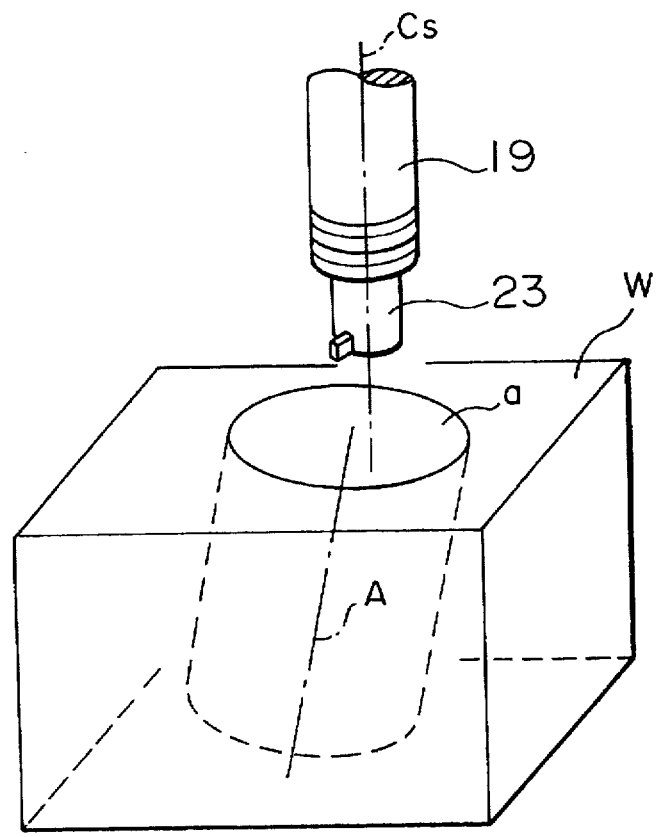
FIG. 21 is a perspective view showing a state in which the machining axial line of a workpiece is inclined to the center axial line of a spindle in the first embodiment.
Figure 22:
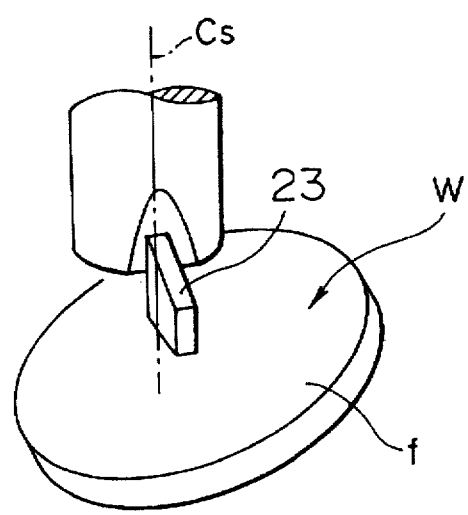
FIG. 22 is a perspective view showing a state in which the machining face of a workpiece is inclined to the center axial line of a spindle in the first embodiment.

Also, in the spindle rotational angle control machining method according to the present invention, as illustrated in FIGS. 21 and 22, according to the degree of inclination of a machining axial line A or a machined face f of the workpiece W to the center axial line of the spindle 19, the axial control level of the relative displacement of the spindle 19 to the workpiece W is corrected, whereby an inclination component of the machining axial line or machined face of the workpiece W to the center axial line of the spindle 19 is given to the above-mentioned mutual interpolation motion between the spindle 19 and the workpiece W, and then an inner/outer peripheral face or an inclined flange face whose machining axial line is in lined to the spindle center axial line can be machined.

A case where the inclined machining is applied to the boring of a true circle will be explained in detail.

Figure 23:
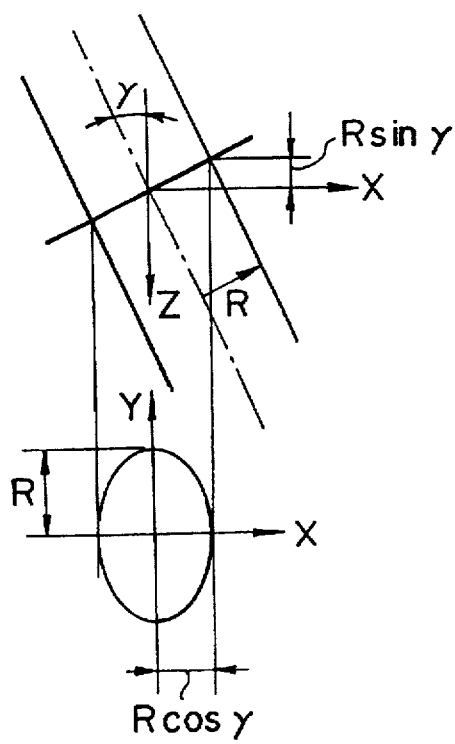
FIG. 23 is an illustrative view in a case where a cutting edge is allowed to rotate on a plane perpendicular to the axial line of a machined bore in the first embodiment.
Figure 24:
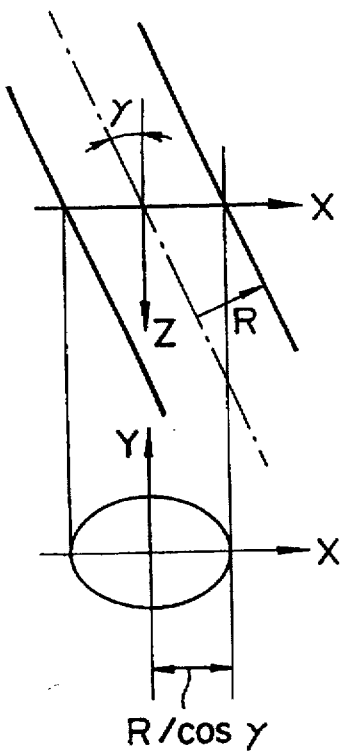
FIG. 24 is an illustrative view in a case where a cutting edge is allowed to rotate on a plane perpendicular to the center axial line of a spindle in the first embodiment.
Figure 25:
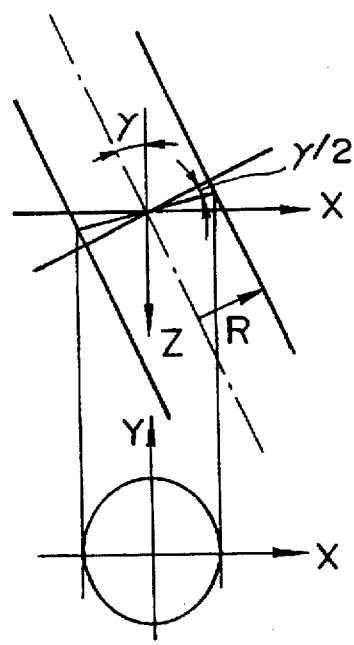
FIG. 25 is an illustrative view in a case where a cutting edge is allowed to rotate on a plane existing at an intermediate position between a plane perpendicular to the axial line of a machined bore and a plane perpendicular to the center axial line of a spindle in the first embodiment.

The inclined machining may be considered to have three cases, that is, a case where the cutting edge is rotated on a plane perpendicular to the axial line of a machined bore as shown in FIG. 23, a case where the cutting edge is rotated on a plane perpendicular to the center axial line (Z-axis) of the spindle 19 as shown in FIG. 24, and a case where the cutting edge is rotated on a plane existing at an intermediate position between both as shown in FIG. 25. For each case, first a case where the machining axial line A of the workpiece W is inclined only on the X and Y planes will be explained hereinafter. Now, here, the inclination angle of the machining axial line A of the workpiece W in the X-axis direction to Z-axis is defined as.

[1] Where cutting edge is rotated on a plane perpendicular to axial line A of machined bore:

In this case, the locus of the cutting edge becomes an ellipse having a major axis in the Y-axis direction as viewed on the X and Y coordinate planes, and the coordinate values (Xt, Yt, Zt) of the cutting edge are expressed, with the angle θ having an original line in the X-axis direction taken as a medium variable, by the following equations:

$$Xt = R \cos\gamma \cdot \cos\theta$$

$$Yt = R \sin\theta$$

$$Zt = -R \sin\gamma \cdot \cos\theta$$

Where the cutting edge is allowed to spirally move at a pitch p in the Z-axis direction, the coordinate values (Xt, Yt, Zt) of the cutting edge are expressed by the following equations. Now, i, j and k designate axial vector components in X, Y and Z axial directions of a machined bore, respectively, and with the precondition that the machining axial line A of the workpiece W is inclined only on the X and Y planes, j becomes 0.

$$Xt = R \cos\gamma \cdot \cos\theta + i(p/2\pi)\theta$$

$$Yt = R \sin\theta + j(p/2\pi)\theta = R \sin\theta$$

$$Zt = -R \sin\gamma \cdot \cos\theta + k(p/2\pi)\theta$$

[2] Where cutting edge is rotated on a plane perpendicular to Z-axis:

In this case, the locus of the cutting edge becomes an ellipse having a major axis in the X-axis direction as viewed on the X and Y coordinate planes, and the coordinate values (Xt, Yt, Zt) of the cutting edge are expressed, with the angle θ having an original line in the X-axis direction taken as a medium variable, by the following equations:

$$Xt = R/\cos\gamma \cdot \cos\theta$$

$$Yt = R \sin\theta$$

$$Zt = 0$$

Where the cutting edge is allowed to spirally move at a pitch p in the Z-axis direction, the coordinate values (Xt, Yt, Zt) of the cutting edge are expressed by the following equations:

$$Xt = R/\cos\gamma \cdot \cos\theta + i(p/2\pi)\theta$$

$$Yt = R \sin\theta + j(p/2\pi)\theta = R \sin\theta$$

$$Zt = k(p/2\pi)\theta$$

[3] Where cutting edge is rotated on a plane existing at an intermediate position between a plane perpendicular to the axial line of a machined bore and a plane perpendicular to Z-axis:

In this case, the locus of the cutting edge becomes a true circle as viewed on the X and Y coordinate planes, and the coordinate values (Xt, Yt, Zt) of the cutting edge are expressed, with the angle θ having an original line in the X-axis direction taken as a medium variable, by the following equations:

$$Xt = R \cos\theta$$

$$Yt = R \sin\theta$$

$$Zt = -R \tan(\gamma/2) \cdot \cos\theta$$

Where the cutting edge is allowed to spirally move at a pitch p in the Z-axis direction, the coordinate values (Xt, Yt, Zt) of the cutting edge are expressed by the following equations:

$$Xt = R \cos\theta + i(p/2\pi)\theta$$

$$Yt = R \sin\theta + j(p/2\pi)\theta = R \sin\theta$$

$$Zt = -R \tan(\gamma/2) \cdot \cos\theta + k(p/2\pi)\theta$$

Since the inclined angle γ expressed in $\cos^{-1}k$, cosγ can be replaced with k.

Then, a case where the machining axial line A of the workpiece W is inclined on the X, Y and Z planes, that is, where the machining axial line A is inclined both in the X-axis and the Y-axis directions to Z-axis will be discussed.

Figure 26:
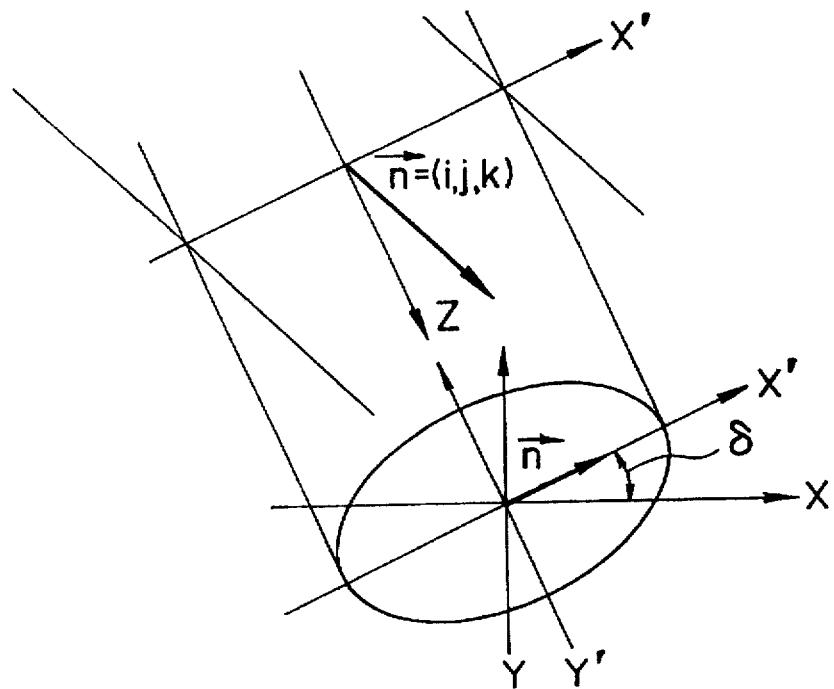
FIG. 26 is an illustrative view showing a coordinate system in a case where the machining axial line of a workpiece is inclined on X, Y and Z planes in the first embodiment.

As shown in FIG. 26, taking the major axis direction of the ellipse as X' and the minor axis direction as Y' both of which are crossing lines of the X and Y coordinate plane switch the cross section of a machined face, considering the coordinate system consisting of X', Y' and Z, and by converting the X-Y-Z coordinate system to the X'-Y'-Z coordinate system, this case can be handled equally to the case where the machining axial line A of the workpiece W is inclined only on the X and Y planes as described above.

Assuming that the X'-Y'-Z coordinate system is rotationally displaced by δ around Z-axis with respect to the X-Y-Z coordinate system, δ becomes $\tan^{-1}(J/i)$, so that a coordinate system conversion can be executed as follows:

$$(X, Y) = (X', Y') \begin{pmatrix} \cos\delta \cdot \sin\delta \\ \sin\delta \cdot \cos\delta \end{pmatrix}$$

Accordingly, in this case, the locus which the cutting edge is to draw becomes as follows:

[1] Where cutting edge is rotated on a plane perpendicular to the axial line of a machined bore:

In this case, the coordinate values (X't, Y't, Zt) of the cutting edge on the X' and Y' coordinate planes are expressed, with the angle $\theta$ having an original line in the X'-axis direction taken as a medium variable, by the following equations:

$X't = R \cos\delta \cdot \cos\theta$ $Y't = R \sin\theta$ $Zt = -R \sin\theta \cdot \cos\theta$ converting in coordinate the above to the X-Y-Z coordinate system, the coordinate values (Xt, Yt, Zt) of the cutting edge are expressed by the following equations:

$Xt = R \cos\gamma \cdot \cos\delta \cdot \cos\delta - R \cdot \sin\theta \cdot \sin\delta$ $Yt = R \cos\gamma \cdot \cos\theta \cdot \sin\delta + R \cdot \sin\theta \cdot \cos\delta$ $Zt = -R \sin\gamma \cdot \cos\theta$ Where the cutting edge is allowed to spirally move at a pitch p in the Z-axis direction, the coordinate values (Xt, Yt, Zt) of the cutting edge are expressed by the following equations:

$Xt = R \cos\gamma \cdot \cos\delta \cdot \cos\delta - R \cdot \sin\theta \cdot \sin\delta + i(p/2\pi)\theta$ $Yt = R \cos\gamma \cdot \cos\theta \cdot \sin\delta + R \cdot \sin\theta \cdot \cos\delta + j(p/2\pi)\theta$ $Zt = -R \sin\gamma \cdot \cos\theta + k(p/2\pi)\theta$

[2] Where cutting edge is rotated on a plane perpendicular to Z-axis:

In this case, the coordinate values (X't, Y't, Zt) of the cutting edge on the X' and Y' coordinate planes are expressed, with the angle $\theta$ having an original line in the X'-axis direction taken as a medium variable, by the following equations:

$X't = R/\cos\gamma \cdot \cos\theta$ $Y't = R \sin\theta$ $Zt = 0$ converting in coordinate the above to the X-Y-Z coordinate system, the coordinate values (Xt, Yt, Zt) of the cutting edge are expressed by the following equations:

$Xt = R/\cos\gamma \cdot \cos\theta \cdot \cos\delta - R \cdot \sin\theta \cdot \sin\delta$ $Yt = R/\cos\gamma \cdot \cos\theta \cdot \sin\delta + R \cdot \sin\theta \cdot \cos\delta$ $Zt = 0$ Where the cutting edge is allowed to spirally move at a pitch p in the Z-axis direction, the coordinate values (Xt, Yt, Zt) of the cutting edge are expressed by the following equations:

$Xt = R/\cos\gamma \cdot \cos\theta \cdot \cos\delta - R \cdot \sin\theta \cdot \sin\delta + i(p/2\pi)\theta$ $Yt = R/\cos\gamma \cdot \cos\theta \cdot \sin\delta + R \cdot \sin\theta \cdot \cos\delta + j(p/2\pi)\theta$ $Zt = k(p/2\pi)\theta$

[3] Where cutting edge is rotated on a plane existing at an intermediate position between a plane perpendicular to the axial line of a machined bore and a plane perpendicular to Z-axis:

In this case, the coordinate values (X't, Y't, Zt) of the cutting edge on the X' and Y' coordinate planes are expressed, with the angle $\theta$ having an original line in the X'-axis direction taken as a medium variable, by the following equations:

$X't = R \cos\gamma$ $Y't = R \sin\theta$ $Zt = -R \tan(\gamma/2) \cdot \cos\theta$ converting in coordinate the above to the X-Y-Z coordinate system, the coordinate values (Xt, Yt, Zt) of the cutting edge are expressed by the following equations:

$Xt = R \cos\theta \cdot \cos\delta - R \cdot \sin\theta \cdot \sin\delta$ $Yt = R \cos\theta \cdot \sin\delta + R \sin\theta \cdot \cos\delta$ $Zt = -R \tan(\gamma/2) \cdot \cos\theta$ Where the cutting edge is allowed to spirally move at a pitch p in the Z-axis direction, the coordinate values (Xt, Yt, Zt) of the cutting edge are expressed by the following equations:

$$\begin{aligned} Xt &= R\cos\theta \cdot \cos\delta - R \cdot \sin\theta \cdot \sin\delta + i(p/2\pi)\theta \\ &= R\cos(\theta + \delta) + i(p/2\pi)\theta \\ Yt &= R\cos\theta \cdot \sin\delta + R \cdot \sin\theta \cdot \cos\delta + j(p/2\pi)\theta \\ &= R\sin(\theta + \delta) + j(p/2\pi)\theta \\ Zt &= -R\tan(\gamma/2) \cdot \cos\theta + k(p/2\pi)\theta \end{aligned}$$

Figure 27:
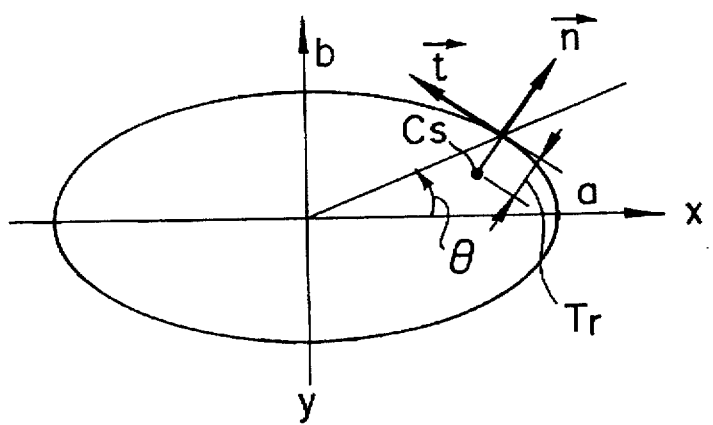
FIG. 27 is an illustrative view to help explain the locus of a spindle center in a case where a cutting edge performs machining while drawing an elliptical locus in the first embodiment.

Then, with reference to FIG. 27, the locus of the spindle center in a case where the cutting edge performs machining in a manner to draw an elliptical locus will be explained. In FIG. 27, an ellipse having a major axis in the X-axis direction is assumed; and the major axis of the ellipse is taken as a, and the minor axis as b.

The tangent line vector t at the positions (X=a $\cos\theta$, Y=b $\sin\theta$) becomes as follows:

$tX = dX/d\theta = -a \sin\theta$ $tY = dY/d\theta = +b \cos\theta$

Now, when the above equations are normalized so that the magnitude of the tangent line vector t becomes 1, the equations become as follows:

$tX = \{-a/(a^2 \sin^2\theta + b^2 \cos^2\theta)^{1/2}\} \sin\theta$ $tY = \{b/(a^2 \sin^2\theta + b^2 \cos^2\theta)^{1/2}\} \cos\theta$ Accordingly, the normal vector becomes as follows:

$nX = tY = \{b/(a^2 \sin^2\theta + b^2 \cos^2\theta)^{1/2}\} \cos\theta$ $nY = -yX = \{a/(a^2 \sin^2\theta + b^2 \cos^2\theta)^{1/2}\} \cos\theta$ When the distance between the spindle center and the cutting edge is taken as Tr, the locus (Xs, Ys) of the spindle center becomes as follows:

$$Xs = a\cos\theta - nX \cdot Tr$$
$$= a\cos\theta - \{b \cdot Tr/(a^2\sin^2\theta + b^2\cos^2\theta)^{1/2}\}\cos\theta$$
$$= \{a - (b \cdot Tr/(a^2\sin^2\theta + b^2\cos^2\theta)^{1/2}\}\cos\theta$$

$$Ys = b\sin\theta - nY \cdot Tr$$
$$= b\sin\theta - \{a \cdot Tr/(a^2\sin^2\theta + b^2\cos^2\theta)^{1/2}\}\sin\theta$$
$$= \{b - (a \cdot Tr/(a^2\sin^2\theta + b^2\cos^2\theta)^{1/2}\}\sin\theta$$

Where the ellipse is inclined to the X and Y axes, it is sufficient to convert the coordinate system in the same procedures as described above according to the inclined angle.

Also, in the spindle rotational angle control machining method according to the present invention, as an application of the above-mentioned inclined machining, the degree of inclination of the machining axial line or machined face of the workpiece W from a normal state due to the positioning error of the workpiece W to the spindle center axial line is automatically measured, and according to the degree of inclination, an axial control level of the relative displacement of the spindle 19 to the workpiece W is corrected, whereby an inclination compensating component of the machining axial line or machined face of the workpiece W is given to the mutual interpolation motion between the spindle 19 and the workpiece W, and then an inner/outer peripheral face or a flange face can be machined by the machining axial line in a normal state.

Figure 28:
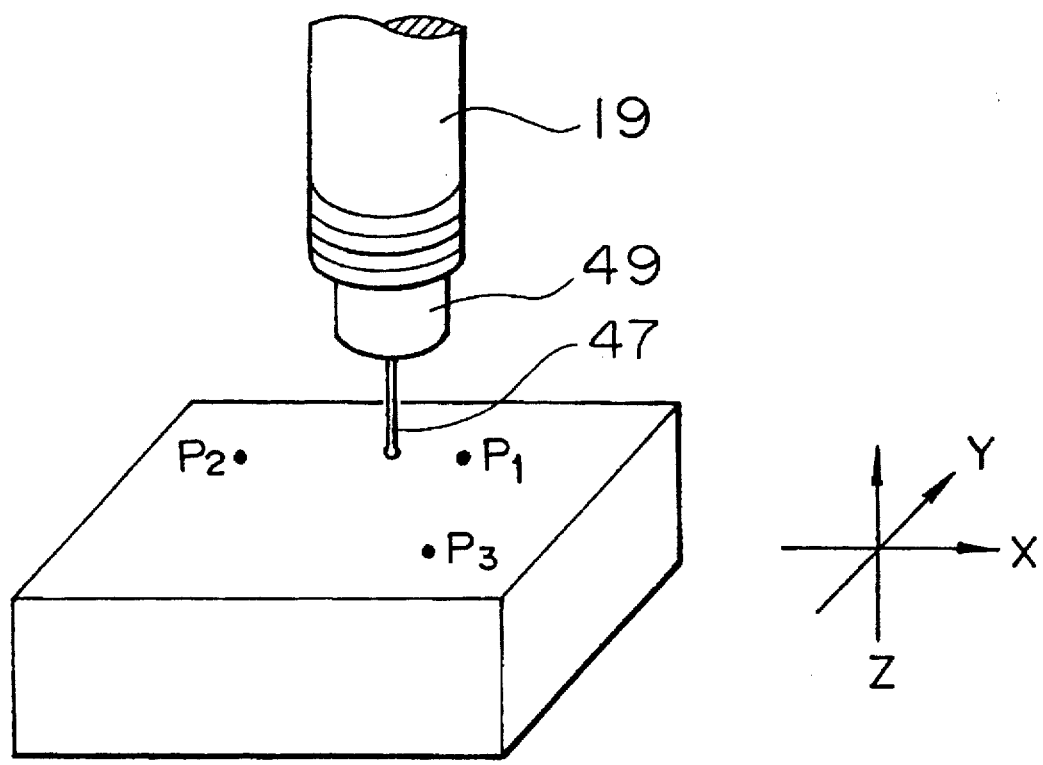
FIG. 28 is an illustrative view showing a procedure of measuring a positioning error of a workpiece with respect to the spindle center axial line in the first embodiment.

In this case, as shown in FIG. 28, respective coordinate values $(Xp_1, Yp_1, Zp_1)$, $(Xp_2, Yp_2, Zp_2)$ and $(Xp_3, Yp_3, Zp_3)$ of three points $P_1$, $P_2$ and $P_3$ on a machining datum face Ws of the workpiece W are measured by the use of the automatic measuring instrument 49, and an inclination degree $X_\gamma$ in the X-axis direction and an inclination degree $Y_\gamma$ in the Y-axis direction of the machining datum face Ws are calculated by the following equations:

$$X_\gamma = \tan\{(Zp_2-Zp_1)/(Zx_2-Zx_1)\}$$

$$X_\gamma = \tan\{(Zp_3-Zp_1)/(Zx_3-Zx_1)\}$$

provided that the Y-axis coordinate values are made constant during measurement of the inclination degree $X_\gamma$ in the X-axis direction, while the X-axis coordinate values are made constant during measurement of the inclination degree $_s$ in the Y-axis direction.

Thus, the axial vector components i, j and k in the respective X-, Y- and Z-axis directions of a machined bore are expressed by the following equations:

$$i = -\cos Y_\gamma \sin X_\gamma$$

$$j = -\cos X_\gamma \sin Y_\gamma$$

$$K = \cos X_\gamma \cos Y_\gamma$$

With the equations, the inclined angles γ and δ are expressed by the following equations. It is sufficient that the machining is performed as with the above-mentioned inclined machining.

$$\gamma = \tan^{-1}\{k/(i^2+j^2)\}$$

$$\delta = \tan^{-1}(j/i)$$

The above-mentioned axial control or spindle rotational angle control may be performed either by a method in which the calculation of the above-mentioned functional equations is executed in the NC device to obtain coordinate position data, or by a method in which coordinate position data have been previously described as point group data in an NC machining program at the production of the program.

Although the present invention has been described in detail for specific embodiments, it will be apparent for those skilled in the art that the present invention is not limited to these, and that various embodiments may be performed within the scope of the present invention.

The second embodiment will be explained hereinafter.

Figure 29:
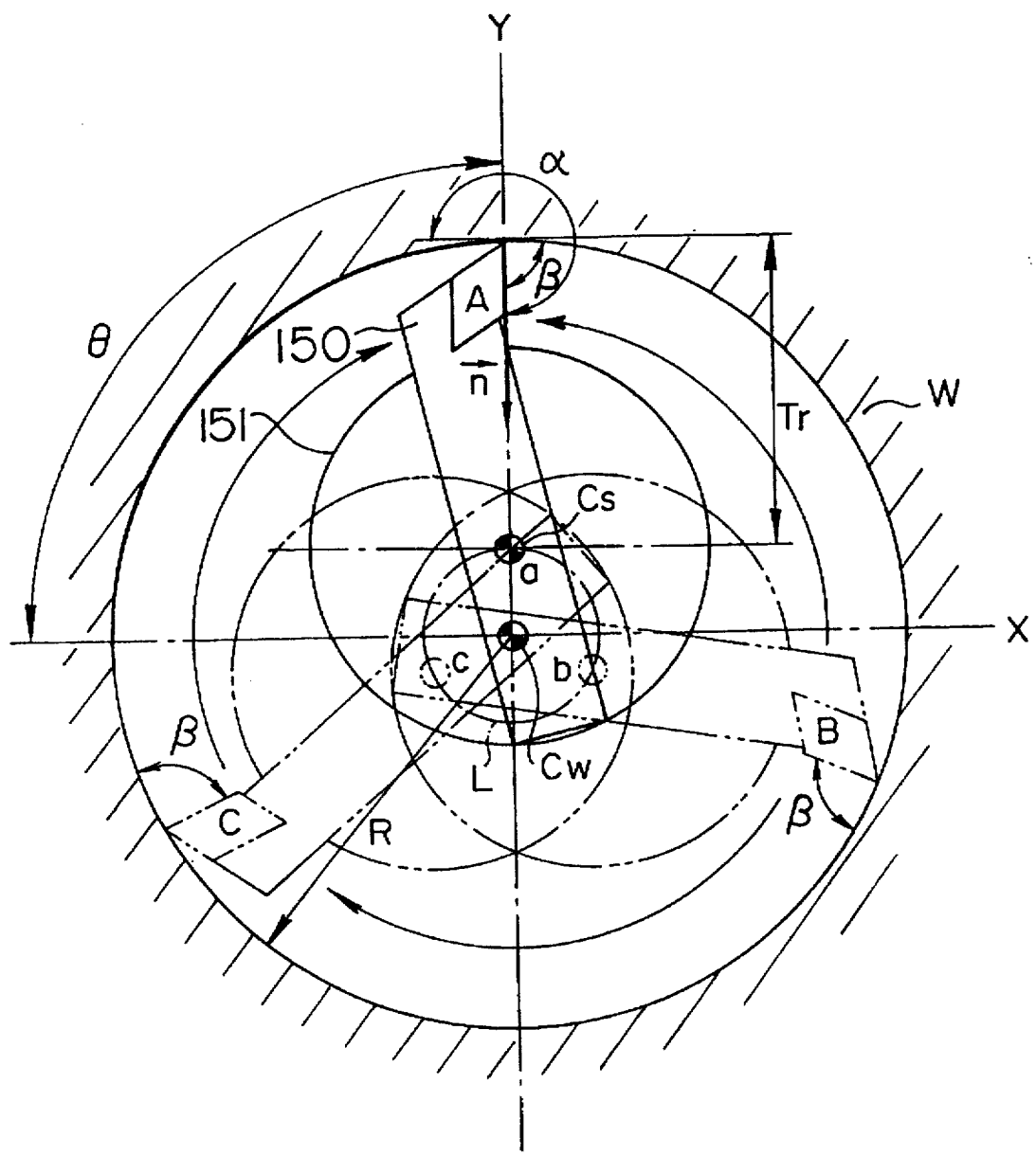
FIG. 29 is an illustrative view showing an example in which the principle of the machining by the spindle rotational angle control machining method of the second embodiment is applied to inner peripheral face machining.

FIG. 29 shows an example in which the principle of the machining by the spindle rotational angle control machining method according to the present invention is applied to an inner peripheral face machining.

A turning tool 150 is mounted to a spindle 151 capable of controlling quantitatively the rotational angle around the center axial line itself; the spindle 151 and a workpiece W are allowed to be relatively dislocated by an axial control, in this case, by the X-axis control and the Y-axis control along a plane perpendicular to the rotation axial line of the spindle 151 in such a manner that the relative movement locus of the spindle center Cs to the workpiece W conforms to a geometry to be machined, thereby allowing a true circle mutual interpolation motion between the spindle 151 and the workpiece W to be performed; and the rotational angle of the spindle 151 is synchronously controlled with a required interrelation to the X-axis control and the Y-axis control, whereby the direction of the cutting edge of the turning tool 150 to the inner peripheral face of the workpiece W is kept at a required direction at the full rotational angle position of the spindle 151, that is, a front rake angle β is kept constant, and then the workpiece W is machined into a geometry determined by the interpolation locus (spindle center locus) due to the above-mentioned mutual interpolation motion, that is, into the cross sectional geometry of a true circle.

In FIG. 29, reference codes a, b and c designate positions of the spindle center Cs when the spindle 151 is positioned at respective rotational angle positions designated by reference codes A, B and C, respectively, which are located on the interpolation locus L.

When a tool radius of the turning tool 150 is taken as Tr, a machining radius of the workpiece W as R, and the front rake angle β as 90°, under a precondition of R>Tr, the spindle center Cs is decentralized by R−Tr from a center Cw of the workpiece W, so that the interpolation locus L becomes a true circle having a radius of R−Tr and the same center as the center Cw of the workpiece W.

The front rake angle β=90° referred to here means for convenience that as viewed through an angle θ around the work piece center Cw taking X-axis as an original line, an angle of the contact position of the cutting edge of the turning tool 150 with the workpiece W is equal to an angle of the position at which the spindle center Cs is positioned on the interpolation locus L.

In this case, the coordinate values of the X-axis control and the Y-axis control are given by trigonometric functional equations having a 90° phase difference mutually with the angle around the workpiece center Cw taken as a medium variable so that the interpolation locus L draws a true circle, and the radius of the interpolation locus L is changed according to the machining radius R of the workpiece W where the front rake angle β is made constant. That is, the machining of an inner peripheral face with an arbitrary machining radius R is performed within a limit of R>Tr by the single turning tool 150 according to the radius of the interpolation locus L.

Figure 30A:
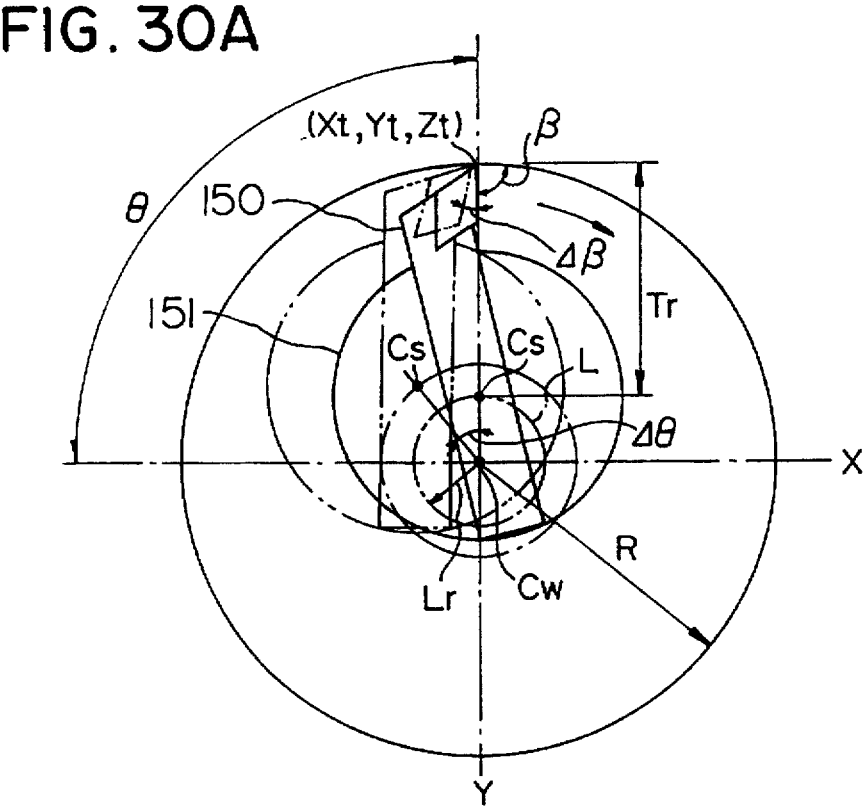
FIGS. 30A and 30B are illustrative views showing a procedure of changing the front rake angle of a turning tool on inner peripheral face machining in the spindle rotational angle control machining method of the second embodiment.
Figure 30B:
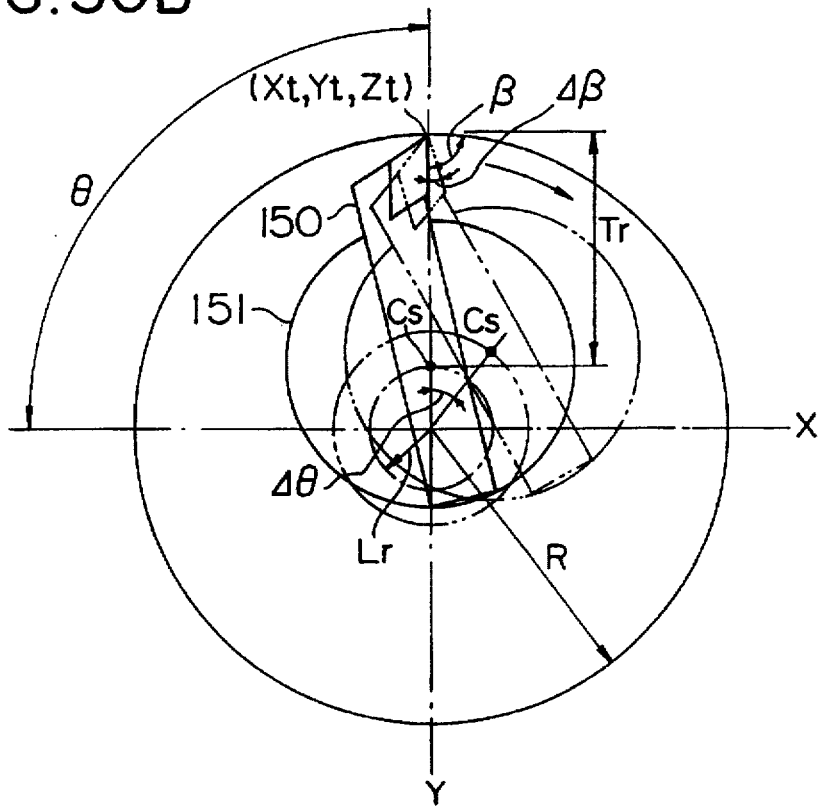

Then, in the machining of an inner peripheral face with an arbitrary machining radius R, with reference to FIGS. 30A and 30B, a method of changing the front rake angle β of a turning tool will be explained. FIG. 30A shows a case where the front rake angle β is increased to an angle more than 90° by Δβ; FIG. 30B shows a case where the front rake angle β is decreased to an angle less than 90° by Δβ.

Where the machining radius R is made constant, and the front rake angle β is increased or decreased to an angle more than or less than 90°, as viewed through an angle θ around the workpiece center Cw taking X-axis as an original line, the angle of a position at which the spindle center Cs is positioned on the interpolation locus L to the angle of the contact position of the cutting edge of the turning tool 150 with the workpiece W is allowed to change to the lead side or lag side by the angle Δθ corresponding to the increased/ decreased angle Δβ of the front rake angle β more than or less than 90°.

With the angle change, an effective tool radius of the turning tool 150 is reduced, so that the radius of the interpolation locus L is increased according to the increased/ decreased angle Δβ of the front rake angle β more than or less than 90°.

This allows the boring of an arbitrary inside diameter to be performed by the single turning tool 150 regardless of tool radius, and the front rake angle β to be arbitrarily changed without requiring tool exchange and tool mounting angle change.

Figure 31:
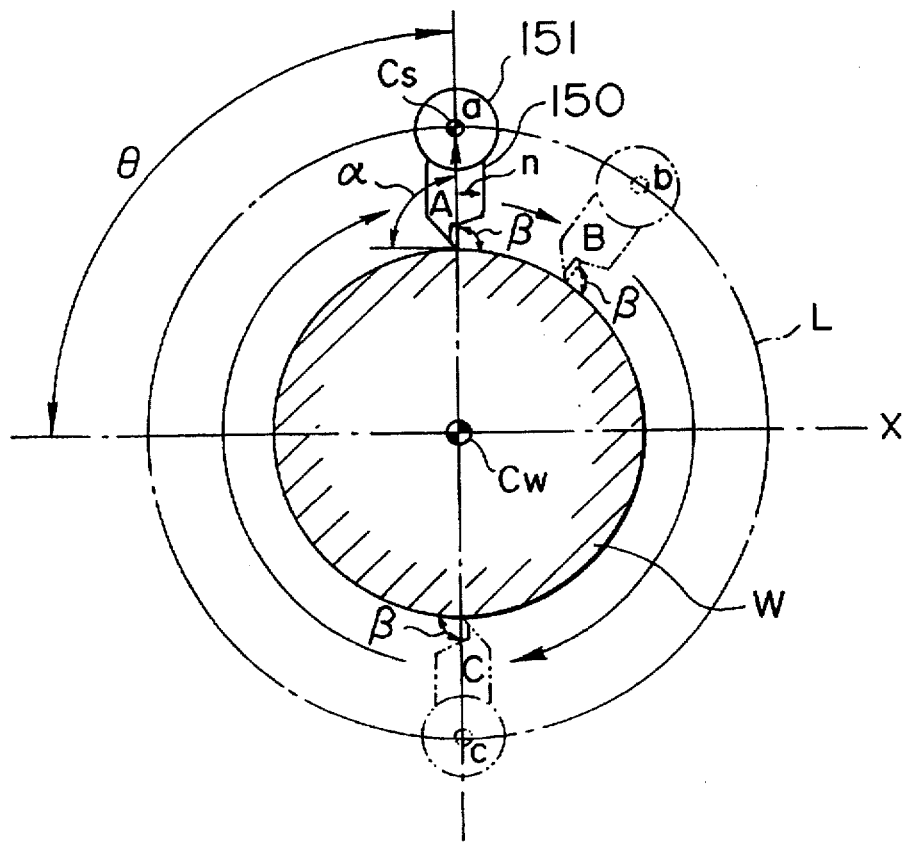
FIG. 31 is an illustrative view showing an example in which the principle of the machining by the spindle rotational angle control machining method of the second embodiment is applied to outer peripheral face machining.

FIG. 31 shows an example in which the principle of the machining by the spindle rotational angle control machining method according to the present invention is applied to an outer peripheral face machining. In FIG. 31, the parts corresponding to FIG. 29 are designated by the same reference codes as those designated to FIG. 29, and the explanation of the parts will be omitted.

Also, in this case, the spindle 151 and a workpiece W are allowed to be relatively dislocated by the X-axis control and the Y-axis control along a plane perpendicular to the rotation axial line of the spindle 151, thereby allowing a true circle mutual interpolation motion between the spindle 151 and the workpiece W to be performed; and the rotational angle of the spindle 151 is synchronously controlled with a required interrelation to the X-axis control and the Y-axis control, whereby the direction of the cutting edge of the turning tool 150 to the outer peripheral face of the work piece W is kept at a required direction at the full rotational angle position of the spindle 151, that is, the front rake angle β is kept constant, and then the workpiece W is machined into a geometry determined by the interpolation locus due to the above-mentioned mutual interpolation motion, that is, into the cross sectional geometry of a true circle.

Also, in this case, the coordinate values of the X-axis control and the Y-axis control are given by trigonometric functional equations having a 90° phase difference mutually with the angle around the workpiece center Cw taken as a medium variable so that the interpolation locus L draws a true circle, and the radius of the interpolation locus L is changed according to the machining radius R of the workpiece W where the front rake angle β is made constant. That is, the machining of an outer peripheral face with an arbitrary machining radius R is performed by the single turning tool 150 according to the radius of the interpolation locus L.

Figure 32:
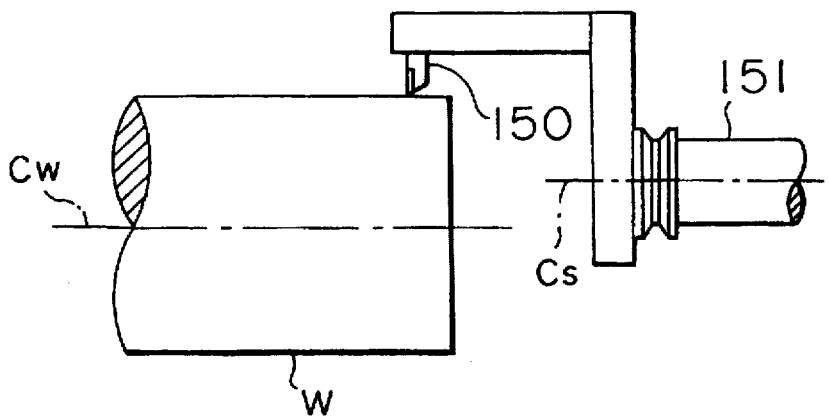
FIG. 32 is a side view showing one embodiment of the outer peripheral face machining by the spindle rotational angle control machining method of the second embodiment.

For outer peripheral face machining, the radius of the interpolation locus L may be either larger or smaller than that of the workpiece W, and thus there is no restraint relationship between both. Other than a case where the spindle center Cs is outside the outer peripheral face of the workpiece W as shown in FIG. 31, a case where the spindle center Cs is inside the outer peripheral face of the workpiece W as shown in FIG. 32 may be considered.

Figure 33A:
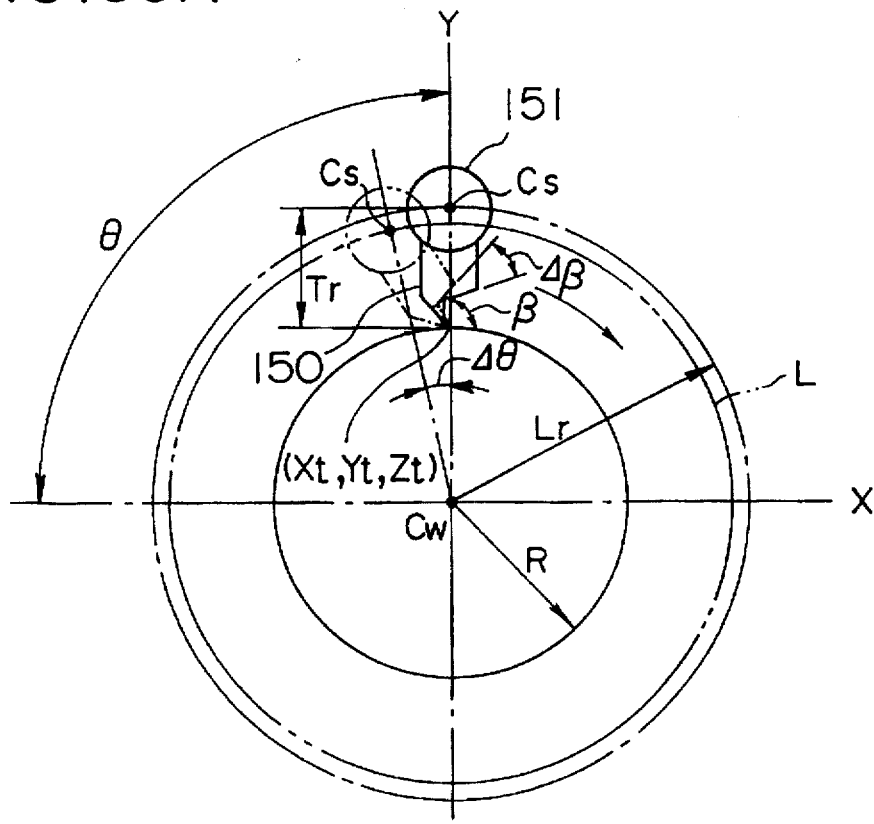
FIGS. 33A and 33B are illustrative views showing a procedure of changing the front rake angle of a turning tool on outer peripheral face machining in the spindle rotational angle control machining method of the second embodiment.
Figure 33B:
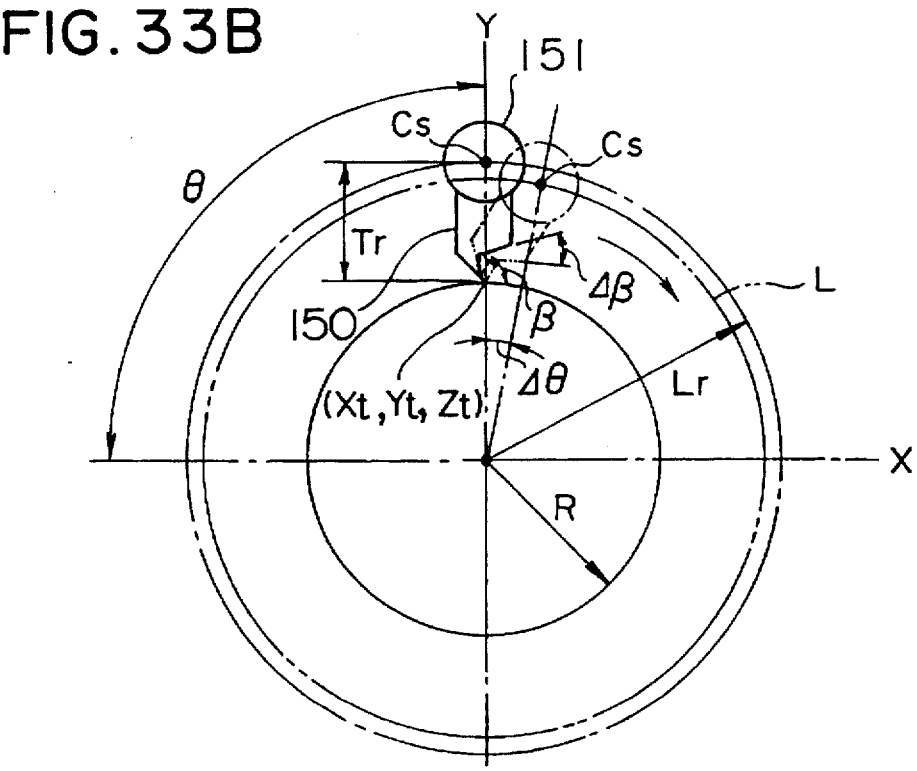

Then, in the machining of an outer peripheral face with an arbitrary machining radius R, with reference to FIGS. 33A and 33B, a method of changing the front rake angle β of a turning tool will be explained. FIG. 33A shows a case where the front rake angle β is increased to an angle more than 90° by Δβ; FIG. 33B shows a case where the front rake angle β is decreased to an angle less than 90° by Δβ.

Where the machining radius R is made constant, and the front rake angle β is increased or decreased to an angle more than or less than 90°, as with the above-mentioned inner peripheral face machining, as viewed through an angle θ around the workpiece center Cw taking X-axis as an original line, the angle of a position at which the spindle center Cs is positioned on the interpolation locus L to the angle of the contact position of the cutting edge of the turning tool 150 with the workpiece W is allowed to change to the lead side or lag side by the angle Δθ corresponding to the increased/ decreased angle Δβ of the front rake angle β more than or less than 90°.

With the angle change, an effective tool radius of the turning tool 150 is reduced, so that the radius of the interpolation locus L is decreased (where the spindle center C s is outside the outer peripheral face of the workpiece) or increased (where the spindle center Cs is inside the outer peripheral face of the workpiece) according to the increased/ decreased angle Δβ of the front rake angle β more than or less than 90°.

This allows the outer peripheral face machining of an arbitrary outside diameter to be performed by the single turning tool 150 regardless of tool radius, and the front rake angle β to be arbitrarily changed without requiring tool exchange and tool mounting angle change.

The turning tool 50 used for the spindle rotational angle control machining method according to the present invention may be a single point turning tool. The single point turning tool referred to here is a turning tool of a type of contacting substantially through a point a workpiece, that is, a general term of nonforming turning tools, which includes boring tools, boring bar tools, parting tools, threading tools, button tools and turning tools.

Figure 34:
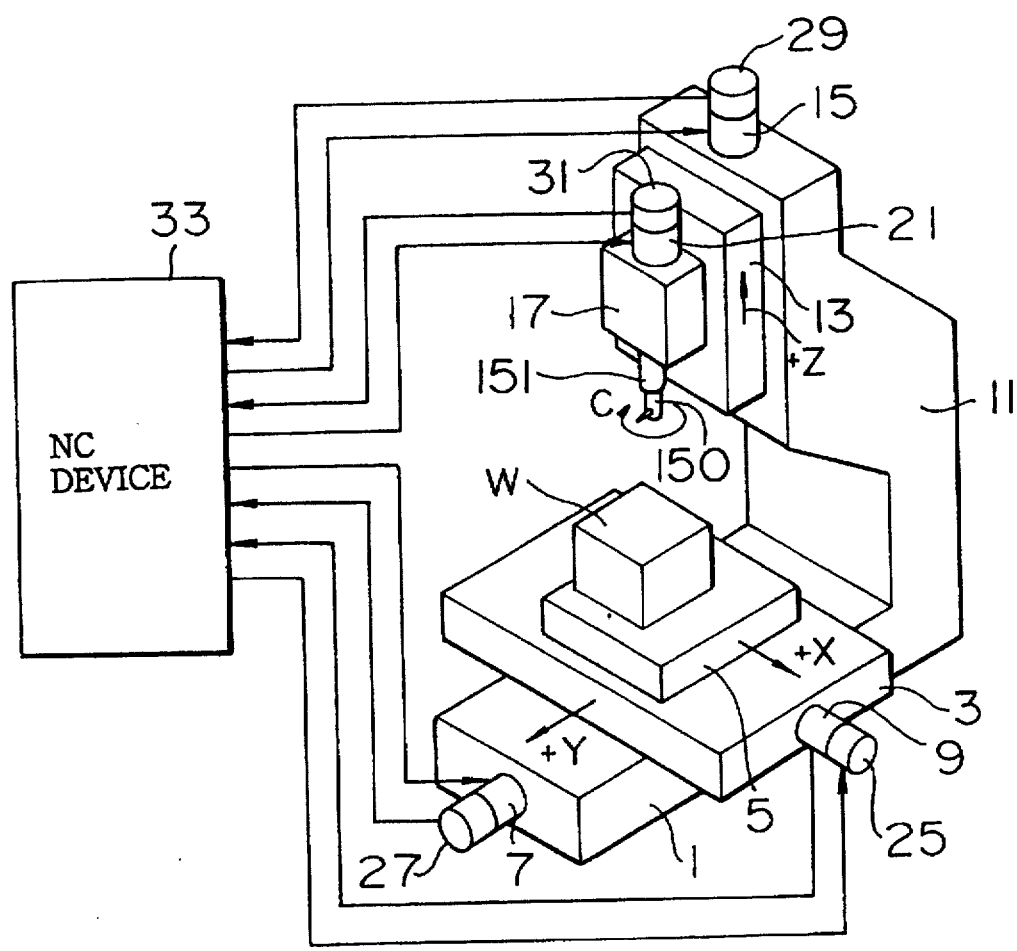
FIG. 34 is a schematic perspective view showing one example of an NC machining tool used for the embodiment of the spindle rotational angle control machining method of the second embodiment.

FIG. 34 shows one example of an NC machining tool used to embody the spindle rotational angle control machining method according to the present invention. The NC machining tool has a bed 1, a Y-axis table 3, and an X-axis table 5 provided movably in the X-axis direction on the Y-axis table 3, the workpiece W being fixedly placed on the X-axis table 5. The Y-axis table 3 is driven in the Y-axis direction by a Y-axis servomotor 7, and the workpiece W on the X-axis table 5 is axially controlled along a horizontal plane consisting of X-axis and Y-axis at an arbitrary coordinate position by X-coordinate and Y-coordinate according to both the Y-axis direction movement of the Y-axis table 3 by the Y-axis servomotor 7 and the X-axis direction movement of the X-axis table 5 by the X-axis servomotor 9.

A Z-axis slider 13 is mounted movably in the vertical direction, that is, in the Z-axis direction on a column 11 of the NC machining tool, the Z-axis slider 13 being driven in the Z-axis direction by a Z-axis servomotor 15.

The Z-axis slider 13 is mounted with a spindle head 17 to which a Spindle 19 is mounted rotatably around the axial line in the same direction as Z-axis, that is, around C-axis.

The spindle 151 is rotationally driven by a C-axis servomotor 21 and controlled quantitatively for C-axis rotational angle, and in addition, the spindle 151 is mounted with a turning tool 150.

Here, the movement plane of the workpiece W by X-axis and Y-axis is a plane perpendicular to the rotating axial line of the spindle 151, that is, C-axis (Z-axis).

The X-axis servomotor 9, the Y-axis servomotor 7, the Z-axis servomotor 15 and the C-axis servomotor 21 are mounted with rotary encoders 25, 27, 29 and 81, respectively, and the rotary encoders 25, 27, 29 and 81 detect the rotational angle of respective servomotors 9, 7, 15 and 21 to output rotational angle information to an NC device 88. Of them, the rotary encoder 81 of the C-axis servomotor 21 is configured by an absolute-type rotary encoder, and measures the rotational angle of the spindle 151 with the X-axis direction or Y-axis direction as an absolute datum position.

The NC device 33, as shown in FIG. 3, has a program execution section 35 for executing an NC machining program to output respective axes commands, and an interpolation calculation section 37 for receiving axes commands from the program execution section 35 to perform an interpolation calculation; and the interpolation calculation section 37 outputs a travel of respective axes X, Y, Z and C as a command value to position control/drive sections 39, 41, 43 and 45 of the respective axes.

The position control/drive sections 39, 41, 43 and 45 receive the rotational angle information from the respective rotary encoders 25, 27, 29 and 31 of the same axes, and control the drive of the servomotors 9, 7, 15 and 21 of the same axes on the basis of the operation level of respective axes calculated by a position feedback compensating control.

In the spindle rotational angle control machining method according to the present invention, the command values of respective axes X, Y and Z have been set by an NC machining program in such a manner that the relative movement locus of the spindle center to the workpiece W conforms to a geometry to be machined; with the execution of the program, the turning tool 150 and the workpiece W are relatively dislocated by the control of axes X, Y and Z, at least axes X and Y along a plane perpendicular to the rotation axial line of the spindle 151, thereby allowing a mutual interpolation motion between the turning tool 150 and the workpiece W to be performed; and the rotational angle of the spindle 151 is synchronously controlled with a required interrelation to the control of axes X, Y and Z, whereby the direction of the cutting edge of the turning tool 150 to the machined face of the workpiece W is kept at a required direction, that is, at a required front rake angle at the full rotational angle position of the spindle 151, and then the workpiece W is machined by the turning tool 150 into a geometry determined by an interpolation locus due to the mutual interpolation motion.

In this case, the control of two axes X and Y is performed in a manner to draw a locus defined by an equation including trigonometric functions having a 90° phase difference mutually.

In the spindle rotational angle control machining method, by combining the control of the rotational angle of the spindle 151 with the simultaneous control of either two axes X and Y, or three axes X, Y and Z, there can be performed boring of arbitrary inside diameter and machining of the outer periphery of arbitrary outside diameter, as well as, taper machining, spherical face machining, polygon machining and thread cutting using a single turning tool regardless of the tool radius of the turning tool 150; and by the use of a single point turning tool, the machining speed is improved three through twenty times faster than with the machining belonging to the spring machining using a forming turning tool.

Then, the movement control and synchronous control in the spindle rotational angle control machining method according to the present invention will be explained in detail for the inner/outer peripheral face machining.

When the radius of the cylindrical face is taken as R; the feed rate in Z-axis direction per revolution, p; and the Z-axis coordinate at Z-axis direction feed start position, $Z_0$; the coordinate positions (Xt, Yt and Zt) of the cutting edge at respective rotational angle positions are given by the following functional equation:

$$Xt = Lr \cos \theta$$

$$Yt = Lr \sin \theta$$

$$Zt = Z_0 - (p/2 \pi)\theta$$

In the cylindrical inner face machining, as shown in FIG. 29, the normal vector facing outward from machined facen= (nx, ny) in the X-Y plane of the cutting edge locus is expressed by the following equations:

$$nx = -\cos \theta$$

$$ny = -\sin \theta$$

Accordingly, the spindle center coordinate positions (Xs, Ys, Zs) defining the spindle center locus L are expressed by the following equations:

$$Xs = \{(R^2 + Tr^2 - 2R \cdot Tr \cos \Delta\beta)^{1/2}\} \cos \theta$$

$$Ys = \{(R^2 + Tr^2 - 2R \cdot Tr \cos \Delta\beta)^{1/2}\} \sin \theta$$

$$Zs = Zt - Tz$$

In this case, by the simultaneous control of two axes X-axis and Y-axis on the basis of the spindle center coordinate positions (Xs, Ys), a mutual circular interpolation motion is performed between the turning tool 150 and the workpiece W, and as the circular interpolation locus, the spindle center locus becomes a true circle having a radius Lr of $(R^2 + Tr^2 - 2R \cdot Tr \cos \Delta\beta)^{1/2}$.

In the cylindrical inner face machining, when a changed angle $\Delta\beta$ from the front rake angle $\beta$ of 90° is 0, the spindle rotational angle $\alpha$ taking the X-axis direction as an original line is expressed by the following equation:

$$\alpha = \tan^{-1}(ny/nx) = \tan^{-1}(-\sin\theta/-\cos\theta)$$
$$= \theta + \pi$$

Then, the spindle rotational angle $\alpha$ is changed by an angle $\Delta\theta$ according to the changed angle $\Delta\beta$ from the front rake angle $\beta$ of 90°. That is, $\alpha$ becomes $\theta + \pi \pm \Delta\theta$.

With the above-mentioned condition satisfied, the axial control of respective axes of X, Y and Z is performed, and the spindle rotational angle $\alpha$ is synchronously controlled with the axial control, whereby the turning tool 150 performs the cylindrical inner face machining of an arbitrary radius R taking the tool radius Tr as a minimum radius with an arbitrary front rake angle $\beta$ to a machined face at the full rotational angle position of the spindle 151.

This allows the inner peripheral face machining of an arbitrary radius to be performed by the single turning tool 150 regardless of tool radius, and the front rake angle $\beta$ to be arbitrarily changed without requiring tool exchange and tool mounting angle change.

In the cylindrical outer face machining, as shown in FIG. 31, the normal vector facing outward from machined facen= (nx, ny) in the X-Y plane of the cutting edge locus becomes reverse in direction to the cylindrical inner face machining, and is expressed by the following equations:

$$nx=\cos\theta$$

$$ny=\sin\theta$$

Accordingly, the spindle center coordinate positions (Xs, Ys, Zs) defining the spindle center locus L are expressed by the following equations:

$$Xs=\{(R^2+Tr^2+2R\cdot Tr\cos\Delta\beta)^{1/2}\}\cos\theta$$

$$Ys=\{(R^2+Tr^2+2R\cdot Tr\cos\Delta\beta)^{1/2}\}\sin\theta$$

$$Zs=Zt-Tz$$

In the cylindrical outer face machining, when a changed angle $\Delta\beta$ from the front rake angle $\beta$ of 90° is 0, the spindle rotational angle a taking the X-axis direction as an original line is expressed by the following equation:

$$\alpha=\tan^{-1}(ny/nx)=\tan^{-1}(\sin\theta/\cos\theta)=\theta$$

Then, the spindle rotational angle $\alpha$ is changed by an angle $\Delta\theta$ according to the changed angle $\Delta\beta$ from the front rake angle $\beta$ of 90°. That is, $\alpha$ becomes $\theta+\pi\pm\Delta\theta$.

Accordingly, as with the inner peripheral face machining, the axial control of respective axes X, Y and Z is performed, and with the axial control, the axis rotational angle $\alpha$ is synchronously controlled, whereby also in this case, the turning tool 150 performs the cylindrical outer face machining of an arbitrary radius R with an arbitrary front rake angle $\beta$ to a machined face at the full rotational angle position of the spindle 151.

This allows the outer peripheral face machining of an arbitrary radius to be performed by the single turning tool 150 regardless of tool radius, and the front rake angle $\beta$ to be arbitrarily changed without requiring tool exchange and tool mounting angle change.

The equations of $Xs=\{(R^2+Tr^2+2R\cdot Tr\cos\Delta\beta)^{1/2}\}\cos\theta$ and $Ys=\{(R^2+Tr^2+2R\cdot Tr\cos\Delta\beta)^{1/2}\}\sin\theta$ become valid in a case where the spindle center Cs is outside the workpiece W as viewed in the Z-axis direction as shown in FIG. 31, while in a case where the spindle center Cs is inside the workpiece W as viewed in the Z-axis direction as shown in FIG. 32, the equations of $Xs=\{(R^2+Tr^2-2R\cdot Tr\cos\Delta\beta)^{1/2}\}\cos\theta$ and $Ys=\{(R^2+Tr^2-2R\ Tr^2\cos\Delta\beta)^{1/2}\}\sin\theta$ become valid.

It is sufficient for the internal thread cutting that the synchronous control similar to the cylindrical inner face machining is performed and that the value of Zs=Zt–Tz is set at a proper value according to thread pitch; it is sufficient for the external thread cutting that the synchronous control similar to the cylindrical outer face machining is performed and that the value of Zs=Zt–Tz is set at a proper value according to thread pitch; and in either case, the other procedures are performed as with the cylindrical inner/outer face machining, whereby the thread cutting of internal thread or external thread having an arbitrary thread diameter is performed by the single turning tool 150 with an arbitrary front rake angle.

This allows the thread cutting of internal thread or external thread having an arbitrary thread diameter to be performed by the single turning tool 150 regardless of tool radius, and the front rake angle $\beta$ to be arbitrarily changed without requiring tool exchange and tool mounting angle change.

For machining of Z-axis rotating material having a diameter change in the Z-axis direction, such as taper machining, when the radius Lr of the interpolation locus L is taken as a function fLr (z) with respect to Z; the feed rate in the Z-axis direction per revolution, p; and the Z-axis coordinate of the feed start position in the Z-axis direction, $Z_0$, it is sufficient to change the radius Lr of the interpolation locus L with a function of $fLr\{Z_0-(p/2\ \pi)\theta\}$.

It is sufficient that the spindle rotational angle $\alpha$ is the same as with the above-mentioned cylindrical inner/outer face machining. Also, in this case, the machining of Z-axis rotating material having a diameter arbitrarily changing in the Z-axis direction is performed by the single turning tool 150 with an arbitrary front rake angle.

This allows the machining of Z-axis rotating material having a diameter arbitrarily changing in the Z-axis direction to be performed by the single turning tool 150 regardless of tool radius, and the front rake angle $\beta$ to be arbitrarily changed without requiring tool exchange and tool mounting angle change.

Also, in taper machining, spherical face machining, polygon machining, flange face machining and arbitrary geometry machining, the axial control of respective axes X, Y and Z is performed as with the cylindrical face machining according to these machining geometry, and the spindle rotational angle is synchronously controlled to the axial control, whereby taper machining, spherical face machining, polygon machining, flange face machining and arbitrary geometry machining are performed by the single turning tool 150 with an arbitrary front rake angle.

When a detailed explanation is required for the axial control of taper machining, spherical face machining, polygon machining and flange face machining, refer to the specification and drawings of Japanese Patent No. HEI 6-211137 by the same applicant as the present applicant.

The above-mentioned axial control or spindle rotational angle control may be performed either by a method in which the calculation of the above-mentioned functional equations is executed in the NC device to obtain coordinate position data, or by a method in which coordinate position data have been previously described as point group data in an NC machining program at the production of the program.

Although the present invention has been described in detail for specific embodiments, it will be apparent for those skilled in the art that the present invention is not limited to these, and that various embodiments may be performed within the scope of the present invention.

The third embodiment will be explained hereinafter.

Figure 35:
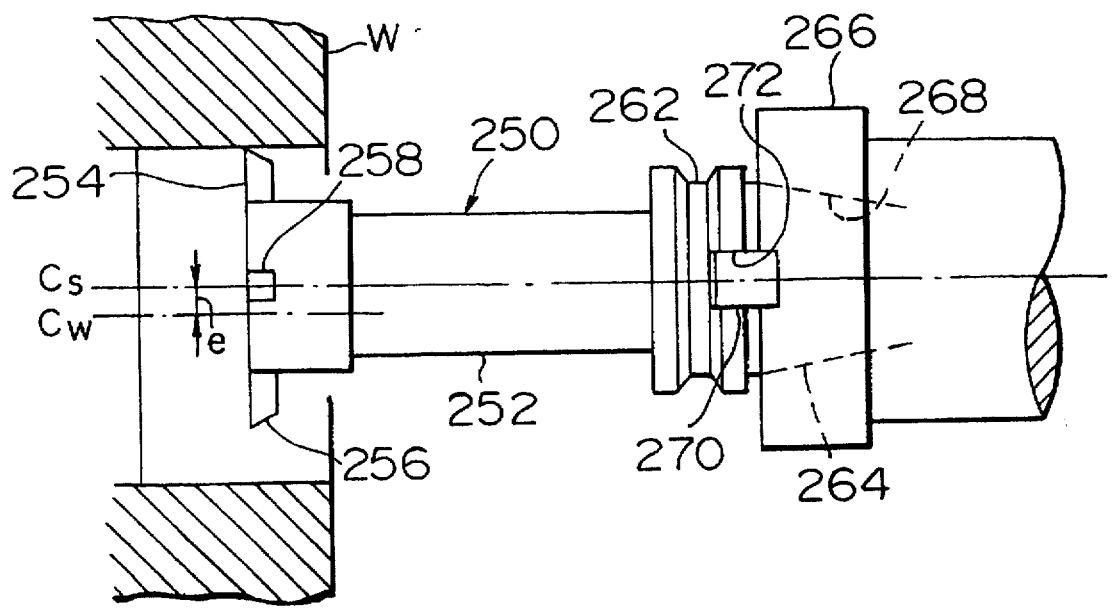
FIG. 35 is a side view showing an embodiment in which the machining by the spindle rotational angle control machining method of the third embodiment is applied to inner peripheral face machining.
Figure 38:
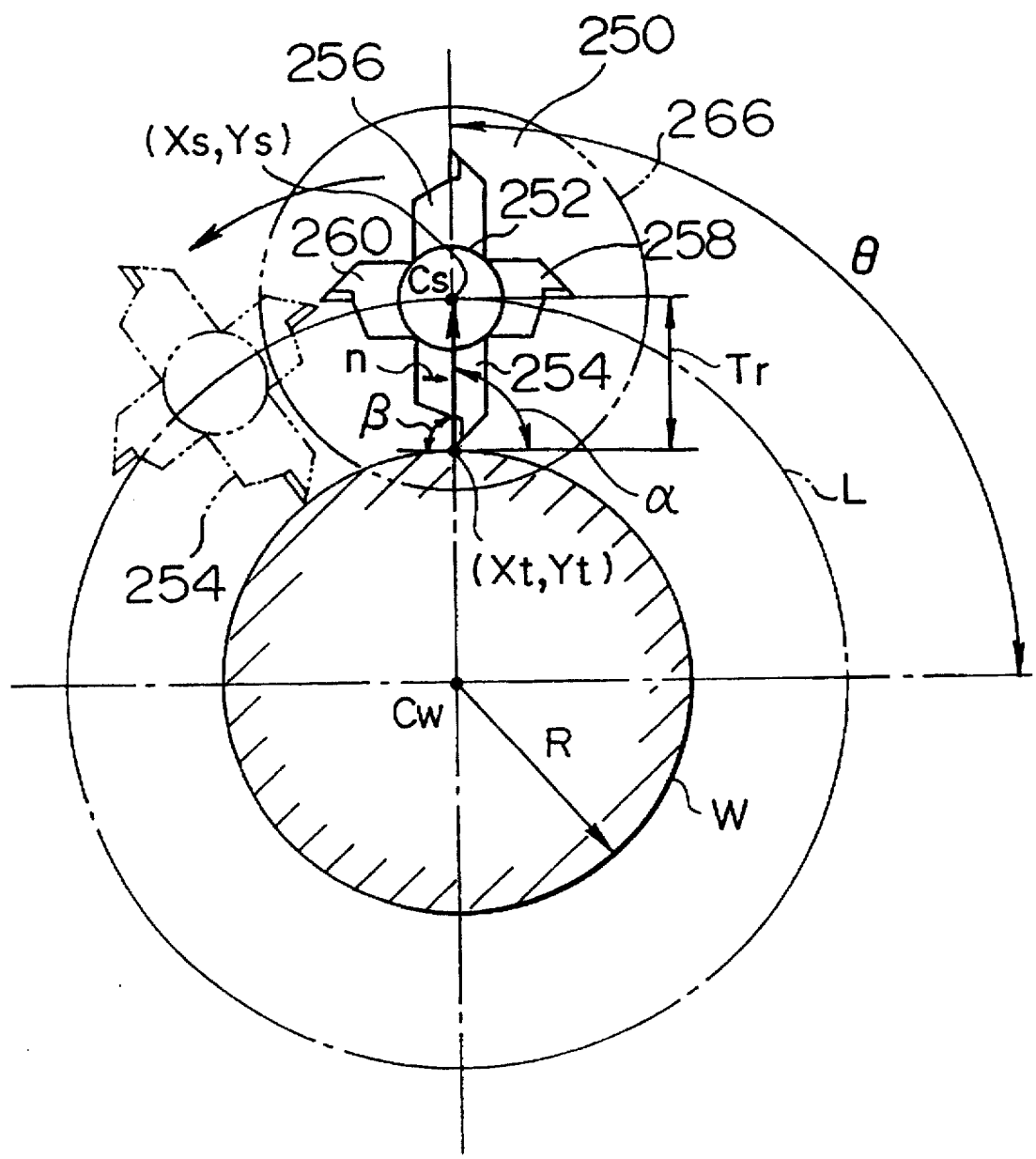
FIG. 38 is an illustrative view showing an example of the cylindrical outer face machining by the spindle rotational angle control machining method of the third embodiment.

FIGS. 35 and 38 show an example in which the principle of the machining by the spindle rotational angle control machining method according to the present invention is applied to an inner peripheral face machining.

A turning tool 250 has a bar part 252, and the head of the bar part 252 is mounted with four cutting edges of a roughing cutting edge 254, a finishing cutting edge 258 and double chamfering cutting edges 258, 280 radially at a phase angle of 90° mutually with the center axial line of the bar part 252 as a center.

The root of the bar part 252 is provided with an ATC engaging groove 282 and a spindle engaging taper axis part 284 concentrically with the bar part 252; and the turning tool 250 is concentrically fitted into a taper-shaped tool receiving hole 268 formed in a spindle 266 of a machining tool with the spindle engaging taper axis part 264. This causes the bar part 252 to be mounted concentrically with the center axial line Cs of the spindle 266.

The spindle 266 is mounted with a key 270, and the key 270 engages with a positioning key groove 272 formed in the ATC engaging groove 262 to perform the rotation rocking and positioning in the rotational direction of the turning tool 250. The positioning key groove 272 is formed at a position at which the groove is displaced by 90° with respect to the roughing cutting edge 254.

The spindle 266 is quantitatively controlled for the rotational angle around the center axial line Cs itself by a servomotor 21 (see FIG. 39), and the zero point of the rotational angle is set at the arranged position of the key 270 in the spindle rotational direction.

Figure 36:
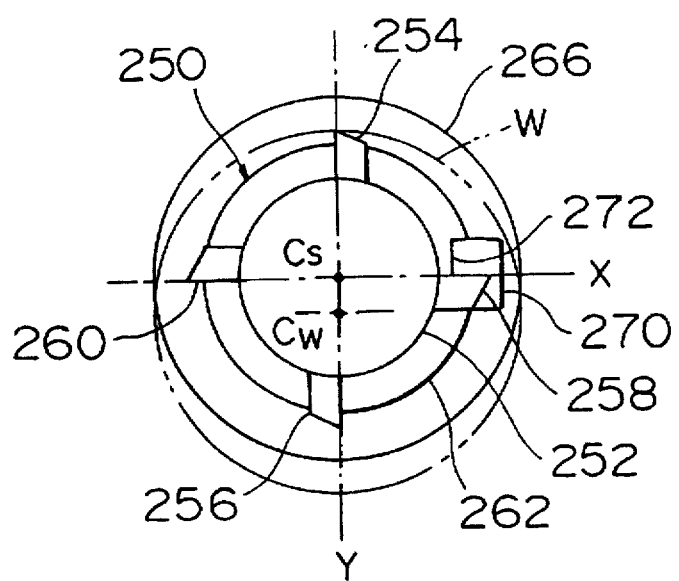
FIG. 36 is a front view showing an embodiment in which the machining by the spindle rotational angle control machining method of the third embodiment is applied to inner peripheral face machining.

The above-mentioned key engagement causes the turning tool 250 to be unconditionally positioned and mounted to the spindle 266 in the rotational direction, and where the spindle 266 is positioned at the zero point, the roughing cutting edge 254 is positioned at a position rotationally displaced by 90° from the zero point as shown in FIG. 36.

In the machining by the spindle rotational angle control machining method according to the present invention, the spindle 266 and the workpiece W are allowed to be relatively dislocated by an axial control, in this case, by the X-axis control and the Y-axis control along a plane perpendicular to the rotation axial line of the spindle 266 in such a manner that the relative movement locus of the spindle center Cs to the workpiece W conforms to a geometry to be machined, thereby allowing a true circle mutual interpolation motion between the spindle 266 and the workpiece W to be performed; and the rotational angle of the spindle 266 is synchronously controlled with a required interrelation to the X-axis control and the Y-axis control, whereby the direction of the cutting edge of the turning tool 250 to the inner peripheral face of the workpiece W is kept at a required direction at the full rotational angle position of the spindle 266, in the illustrated example, a front rake angle β (see FIG. 37) between the roughing cutting edge 254 and the inner peripheral face is kept constant, and then the roughing cutting edge 254 roughs the inner peripheral face of the workpiece W into a geometry determined by the interpolation locus (spindle center locus) due to the above-mentioned mutual interpolation motion (see FIG. 37), that is, into the cross sectional geometry of a true circle.

Figure 37:
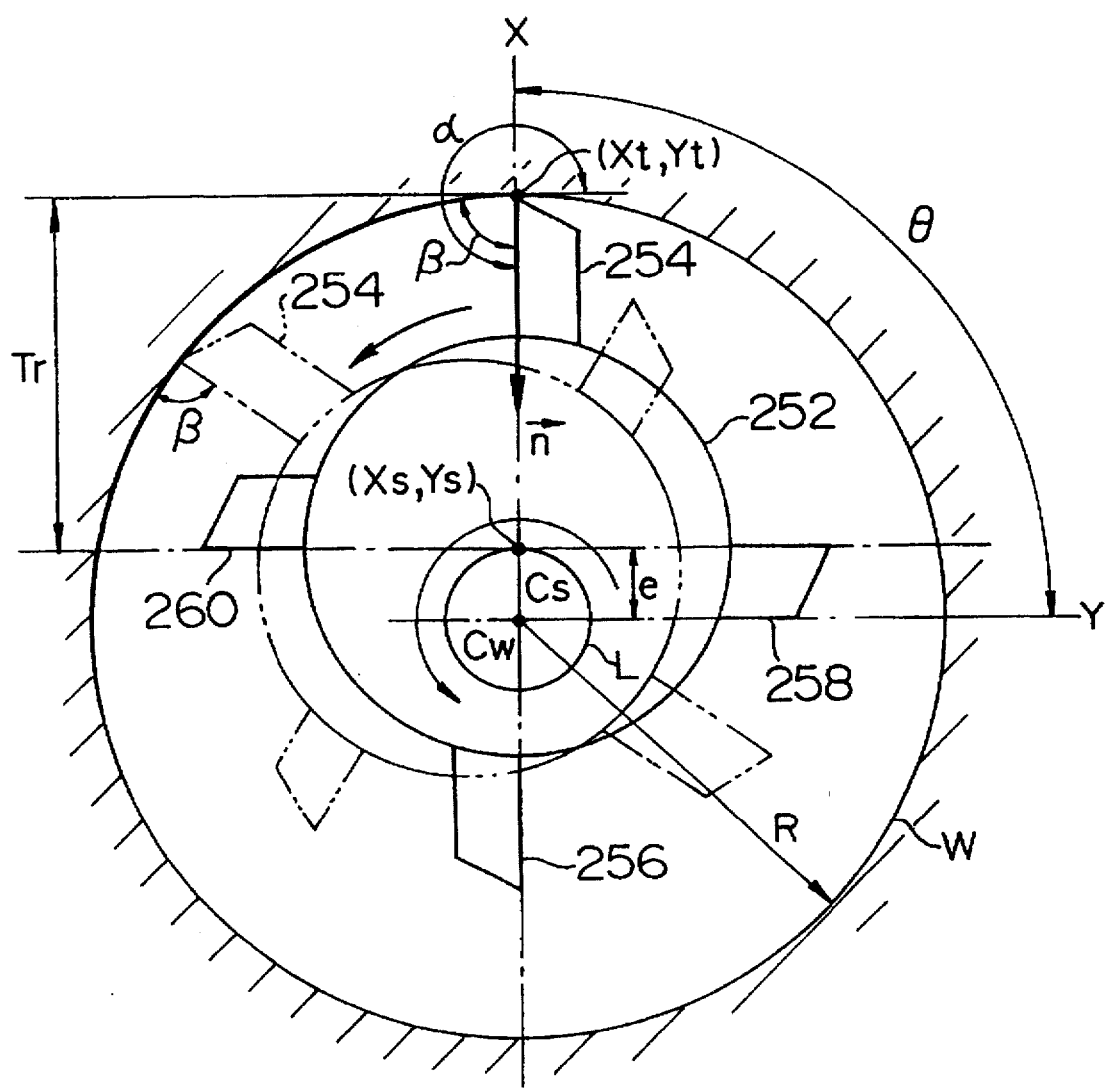
FIG. 37 is an illustrative view showing an example of the cylindrical inner face machining by the spindle rotational angle control machining method of the third embodiment.

When the distance between the center of the turning tool 250 and the cutting edge of the roughing cutting edge 254, that is, the tool radius is taken as Tr, and a machining radius of the workpiece W as R, as shown in FIG. 37, the spindle center Cs is decentralized by R−Tr=e from the center Cw of the workpiece W, so that the interpolation locus L becomes a true circle having a radius of R−Tr and the same center as the center Cw of the workpiece W.

When the rotational angle of the spindle 266 is allowed to move forward 180° by the synchronous control of the X-axis control with the Y-axis control from a state shown In FIG. 37, the finishing cutting edge 256 keeps the angle β constant to the inner peripheral face of the workpiece W, and instead of the roughing cutting edge 254, the finishing cutting edge 256 finishes the inner peripheral face of the workpiece W into a true circle cross-sectional geometry determined by the spindle center locus L due to the above-mentioned mutual interpolation motion.

When the rotational angle of the spindle 266 is allowed to move forward 90° or 270° by the synchronous control of the X-axis control with the Y-axis control from a state shown In FIG. 37, the chamfering cutting edge 258 or 260 keeps the angle β constant to the chamfered face of the workpiece W, and the chamfering cutting edge 258 or 260 performs chamfering of the workpiece W into a true circle cross-sectional geometry determined by the spindle center locus L due to the above-mentioned mutual interpolation motion.

Such a rotational angle control of the spindle 266 allows the roughing, finishing and chamfering to be performed by the single turning tool 250 without requiring tool exchange.

The number of the cutting edges of the turning tool 250 is not limited to four, and a plurality of cutting edges more than four may be provided within a scope in which adjacent cutting edges do not interfere with each other. Also, the combination of cutting edges is not limited to the above-mentioned embodiments, and an intermediate finishing cutting edge may be provided. The cutting edges 254, 256, 258 and 260 may be identical with or different from each other with respect to the tool radius Tr.

The cutting edges 254, 256, 258 and 260 of the turning tool 250 used here are single point tools. The single point turning tool referred to here is a turning tool of a type of contacting substantially through a point a workpiece, that is, a general term of nonforming turning tools, which includes boring tools, boring bar tools, parting tools, threading tools, button tools and turning tools.

FIG. 38 shows an example of outer peripheral face machining. In FIG. 38, the parts corresponding to FIG. 37 are designated by the same reference codes as those designated to FIG. 37, and the explanation of the parts will be omitted.

The turning tool 250 may be have the same configuration as for inner peripheral face machining, and the head of the bar part 252 is mounted with four cutting edges of a roughing cutting edge 254, a finishing cutting edge 256 and double chamfering cutting edges 258, 260 radially at a phase angle of 90° mutually with the center axial line of the bar part 252 as a center.

Also, in this case, the turning tool 250, though not illustrated, is concentrically fitted into a taper-shaped tool receiving hole 268 formed in a spindle 266 with the spindle engaging taper axis part. This causes the bar part 252 to be concentrically mounted to the center axial line Cs of the spindle 266. Also, the turning tool 250, though not illustrated, is engaged through the key with the spindle 266 as with the above-mentioned embodiments, thereby being positioned and mounted unconditionally in the rotational direction with respect to the spindle 266.

Also, in this case, the spindle 266 and the workpiece W are allowed to be relatively dislocated by the X-axis control and the Y-axis control along a plane perpendicular to the rotation axial line of the spindle 266, thereby allowing a true circle mutual interpolation motion between the spindle 266 and the workpiece W to be performed; and the rotational angle of the spindle 266 is synchronously controlled with a required interrelation to the X-axis control and the Y-axis control, whereby the direction of the cutting edge of the turning tool 250 to the inner peripheral face of the workpiece W is kept at a required direction at the full rotational angle position of the spindle 266, and in the illustrated example, the front rake angle β between the roughing cutting edge 254 and the inner peripheral face is kept constant, and then the roughing cutting edge 254 roughs the outer peripheral face of the workpiece W into a geometry determined by the interpolation locus due to the above-mentioned mutual interpolation motion, that is, into the cross sectional geometry of a true circle.

When the rotational angle of the spindle 266 is allowed to move forward 180° by the synchronous control of the X-axis control with the Y-axis control from a state shown In FIG. 38, the finishing cutting edge 256 keeps the angle β constant to the inner peripheral face of the workpiece W, and instead of the roughing cutting edge 254, the finishing cutting edge 256 finishes the outer peripheral face of the workpiece W into a true circle cross-sectional geometry determined by the spindle center locus L due to the above-mentioned mutual interpolation motion.

When the rotational angle of the spindle 266 is allowed to move forward 90° or 270° by the synchronous control of the X-axis control with the Y-axis control from a state shown In FIG. 38, the chamfering cutting edge 258 or 260 keeps the angle β constant to the chamfered face of the workpiece W, and the chamfering cutting edge 258 or 260 performs chamfering of the workpiece W into a true circle cross-sectional geometry determined by the spindle center locus L due to the above-mentioned mutual interpolation motion.

Such a rotational angle control of the spindle 266 allows the roughing, finishing and chamfering to be performed by the single turning tool 250 without requiring tool exchange.

Figure 39:
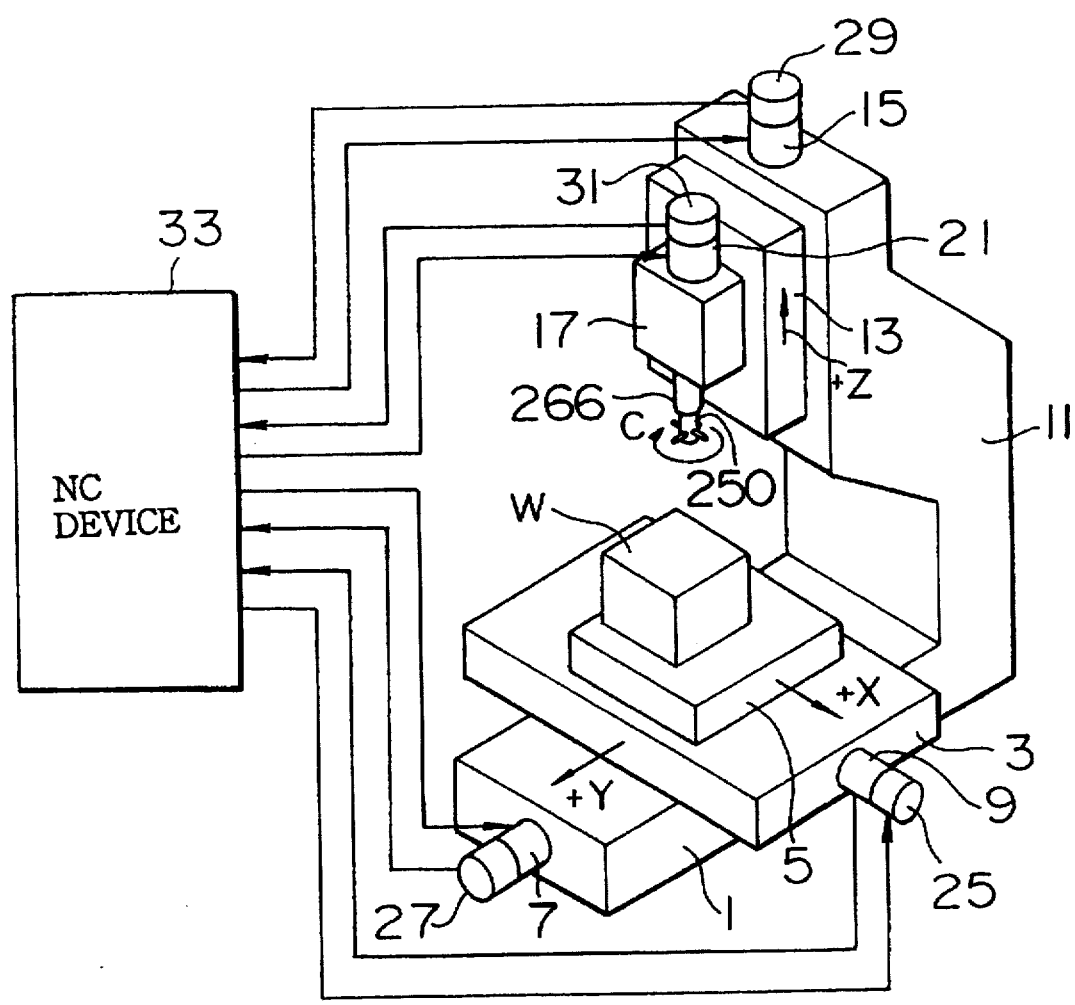
FIG. 39 is a schematic perspective view showing one example of an NC machining tool used for the embodiment of the spindle rotational angle control machining method of the third embodiment.

FIG. 39 shows one example of an NC machining tool used to embody the spindle rotational angle control machining method according to the present invention. The NC machining tool has a bed 1, a Y-axis table 3, and an X-axis table 5 provided movably in the X-axis direction on the Y-axis table 3, the workpiece W being fixedly placed on the X-axis table 5. The Y-axis table 3 is driven in the Y-axis direction by a Y-axis servomotor 7, and the workpiece W on the X-axis table 5 is axially controlled along a horizontal plane consisting of X-axis and Y-axis at an arbitrary coordinate position by X-coordinate and Y-coordinate according to both the Y-axis direction movement of the Y-axis table 3 by the Y-axis servomotor 7 and the X-axis direction movement of the X-axis table 5 by the X-axis servomotor 9.

A Z-axis slider 13 is mounted movably in the vertical direction, that is, in the Z-axis direction on a column 11 of the NC machining tool, the Z-axis slider 13 being driven in the Z-axis direction by a Z-axis servomotor 15.

The Z-axis slider 13 is mounted with a spindle head 17 to which a spindle 266 is mounted rotatably around the axial line in the same direction as Z-axis, that is, around C-axis.

The spindle 266 is rotationally driven by a C-axis servomotor 21 and controlled quantitatively for C-axis rotational angle.

Here, the movement plane of the workpiece W by X-axis and Y-axis is a plane perpendicular to the rotating axial line of the spindle 266, that is, C-axis (Z-axis).

The X-axis servomotor 9, the Y-axis servomotor 7, the Z-axis servomotor 15 and the C-axis servomotor 21 are mounted with rotary encoders 25, 27, 29 and 31, respectively, and the rotary encoders 25, 27, 29 and 31 detect the rotational angle of respective servomotors 9, 7, 15 and 21 to output rotational angle information to an NC device 33. Of them, the rotary encoder 31 of the C-axis servomotor 21 is configured by an absolute-type rotary encoder, and measures the rotational angle of the spindle 266 with the above-mentioned zero point as an absolute datum position.

The NC device 33, as shown in FIG. 3, has a program execution section 35 for executing an NC machining program to output respective axes commands, and an interpolation calculation section 37 for receiving axes commands from the program execution section 35 to perform an interpolation calculation; and the interpolation calculation section 37 outputs a travel of respective axes X, Y, Z and C as a command value to position control/drive sections 39, 41, 43 and 45 of the respective axes.

The position control/drive sections 39, 41, 43 and 45 receive the rotational angle information from the respective rotary encoders 25, 27, 29 and 31 of the same axes, and control the drive of the servomotors 9, 7, 15 and 21 of the same axes on the basis of the operation level of respective axes calculated by a position feedback compensating control.

In the spindle rotational angle control machining method according to the present invention, the command values of respective axes X, Y and Z have been set by an NC machining program in such a manner that the relative movement locus of the spindle center to the workpiece W conforms to a geometry to be machined; with the execution of the program, the turning tool 250 and the workpiece W are relatively dislocated by the control of axes X, Y and Z, at least axes X and Y along a plane perpendicular to the rotation axial line of the spindle 266, thereby allowing a mutual interpolation motion between the turning tool 250 and the workpiece W to be performed; and the rotational angle of the spindle 266 is synchronously controlled with a required interrelation to the control of axes X, Y and Z, whereby the direction of the cutting edge of the turning tool 250 to the machined face of the workpiece W is kept at a required direction, for example, at a normal direction at the full rotational angle position of the spindle 266, and then the workpiece W is machined by any of the cutting edges 254, 256, 258 and 260 into a geometry determined by an interpolation locus due to the mutual interpolation motion.

In this case, the control of two axes X and Y is performed in a manner to draw a locus defined by an equation including trigonometric functions having a 90° phase difference mutually.

In the spindle rotational angle control machining method, by combining the control of the rotational angle of the spindle 266 with the simultaneous control of either two axes X and Y, or three axes X, Y and Z, there can be performed boring of arbitrary inside diameter and machining of the outer periphery face of arbitrary outside diameter, as well as, taper machining, spherical face machining, polygon machining, thread cutting, flange face machining and arbitrary geometry machining using a single turning tool regardless of the tool radius of the turning tool 250; and by the use of a single point turning tool, the machining speed is improved three through twenty times faster than with the machining belonging to the spring machining using a forming turning tool.

Then, the movement control and synchronous control in the spindle rotational angle control machining method according to the present invention will be explained in detail individually for the inner/outer peripheral face machining.

When the radius of the cylindrical face is taken as R; the feed rate in Z-axis direction per revolution, p; and the Z-axis coordinate at Z-axis direction feed start position, $Z_o$; the coordinate positions (Xt, Yt and Zt) of the cutting edge at respective rotational angle positions are given by the following functional equation:

$Xt = R \cos \theta$ $Yt = R \sin \theta$ $Zt = Z_o - (p/2 \pi)\theta$

In the cylindrical inner face machining, as shown in FIG. 37, the normal vector facing outward from machined facen= (nx, ny) at the X-Y plane of the cutting edge locus is expressed by the following equations:

$nx = -\cos \theta$ $ny = -\sin \theta$

Accordingly, the spindle center locus, that is, the spindle center coordinate positions (Xs, Ys, Zs) are expressed by the following equations:

$Xs = Xt + nx \cdot Tr = R \cos \theta - Tr \cos \theta = (R - Tr) \cos \theta$ $Ys = Yt + ny \cdot Tr = R \sin \theta - Tr \sin \theta = (R - Tr) \sin \theta$ $$Zs=Zt-Tz$$

In this case, by the simultaneous two axes control of X-axis and Y-axis according to the spindle center coordinate positions (Xs, Ys), a metal circular interpolation motion is performed between the turning tool 250 and the workpiece W, and as the circular interpolation locus, the spindle center locus becomes a true circle.

In the equations, Tr is a tool radius of the turning tool 250, and Tz is a tool length (axial length in the Z-axis direction from the Z-axis of the spindle 268 to the cutting edge).

In the cylindrical inner face machining, the spindle rotational angle α taking the X-axis direction as an original line is expressed by the following equation:

$$\alpha = \tan^{-1}(ny/nx) + \gamma = \tan^{-1}(-\sin\theta/-\cos\theta) + \gamma$$
$$= \theta + \pi + \gamma$$

In the equation, γ is a cutting edge selection angle, and in the illustrated example, the chamfering cutting edge 258 is selected with γ=0 degree; the roughing cutting edge 254, with γ=90 degrees; the chamfering cutting edge 260, with γ=180 degrees; and the finishing cutting edge 256, with γ=270 degrees.

With the above-mentioned condition satisfied, the axial control of respective axes X, Y and Z is performed, and the spindle rotational angle α is synchronously controlled with the axial control, whereby a single cutting edge 254, 256, 258 or 260 selected by setting of the cutting edge selection angle γ becomes faced always to the normal with respect to machined face at the full rotational angle position of the spindle 266, so that a cylindrical inner face machining with an arbitrary radius R is performed by the single cutting edge selected by setting of the cutting edge selection angle γ.

This allows the inner peripheral face machining of an arbitrary radius to be performed by the single turning tool 250 regardless of tool radius, and roughing, intermediate finishing, finishing and chamfering are performed without requiring tool exchange. This allows the frequency of tool exchange to be reduced, the operation rate of a machining tool to be improved, and in addition, the number of required tools to be reduced, and a sealing magazine to be made small in capacity.

In the cylindrical outer face machining, as shown in FIG. 38, the normal vector facing outward from machined facen= (nx, ny) in the X-Y plane of the cutting edge locus is expressed by the following equations:

$$nx=\cos\theta$$

$$ny=\sin\theta$$

Accordingly, the spindle center locus, that is, the spindle center coordinate positions (Xs, Ys, Zs) are expressed by the following equations:

$$Xs=Xt+nx\cdot Tr=R\cos\theta+Tr\cos\theta=(R+Tr)\cos\theta$$

$$Ys=Yt+ny\cdot Tr=R\sin\theta+Tr\sin\theta=(R+Tr)\sin\theta$$

$$Zs=Zt-Tz$$

In the cylindrical outer face machining, the spindle rotational angle α taking the X-axis direction as an original line is expressed by the following equation:

$$\alpha = \tan^{-1}(ny/nx) + \gamma = \tan^{-1}(\sin\theta/\cos\theta) + \gamma$$
$$= \theta + \gamma$$

Accordingly, as with the cylindrical inner face machining, with the above-mentioned condition satisfied, the axial control of respective axes X, Y and Z is performed, and the spindle rotational angle α is synchronously controlled with the axial control, whereby a single cutting edge 254, 256, 258 or 260 selected by setting of the cutting edge selection angle γ becomes faced always to the normal with respect to machined face at the full rotational angle position of the spindle 266, so that a cylindrical outer face machining with an arbitrary radius R is performed by the single cutting edge selected by setting of the cutting edge selection angle γ.

The equations of Xs=(R+Tr) cos θ and Ys=(R+Tr) sin θ become valid in a case where the spindle center Cs is outside the workpiece W as viewed in the Z-axis direction as shown in FIG. 38, while in a case where the spindle center Cs is inside the workpiece W as viewed in the Z-axis direction, the equations of Xs=(R−Tr) cosθ and Ys=(R−Tr) sinθ become valid.

It is sufficient for the internal thread cutting that the synchronous control similar to the cylindrical inner face machining is performed and that the value of Zs=Zt−Tz is set at a proper value according to thread pitch; it is sufficient for the external thread cutting that the synchronous control similar to the cylindrical outer face machining is performed and that the value of Zs=Zt−Tz is set at a proper value according to thread pitch; and in either case, the thread cutting of internal thread or external thread having an arbitrary thread diameter is performed by setting the R value.

Also, in taper machining, spherical face machining, polygon machining, flange face machining and arbitrary geometry machining, the axial control of respective axes X, Y and Z is performed as with the cylindrical face machining according to these machining geometry, and the spindle rotational angle is synchronously controlled to the axial control, whereby taper machining, spherical face machining, polygon machining, flange face machining and arbitrary geometry machining are performed by a single turning tool selected by setting the cutting edge selection angle.

When a detailed explanation is required for the axial control of taper machining, spherical face machining, polygon machining and flange face machining, refer to the specification and drawings of Japanese Patent No. HEI 6-211137 by the same applicant as the present applicant.

The above-mentioned axial control or spindle rotational angle control may be performed either by a method in which the calculation of the above-mentioned functional equations is executed in the NC device to obtain coordinate position data, or by a method in which coordinate position data have been previously described as point group data in an NC machining program at the production of the program.

Although the present invention has been described in detail for specific embodiments, it will be apparent for those skilled in the art that the present invention is not limited to these, and that various embodiments may be performed within the scope of the present invention.

Figure 40:
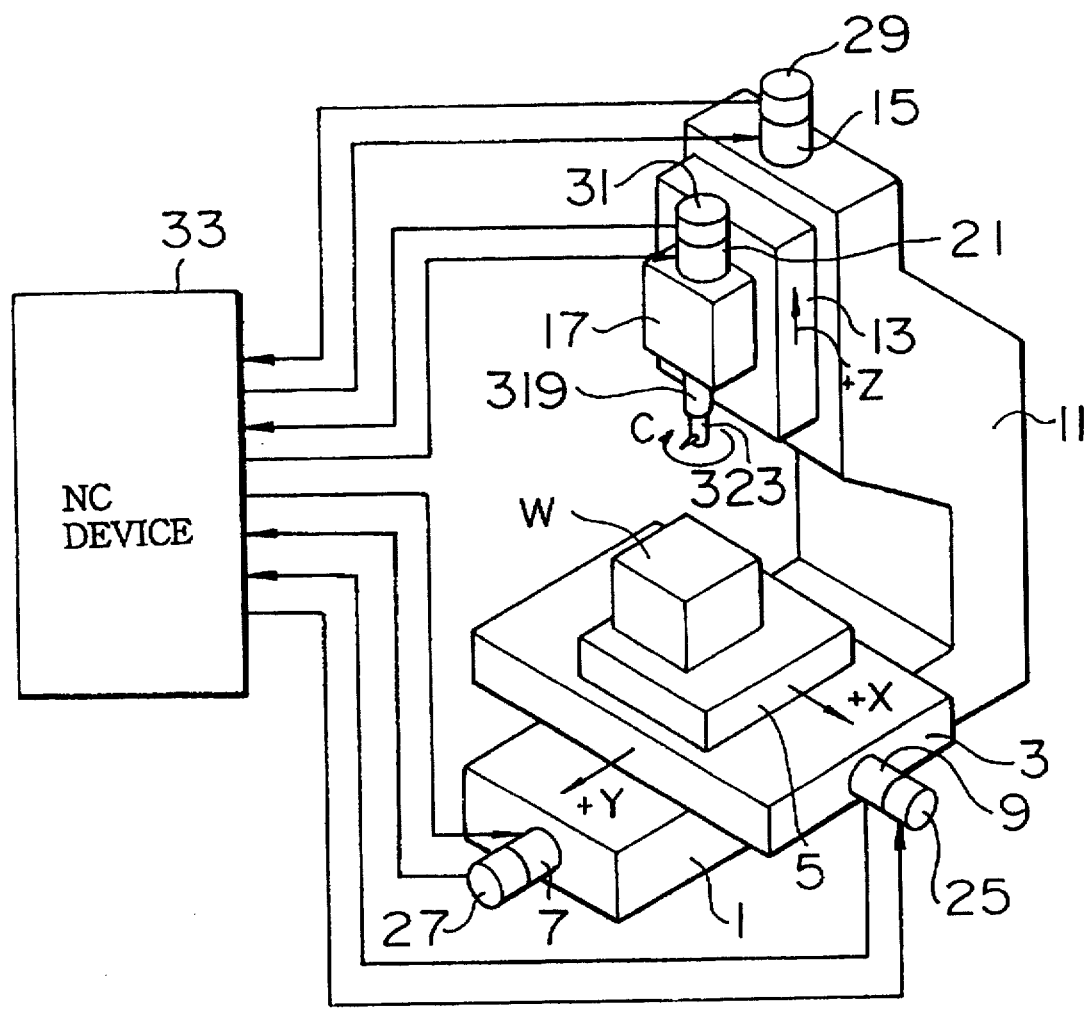
FIG. 40 is a schematic perspective view showing one example of an NC machining tool used for the embodiment of the rotational machining method of the fourth embodiment.

The fourth embodiment will be explained hereinafter. FIG. 40 shows one example of an NC machining tool used to embody the rotational machining method according to the present invention. The NC machining tool has a bed 1, a Y-axis table 3, and an X-axis table 5 provided movably in the X-axis direction on the Y-axis table 3, the workpiece W being fixedly placed on the X-axis table 5. The Y-axis table 3 is driven in the Y-axis direction by a Y-axis servomotor 7, and the workpiece W on the X-axis table 5 is axially controlled along a horizontal plane consisting of X-axis and Y-axis at an arbitrary coordinate position by X-coordinate and Y-coordinate according to both the Y-axis direction movement of the Y-axis table 3 by the Y-axis servomotor 7 and the X-axis direction movement of the X-axis table 5 by the X-axis servomotor 9.

A Z-axis slider 13 is mounted movably in the vertical direction, that is, in the Z-axis direction on a column 11 of the NC machining tool, the Z-axis slider 13 being driven in the Z-axis direction by a Z-axis servomotor 15.

The Z-axis slider 13 is mounted with a spindle head 17 to which a spindle 319 is mounted rotatably around the axial line in the same direction as Z-axis, that is, around C-axis.

The spindle 319 is rotationally driven by a C-axis servomotor 21 and controlled quantitatively for C-axis rotational angle. The spindle 319 is mounted with a turning tool 323.

The turning tool 323 used here are a single point tool. The single point turning tool referred to here is a turning tool of a type of contacting substantially through a point a workpiece, that is, a general term of nonforming turning tools, which includes boring tools, boring bar tools, parting tools, threading tools, button tools and turning tools.

The movement plane of the workpiece W by X-axis and Y-axis is a plane perpendicular to the rotating axial line of the spindle 319, that is, C-axis (Z-axis).

The X-axis servomotor 9, the Y-axis servomotor 7, the Z-axis servomotor 15 and the C-axis servomotor 21 are mounted with rotary encoders 25, 27, 29 and 31, respectively, and the rotary encoders 25, 27, 29 and 31 detect the rotational angle of respective servomotors 9, 7, 15 and 21 to output rotational angle information to an NC device 33.

Figure 41:
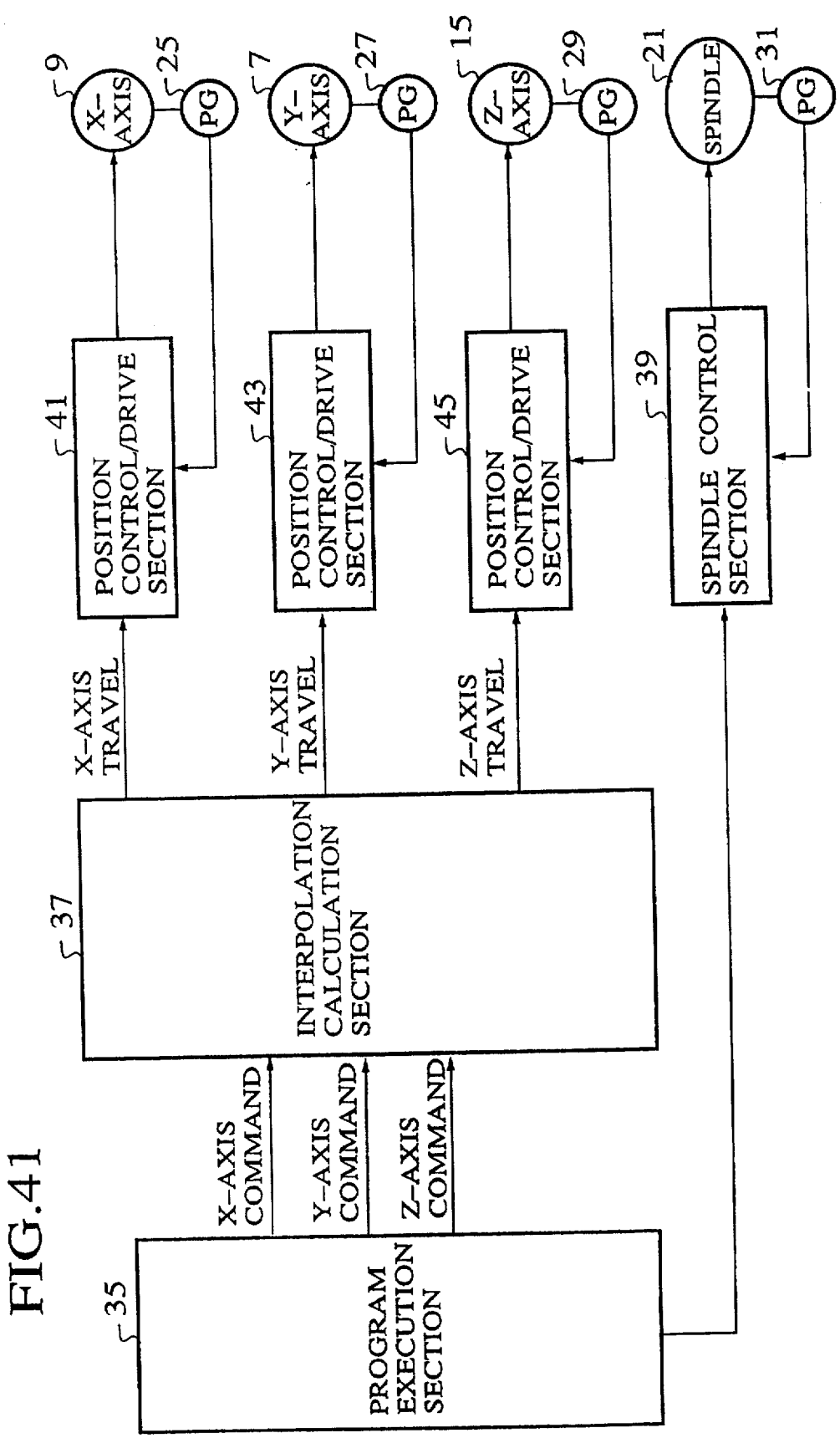
FIG. 41 is a block diagram showing a control system of an NC machining tool used for the embodiment of the rotational machining method of the fourth embodiment.

The NC device 33, as shown in FIG. 41, has a program execution section 35 for executing an NC machining program to output respective axes commands and a spindle revolution speed command, an interpolation calculation section 37 for receiving axes commands from the program execution section 35 to perform an interpolation calculation and a spindle control section 39.

The interpolation calculation section 37 outputs a travel of respective axes X, Y, Z and C as a command value to position control/drive sections 41, 43 and 45 of the respective axes.

The position control/drive sections 41, 43 and 45 receive the rotational angle information from the respective rotary encoders 25, 27 and 29 of the same axes, and control the drive of the servomotors 9, 7 and 15 of the same axes on the basis of the operation level of respective axes calculated by a position feedback compensating control.

The spindle control section 39 is given the spindle revolution speed command from the program execution section 35, receives rotational angle information from the rotary encoder 31, and controls the drive of the spindle motor 21 with a revolution speed calculated by a feedback compensating control.

In the rotational machining method according to the present invention, the command values of respective axes X, Y and Z have been set by an NC machining program in such a manner that the relative movement locus of the spindle center to the workpiece W conforms to a geometry to be machined; with the execution of the program, the turning tool 323 and the workpiece W are relatively dislocated by the control of axes X, Y and Z, at least axes X and Y along a plane perpendicular to the rotation axial line of the spindle 319, thereby allowing a mutual interpolation motion between the turning tool 323 and the workpiece W to be performed; and the workpiece W is machined by the turning tool 323 rotating around the center axial line of the spindle 319 due to the rotation of the spindle 319 into a geometry determined by an interpolation locus due to the mutual interpolation motion.

In this case, the rotational radius of the turning tool 323 becomes different from the turning radius of the workpiece W, so that the turning tool 323 machines intermittently the workpiece W for each rotation by the rotation around the center axial line of the spindle 319. This causes chip to be made noncontinuous.

The rotational machining method can be applied to boring, taper machining, spherical face machining, polygon machining, flange face machining and arbitrary geometry machining by the combination with a simultaneous control of two axes of X and Y, or three axes of X, Y and Z.

Then, a case where the rotational machining method according to the present invention is applied to a cylindrical inner/outer face machining will be explained in detail.

Figure 42:
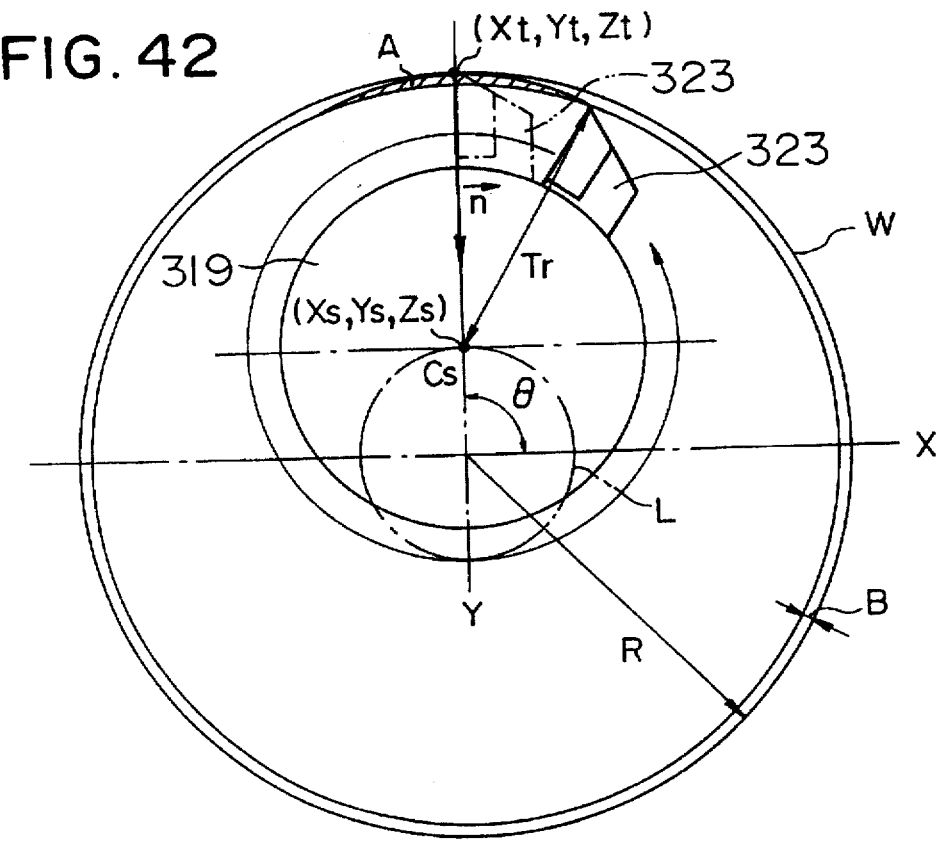
FIG. 42 is an illustrative view showing the cylindrical inner face machining of the fourth embodiment.
Figure 43:
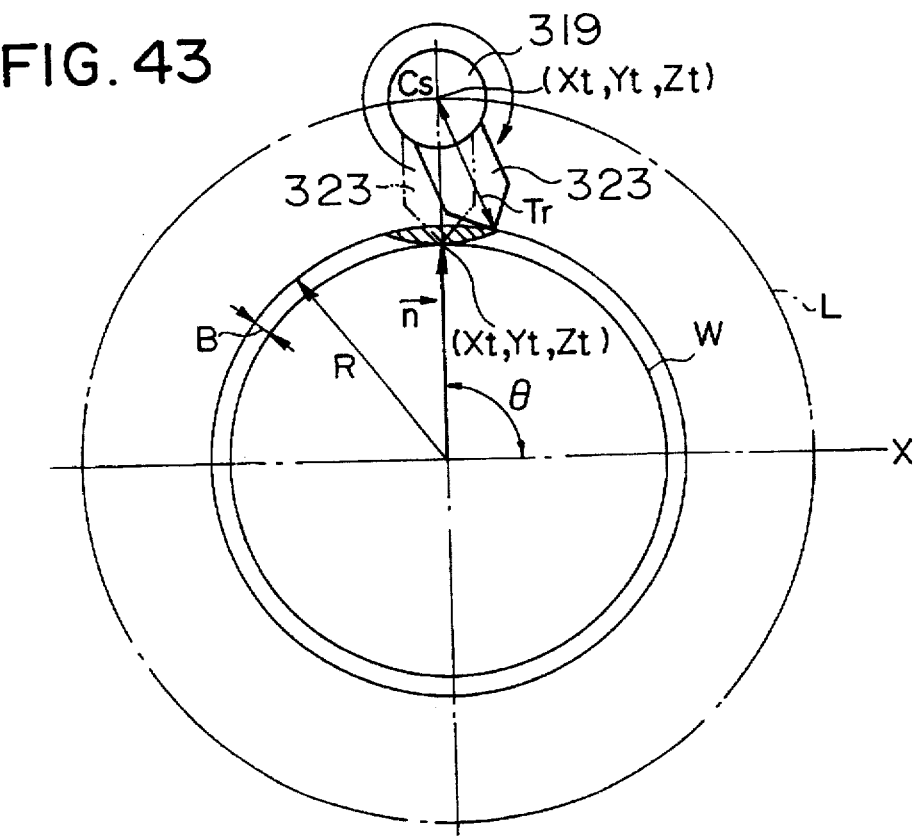
FIG. 43 is an illustrative view showing the cylindrical outer face machining of the fourth embodiment.

As shown in FIGS. 42 and 43, when the radius of the cylindrical face is taken as R; the feed rate in Z-axis direction per revolution, p; and the Z-axis coordinate at Z-axis direction feed start position, $Z_0$; the coordinate positions ($X_t$, $Y_t$ and $Z_t$) of the cutting edge at respective rotational angle positions are given by the following functional equation:

$$X_t = R \cos \theta$$

$$Y_t = R \sin \theta$$

$$Z_t = Z_0 - (p/2 \pi)\theta$$

In the cylindrical inner face machining, as shown in FIG. 42, the normal vector facing outward from machined face n = ($n_x$, $n_y$) in the X-Y plane of the cutting edge locus is expressed by the following equations:

$$n_x = -\cos \theta$$

$$n_y = -\sin \theta$$

Accordingly, in the cylindrical inner face machining, the spindle center coordinate positions ($X_s$, $Y_s$, $Z_s$) defining the spindle center locus L are expressed by the following equations:

$$X_s = X_t + n_x \cdot T_r = R \cos \theta - T_r \cos \theta = (R - T_r) \cos \theta$$

$$Y_s = Y_t + n_y \cdot T_r = R \sin \theta - T_r \sin \theta = (R - T_r) \sin \theta$$

$$Z_s = Z_t - T_z$$

In the cylindrical outer face machining shown in FIG. 43, the normal vector facing outward from machined face n = ($n_x$, $n_y$) at the X-Y plane of the cutting edge locus is expressed by the following equations:

$$n_x = -\cos \theta$$

$$n_y = -\sin \theta$$

Accordingly, in the cylindrical outer face machining, the spindle center coordinate positions ($X_s$, $Y_s$, $Z_s$) defining the spindle center locus L are expressed by the following equations:

$$X_s = X_t + n_x \cdot T_r = R \cos \theta + T_r \cos \theta = (R + T_r) \cos \theta$$

$$Y_s = Y_t + n_y \cdot T_r = R \sin \theta + T_r \sin \theta = (R + T_r) \sin \theta$$

$$Zs = Zt - Tz$$

In the equations, Tr is a tool radius of the turning tool 323, and Tz is a tool length (axial length in the Z-axis direction from the Z-axis of the spindle 319 to the cutting edge of the tool part 324).

In this case, by the simultaneous two axes control of X-axis and Y-axis according to the spindle center coordinate positions (Xs, Ys), a mutual circular interpolation motion is performed between the turning tool 323 and the workpiece W, and as the circular interpolation locus, the spindle center locus becomes a true circle having a radius of R−Tr or R+Tr.

This causes the turning tool 323 to be rotationally driven by the spindle 319 with the spindle center Cs as a rotational center, and with the above-mentioned condition satisfied, the axial control of respective axes X, Y and Z is performed, whereby the machining of a cylindrical inner face or outer face of an arbitrary radius is performed.

In the cylindrical inner/outer face machining, the rotation of the turning tool 323 causes the workpiece W to be intermittently machined; and the machining removal of the wall part of the workpiece W is performed substantially in a crescent-shaped form as shown by a reference code A in FIGS. 42, 43 for each revolution of the spindle 319 to a machining level shown by a reference code B in FIGS. 42, 43 as a machining allowance. The chip produced by the machining becomes substantially crescent-shaped fractions, that is, the chip is produced noncontinuously.

This causes the chip to be made positively noncontinuous and to be prevented from twining around the stem part of the turning tool 323; and even the machining of a machined material having a large malleability can be performed continuously without being given a hindrance due to chip.

Also, since the produced chip has been fractioned, the post-treatment ability of the chip becomes better.

As the turning tool 323, a single point turning tool contacting substantially through a point a workpiece is used, whereby the cutting resistance becomes smaller than with an end mill and the like. This allows the speed of the mutual interpolation motion by axial control, that is, the cutting speed to be made fast, or a workpiece having a long axial length such as a deep bore to be machined highly accurately by the use of the turning tool 323 having a long stem part (boring bar).

The above-mentioned axial control may be performed either by a method in which the calculation of the above-mentioned functional equations is executed in the NC device to obtain coordinate position data, or by a method in which coordinate position data have been previously described as point group data in an NC machining program at the production of the program.

Although the present invention has been described in detail for specific embodiments, it will be apparent for those skilled in the art that the present invention is not limited to these, and that various embodiments may be performed within the scope of the present invention.

As understood from the above explanation, according to the spindle rotational angle control machining method using a turning tool of the present invention, while a mutual interpolation motion between a spindle and a workpiece is being performed by a relative axial control of the spindle to the workpiece, the direction of the cutting edge of a turning tool to the machined face of the workpiece is kept at a required direction at the full rotational angle position of the spindle by synchronously controlling the rotational angle of the spindle for the axial control, and thus the workpiece is machined into a geometry determined by the interpolation locus due to the mutual interpolation motion, whereby machining of the inner/outer periphery face of arbitrary diameter, as well as, taper machining, spherical face machining, polygon machining, thread cutting, flange face machining and arbitrary geometry machining are performed using a single turning tool regardless of the tool radius.

In this case, the machining dimension depends on both the geometry of the interpolation locus and the tool radius of a turning tool, and an error of the tool radius of a turning tool can be compensated by correcting the geometry of the interpolation locus, so that a required machining accuracy is obtained even when the position of the cutting edge of a turning tool is positioned not highly accurately, thereby making the tool preset work easy.

By using a single point turning tool as a turning tool, the cutting resistance becomes smaller than with a forming turning tool. This allows the speed of the mutual interpolation motion by axial control, that is, the cutting speed to be improved three through twenty times faster than with the machining belonging to the spring machining using a forming turning tool.

In the cylindrical inner/outer peripheral face machining, the circular interpolation diameter of the above-mentioned mutual interpolation motion is changed by the same turning tool as with a conventional boring while obtaining the same machining efficiency, whereby a workpiece with an arbitrary bore size or outside diameter can be machined by a single turning tool, and in addition, arbitrary geometry machining such as taper machining and spherical face machining can be performed by changing intermittently or continuously the circular interpolation diameter midway through machining.

In flange face machining, the tool machining of a flange face by tool trace is performed without requiring a rotary face plate having a tool draw out mechanism, so that there can be obtained a flange face superior in air tightness to a flange face of machining trace by an end mill or a face milling cutter.

Also, according to the degree of inclination of the machining axial line or machining face of a workpiece to the center axial line of the above-mentioned spindle, the axial control level of the relative displacement of the spindle to the workpiece is corrected, and the inclination component of the machining axial line or machining face of the workpiece to the center axial line of the spindle is given to the mutual interpolation motion between the spindle and the workpiece, whereby an inner/outer peripheral face or an inclined flange face whose machining axial line is inclined to the spindle center axial line is also machined.

Also, the degree of inclination of the machining axial line or machining face of a workpiece to the normal state thereof due to the positioning error of the workpiece is automatically measured, and according to the degree of inclination, the axial control level of the relative displacement of the spindle to the workpiece is corrected, and the inclination compensating component of the machining axial line or machining face of the workpiece to the center axial line of the spindle is given to the mutual interpolation motion between the spindle and the workpiece, whereby an inner/outer peripheral face or an inclined flange face on the basis of the machining axial line in the normal state is machined even when the positioning of the workpiece has an error.

Also, machining start dimensions are determined by automatically measuring the machining part geometry of a workpiece, and with the machining start dimensions, the machining level by the above-mentioned turning tool is determined according to the relative displacement of the above-mentioned spindle to the above-mentioned workpiece. Further, the machining part geometry of the workpiece is automatically measured midway through machining and on the basis of the automatic measurement, machining dimensions required for finishing are automatically determined, and then with the machining dimensions, the machining level by the above-mentioned turning tool is determined according to the relative displacement of the above-mentioned spindle to the above-mentioned workpiece, whereby under the automatic measurement of machined part geometry, a series of machining are performed with a required depth of cut without requiring tool exchange and the like.

As understood from the above explanation, according to the spindle rotational angle control machining method using a turning tool of the present invention, while a mutual interpolation motion between a spindle and a workpiece is being performed by a relative axial control of the spindle to the workpiece, the direction of the cutting edge of a turning tool to the machined face of the workpiece is kept at a required direction at the full rotational angle position of the spindle by synchronously controlling the rotational angle of the spindle for the axial control, and thus the workpiece is machined into a geometry determined by the interpolation locus due to the mutual interpolation motion, whereby machining of the inner/outer periphery face of arbitrary diameter, as well as, taper machining, spherical face machining, polygon machining, thread cutting and the like are performed with an arbitrary front rake angle using a single turning tool regardless of the tool radius without requiring tool exchange and tool mounting angle change.

By using a single point turning tool as a turning tool, the cutting resistance, becomes smaller than with a forming turning tool. This allows the speed of the mutual interpolation motion by axial control, that is, the cutting speed to be improved three through twenty times faster than with the machining belonging to the spring machining using a forming turning tool.

As understood from the above explanation, according to the spindle rotational angle control machining method using a turning tool of the present invention and to the turning tool, while a mutual interpolation motion between a spindle and a workpiece is being performed by a relative axial control of the spindle to the workpiece, the direction of the cutting edge of a turning tool to the machined face of the workpiece is kept at a required direction at the full rotational angle position of the spindle by synchronously controlling the rotational angle of the spindle for the axial control, and thus the workpiece is machined into a geometry determined by the interpolation locus due to the mutual interpolation motion, whereby machining of the inner/outer periphery face of arbitrary diameter, as well as, taper machining, spherical face machining, polygon machining, thread cutting, flange face machining and arbitrary geometry machining are performed using a single turning tool regardless of the tool radius.

By using a single point turning tool as a turning tool, the cutting resistance becomes smaller than with a forming turning tool. This allows the speed of the mutual interpolation motion by axial control, that is, the cutting speed to be improved three through twenty times faster than with the machining belonging to the spring machining using a forming turning tool.

In the cylindrical inner/outer peripheral face machining, the circular interpolation diameter of the above-mentioned mutual interpolation motion is changed by the same turning tool as with a conventional boring while obtaining the same machining efficiency, whereby a workpiece with an arbitrary bore size or outside diameter can be machined by a single turning tool, and in addition, arbitrary geometry machining such as taper machining and spherical face machining can be performed by changing intermittently or continuously the circular interpolation diameter midway through machining.

Further, the inner peripheral face machining of an arbitrary radius can be performed by a single turning tool regardless of tool radius, and in addition, roughing, intermediate finishing, finishing and chamfering are performed without requiring tool exchange, which allows the frequency of tool exchange to be reduced, the operation rate of a machining tool to be improved, and in addition, the number of required tools to be reduced, and a sealing magazine to be made small in capacity.

As understood from the above explanation, according to the rotational machining method of the present invention, a turning tool machines intermittently a workpiece into a geometry determined by the interpolation locus due to the mutual interpolation motion between the turning tool and a workpiece, so that chip becomes noncontinuous and is made positively noncontinuous without requiring chip breaker mounting and separating groove machining. This causes the chip to be prevented from twining around the boring bar of a boring tool, and even the machining of a machined material having a large malleability to be performed continuously and unattendedly without being given a hindrance due to chip. Since the produced chip has been fractioned, the post-treatment ability of the chip becomes better.

As a turning tool, a single point turning tool is used, whereby the cutting resistance becomes smaller than with an end mill and the like. This allows the speed of the mutual interpolation motion by axial control, that is, the cutting speed to be made fast, or a workpiece having a long axial length such as a deep bore to be machined highly accurately by the use of the turning tool having a long stem part.

What is claimed is:

1. A method of machining a work piece by controlling a spindle rotational angle, comprising the steps of:

mounting a turning tool with a cutting edge on a main spindle having a main spindle axis, the main spindle being rotatable about the main spindle axis through a rotational angle capable of being controlled quantitatively;

imparting relative motion between the main spindle axis and the workpiece in a path of movement by controlled relative displacement between the main spindle axis and the workpiece in at least one plane perpendicular to the main spindle axis so that the path of movement of the main spindle axis relative to the workpiece conforms to a geometric shape to be machined; and keeping the cutting edge of the turning tool in a cutting direction relative to the machined face of the workpiece through the full rotational angle of the main spindle by synchronously controlling the rotational angle of the main spindle and the relative displacement between the main spindle axis and the workpiece;

wherein the workpiece is machined into a geometric shape determined by the path of imparted relative motion between the main spindle axis and the workpiece.

2. A method according to claim 1, wherein the path of imparted relative motion between the main spindle axis and the workpiece is defined by a set of stored program parameters.

3. A method according to either of claims 1 or 2, wherein the main spindle and the workpiece are relatively displaced in an axial direction perpendicular to the at least one plane to develop a machined surface having a degree of inclination relative to the main spindle axis formed by the imparted relative motion between the main spindle axis and the workpiece, by adjusting an axial control value of the relative displacement between the spindle and the workpiece according to the degree of inclination of the machined surface of the workpiece relative to the main spindle axis, whereby a peripheral face or an inclined flange face may be machined.

4. A method according to either of claims 1 or 2, wherein the main spindle and the workpiece are relatively displaced in an axial direction perpendicular to the at least one plane to develop a machined surface having a degree of inclination, the locus of the machined surface having the degree of inclination relative to the main spindle axis being automatically measured, and according to the measured locus, the axial control value of the relative displacement between the main spindle axis and the workpiece is adjusted.

5. A method according to either of claims 1 or 2, wherein machining start dimensions are determined by the geometric shape of a workpiece to be machined, and with the machining start dimensions, the machine cutting value of the turning tool is determined according to the relative displacement between the main spindle axis and the workpiece.

6. A method according to claim 5, wherein the machined geometric shape of a workpiece is automatically measured midway through machining, and machining dimensions required for finishing are automatically determined, and then with the machining dimensions, the machine cutting value of the turning tool is determined according to the relative displacement between the main spindle axis and the workpiece.

7. A method according to either of claims 1 or 2, wherein the turning tool has a single cutting edge contacting the workpiece substantially at a point.

8. A method according to either of claims 1 or 2, wherein the relative displacement between the main spindle axis and the workpiece is adjusted by simultaneously controlling two axes crossing mutually on the at least one plane, and the respective displacement control of the two axes is performed in a manner to draw a locus defined by a functional equation including trigonometric functions having a 90 degree phase difference mutually.

9. A method according to either of claims 1 or 2, wherein a required front rake angle is set for the path of imparted movement between the main spindle axis and the workpiece; and wherein the direction of a cutting edge of the turning tool relative to the machined face of the workpiece in required direction is kept with the required front rake angle.

10. A method according to claim 9, wherein the turning tool has a single cutting edge contacting the workpiece substantially at a point.

11. A method according to either of claims 1 or 2, wherein the turning tool has a plurality of radial cutting edges, and wherein the workpiece is machined by one cutting edge selected from the plurality of cutting edges.

12. A method according to claim 11 wherein the plurality of cutting edges are single edge turning tools, each contacting a workpiece substantially at a point.

13. A method according to claim 11, wherein the plurality of cutting edges include at least two types of cutting edges selected from among a cutting edge for roughing, a cutting edge for intermediate finishing, a cutting edge for finishing and a cutting edge for chamfering.

14. A method according to either of claims 1 for 2, wherein the turning tool is rotated at a spindle revolution speed about the main spindle axis, and wherein the workpiece is intermittently machined by the turning tool for each rotation of the turning tool into a geometric shape.

15. A method according to claim 14, wherein the turning tool has a single cutting edge contacting the workpiece substantially at a point.

* * * * *